(12) United States Patent
Shibahara

(10) Patent No.: US 8,111,358 B2
(45) Date of Patent: Feb. 7, 2012

(54) DISPAY PANEL AND DISPLAY APPARATUS

(75) Inventor: Seiji Shibahara, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 164 days.

(21) Appl. No.: 11/991,791

(22) PCT Filed: Jun. 14, 2006

(86) PCT No.: PCT/JP2006/311960
§ 371 (c)(1),
(2), (4) Date: Mar. 11, 2008

(87) PCT Pub. No.: WO2007/034600
PCT Pub. Date: Mar. 29, 2007

(65) Prior Publication Data
US 2010/0039589 A1    Feb. 18, 2010

(30) Foreign Application Priority Data
Sep. 20, 2005  (JP) .................. 2005-272617

(51) Int. Cl.
G02F 1/1335  (2006.01)
(52) U.S. Cl. .......................... 349/96; 349/167
(58) Field of Classification Search .......... None
See application file for complete search history.

(56) References Cited

U.S. PATENT DOCUMENTS

| | | | |
|---|---|---|---|
| 4,636,786 A | 1/1987 | Haertling | |
| 4,967,268 A | 10/1990 | Lipton et al. | |
| 6,188,455 B1 | 2/2001 | Yamamoto | |
| 6,233,034 B1 | 5/2001 | Lee et al. | |
| 6,266,109 B1 | 7/2001 | Yamaguchi et al. | |
| 6,512,565 B1 * | 1/2003 | Lee et al. ..................... | 349/130 |
| 6,570,632 B2 | 5/2003 | Lavrentovich et al. | |
| 6,636,289 B2 | 10/2003 | Yoo et al. | |
| 6,700,560 B2 | 3/2004 | Sumiya | |
| 6,738,054 B1 | 5/2004 | Yamaguchi | |
| 6,879,174 B2 | 4/2005 | Uchida | |
| 7,091,937 B2 | 8/2006 | Nakamura | |

(Continued)

FOREIGN PATENT DOCUMENTS

JP    04-304495    10/1992

(Continued)

OTHER PUBLICATIONS

International Search Report for PCT/JP2006/311960 mailed Sep. 19, 2006.

(Continued)

*Primary Examiner* — Sarah Hahm
(74) *Attorney, Agent, or Firm* — Nixon & Vanderhye P.C.

(57) ABSTRACT

Scanning signal lines (41) and data signal lines (47) are arranged so as to cross each other, and common signal lines (42) and the scanning signal lines (41) are arranged to be parallel to each other. Moreover, a polarizer (37) provided to an upper substrate (36) and a polarizer (38) provided to a lower substrate (30) are arranged such that absorption axial directions (37a) and (38a) cross at an angle that is orthogonal. Moreover, the absorption axial directions (37a) and (38a) are arranged so as to be perpendicular to or parallel to directions in which the data signal lines (47), the scanning signal lines (41), and the common signal lines (42) are extended, respectively. This realizes an improved response speed and an increased transmissivity.

24 Claims, 19 Drawing Sheets

U.S. PATENT DOCUMENTS

| | | | |
|---|---|---|---|
| 2001/0024178 | A1 | 9/2001 | Takeuchi et al. |
| 2002/0067448 | A1 | 6/2002 | Kim et al. |
| 2003/0039770 | A1 | 2/2003 | Sato et al. |
| 2005/0041196 | A1 | 2/2005 | Ishihara et al. |
| 2005/0151912 | A1 | 7/2005 | Miyachi et al. |
| 2005/0162607 | A1 | 7/2005 | Miyachi et al. |
| 2005/0168663 | A1 | 8/2005 | Miyachi et al. |
| 2005/0179632 | A1 | 8/2005 | Miyachi et al. |
| 2005/0179847 | A1 | 8/2005 | Miyachi et al. |
| 2005/0185105 | A1 | 8/2005 | Miyachi et al. |
| 2005/0185125 | A1 | 8/2005 | Miyachi et al. |
| 2005/0185131 | A1 | 8/2005 | Miyachi et al. |
| 2005/0237472 | A1 | 10/2005 | Shibahara et al. |
| 2007/0070282 | A1 | 3/2007 | Shibahara et al. |
| 2007/0080370 | A1 | 4/2007 | Miyachi et al. |
| 2008/0106689 | A1 | 5/2008 | Inoue et al. |
| 2008/0129929 | A1 | 6/2008 | Miyachi et al. |

FOREIGN PATENT DOCUMENTS

| | | |
|---|---|---|
| JP | 7-56545 | 3/1995 |
| JP | 7-209662 | 8/1995 |
| JP | 9-243984 | 9/1997 |
| JP | 11-142823 | 5/1999 |
| JP | 11-183937 | 7/1999 |
| JP | 2001-042833 | 2/2001 |
| JP | 2001-100256 | 4/2001 |
| JP | 2001-133752 | 5/2001 |
| JP | 2001-249363 A | 9/2001 |
| JP | 2002-189222 A | 7/2002 |
| JP | 2003-167273 | 6/2003 |
| JP | 2003-172939 | 6/2003 |
| JP | 2003-186032 | 7/2003 |
| JP | 2003-215613 | 7/2003 |
| JP | 2003-215641 | 7/2003 |
| JP | 2003-280619 | 10/2003 |
| JP | 2003-308057 | 10/2003 |
| JP | 2003-327966 A | 11/2003 |
| JP | 2005-122105 | 5/2005 |
| JP | 2005-202383 | 7/2005 |
| JP | 2005-202390 | 7/2005 |
| JP | 2005-215339 A | 8/2005 |
| JP | 2005-300779 A | 10/2005 |
| JP | 2005-300780 A | 10/2005 |
| JP | 2005-308825 A | 11/2005 |
| JP | 2005-316011 A | 11/2005 |
| JP | 2005-316013 A | 11/2005 |
| JP | 2005-336477 | 12/2005 |
| JP | 2005-338800 | 12/2005 |
| JP | 2006-003840 A | 1/2006 |
| JP | 2006-343697 A | 12/2006 |

OTHER PUBLICATIONS

Office Action dated Nov. 19, 2010 for U.S. Appl. No. 10/585,865, filed Jul. 11, 2006; Miyachi.

Office Action dated May 6, 2010 for U.S. Appl. No. 10/585,865, filed Jul. 11, 2006; Miyachi.

Office Action mailed Mar. 9, 2011 from U.S. Appl. No. 10/585,865; Miyachi.

U.S. Appl. No. 11/921,684, filed Dec. 7, 2007, entitled "Display Element and Display Device".

Yamamoto, "Liquid Crystal Micro Emulsion", Ekisho, vol. 4, No. 3, 2000, pp. 248-254 (partial Eng. Translation).

Shiraishi et al, "Palladium Nanoparticles Covered with Liquid-Crystalline Molecules-Preparation and Electro-Optic Properties of Liquid-Crystal Displays Doped with Palladium Nanoparticles", Kobunshi Ronbunshu vol. 59, No. 12, Dec. 2002, pp. 753-759 (partial English translation).

Diele et al, "Chapter XIII Thermotropic Cubic Phases", "Handbook of Liquid Crystals Low Molecular Weight Liquid Crystal", D. Demus et al, Wiley-VCH, vol. 2B, 1998, pp. 887-900.

Yamamoto, "First Lecture of Liquid Crystal Science Experiment: Identification of Liquid Crystal Phase" (4) Lyotropic Liquid Crystal, Ekisho, vol. 6, No. 1, 2002, pp. 72-83 (partial English translation).

Grelet et al, "Structural Investigations on Smectic Blue Phases", Physical Review Letters, The American Physical Society, vol. 86, No. 17, Apr. 2001, pp. 3791-3794.

Kato et al, "Fast and High-Contrast Electro-Optical Switching of Liquid-Crystalline Physical Gels: Formation of Oriented Microphase-Separated Structures", Advanced Functional Material, vol. 13, No. 4, Apr. 2003, pp. 313-317.

Kikuchi et al, "Polymer-Stabilized Liquid Crystal Blue Phases", Nature Materials, vol. 1, 2002, pp. 64-68 (on line URL http://www.nature.com/maturematerials.

"Thermodynamics of a unique thermo-tropic liquid crystal having optical isotropy" (Kazuya Saito et al, Ekisho vol. 5, No. 1, pp. 20-27, 2001).

"Examining nano-structured liquid crystal phase by molecule simulator" (Makoto Yoneya, Ekisho vol. 7, No. 3, pp. 238-245, 2003).

"Fine droplets of liquid crystals in a transparent polymer and their response to an electric field" (Shiro Matsumoto et al., Appl. Phys. Le#., 69, pp. 1044-1046)(1996).

Yang et al, "Liquid Crystals in Complex Geometries Formed by Polymer and Porous Networks", edited by Crawford et al, Taylor & Francis, pp. 103-142, (1996).

Mizoshita et al, "Fast and High-Contrast Electro-optical Switching of Liquid-Crystalline Physical Gels: Formation of Oriented Microphase-Separated Structures", Advanced Functional Materials, vol. 13, No. 4, Apr. 2003, pp. 313-317.

"Cutting Edge of Liquid Crystal Display", edited by the Japanese Association of Liquid Crystal Scientists, Sigma Publishing, first edition, first printing, Oct. 10, 1996, p. 204 15.2.3 and p. 209 15.3.2 partial English translation).

Office Action mailed Oct. 7, 2011 from U.S. Appl. No. 11/921,684; Inoue et al.

* cited by examiner

FIG. 15

| | AVERAGE SHAPE OF REFRACTIVE INDEX ELLIPSOID OF MEDIUM WHEN NO ELECTRIC FIELD IS APPLIED | AVERAGE SHAPE OF REFRACTIVE INDEX ELLIPSOID OF MEDIUM WHEN ELECTRIC FIELD IS APPLIED | |
|---|---|---|---|
| PRESENT APPLICATION | (a) 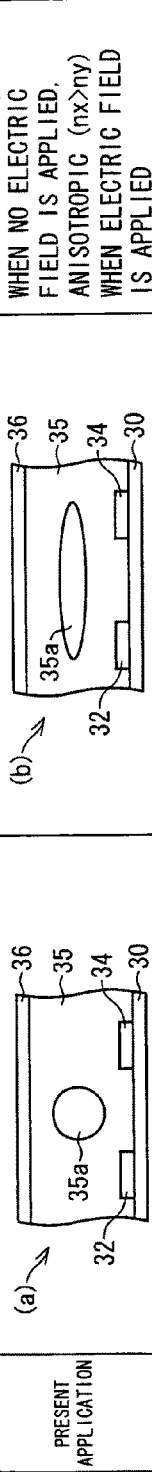 | (b) 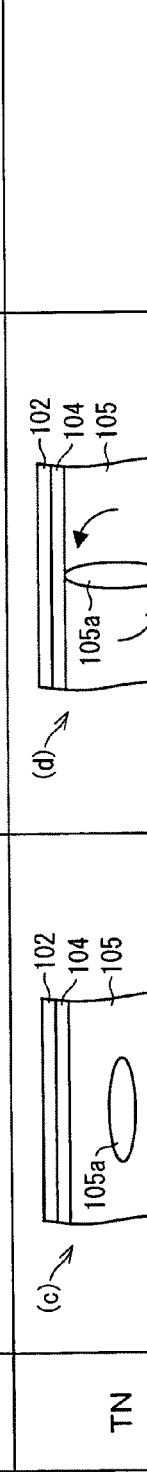 | ISOTROPIC (nx=ny=nz) WHEN NO ELECTRIC FIELD IS APPLIED. ANISOTROPIC (nx>ny) WHEN ELECTRIC FIELD IS APPLIED |
| TN | (c)  | (d) 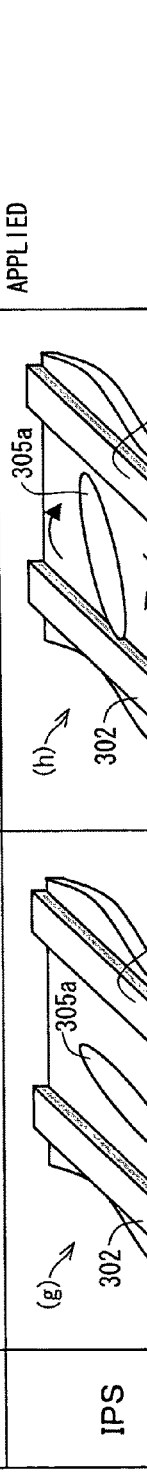 | LIQUID CRYSTAL DISPLAY APPARATUS: REFRACTIVE INDEX ELLIPSOID DOES NOT CHANGE ELLIPSE SHAPE BUT ROTATES WHEN ELECTRIC FIELD IS APPLIED |
| VA | (e) 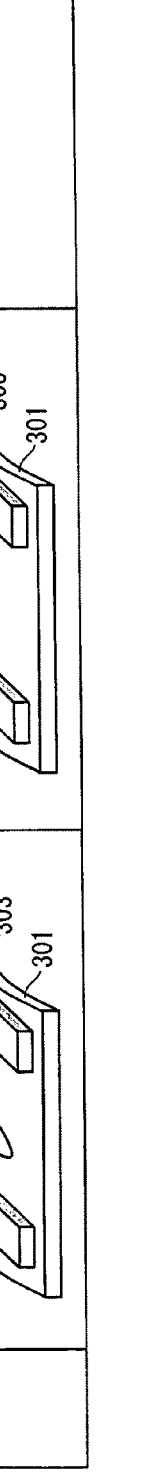 | (f)  | |
| IPS | (g)  | (h)  | |

DISPAY PANEL AND DISPLAY APPARATUS

This application is the U.S. national phase of International Application No. PCT/JP2006/311960, filed 14 Jun. 2006, which designated the U.S. and claims priority to Japanese Patent Application No. 2005-272617, filed 20 Sep. 2005, the entire contents of each of which are hereby incorporated by reference.

TECHNICAL FIELD

The present invention relates to a display panel and a display apparatus, which are highly transmissive, can respond at a high speed, and has a wide viewing angle.

BACKGROUND ART

Liquid crystal display elements are display elements having a thin thickness, a light weight, and a low power consumption among various display elements. This leads to wide application of liquid crystal display elements to, for example, image display apparatuses such as televisions, and OA (Office Automation) apparatuses such as personal computers.

Conventionally known liquid crystal display methods (display mode) of the liquid crystal display elements include, for example, a TN (Twisted Nematic) mode in which a nematic liquid crystal is used, display modes in which FLC (Ferroelectric Liquid crystal) or AFLC (Antiferroelectric Liquid crystal) is used, an IPS (In-plane Switching) mode, and an FFS (Fringe Field Switching) mode (See Patent Document 1).

Among the liquid crystal display methods, for example, the TN mode is conventionally adopted in the liquid crystal display elements in practical use. The liquid crystal display elements using the TN mode have drawbacks such as a slow response and a narrow viewing angle.

Moreover, the display modes in which the FLC or AFLC is used, are advantageous in their fast responses and wide viewing angles, but significantly poor in resistance to shocks, temperature characteristics, and the like. Therefore, the display modes in which the FLC or AFLC is used have not been widely used in practical use.

Moreover, the IPS mode and FFS mode perform displaying by switching liquid crystal molecules in a plane and have a wide viewing angle. Like the TN mode, however, the IPS mode and FFS mode are disadvantageous in a slow response. This disadvantage is a significant hindrance for the IPS mode and FFS mode to take over CRT (Cathode Ray Tube).

In all the foregoing liquid crystal display methods, liquid crystal molecules are oriented in a certain direction and thus a displayed image looks differently depending on an angle between a line of vision and a direction in which the liquid crystal molecules are oriented. On this account, all these display methods have limitations to viewing angles, respectively. Moreover, all the display methods utilize rotation of the liquid crystal molecules, the rotation caused by application of an electric field on the liquid crystal molecules. Because the liquid crystal molecules are rotated in alignment all together, responses take time in all the display method. Liquid crystal display elements using the display mode in which the FLC or the AFLC is used are advantageous in terms of response speed and viewing angle, but have a problem in that their alignment can be irreversibly destroyed by an external force.

In contrast to those liquid crystal display elements in which rotation of molecules by the application of the electric field is utilized, a liquid crystal display element in which a material having an optical anisotropy by and according to electric field application is used is proposed. Especially, a liquid crystal display element in which a material showing an orientation polarization due to electro-optical effects is utilized or a liquid crystal display element in which a material showing electronic polarization is used is proposed.

The electro-optical effect is a phenomenon in which a refractive index of a material is changed by an external electric field. There are two types of electro-optical effect: one is an effect proportional to the electric field and the other is proportional to the square of the electric field. The former is called the Pockels effect and the latter is called the Kerr effect.

Materials showing the Kerr effect were adopted early in high-speed optical shutters, and have been practically used in special measurement instruments. The Kerr effect was discovered by J. Kerr in 1875. So far, for example, organic liquids such as nitrobenzene, carbon disulfide, and the like, are known as materials showing the Kerr effect. These materials are used, for example, in measuring strength of high electric fields of power cables or the like, other than in the aforementioned optical shutters.

Later on, it was found that liquid crystal materials have large Kerr constants. Researches have been conducted basic research to utilize the liquid crystal materials having the large Kerr constants in light modulation devices, in light deflection devices, and further in optical integrated circuit. It has been reported that some liquid crystal compound has a Kerr constant more than 200 times higher than that of nitrobenzene.

Under these circumstances, studies for using the Kerr effect in display apparatuses have begun. The refractive index of the materials showing the Kerr effect is proportional to square of the electric field applied on the material. Because of this, a relatively lower voltage driving is expected in the utilization of orientation polarization of a material showing the Kerr effect than in the utilization of orientation polarization of a material showing the Pockels effect. Further, it is expected that a material showing the Kerr effect is applied to a high-speed response display apparatus because a material showing the Kerr effect has a response property of several p seconds to several m seconds, as its basic nature.

For instance, Patent Documents 2 and 3 suggest display elements in which a medium made from a liquid crystalline material is sealed between a pair of substrates and the Kerr effect is induced by application of an electric field parallel to the substrates.

[Patent Document 1]
Japanese Unexamined Patent Publication No. 202356/1999 (Tokukaihei 11-202356 (published on Jul. 30, 1999))
[Patent Document 2]
Japanese Unexamined Patent Publication No. 2001-249363 (Tokukai 2001-249363 (published on Sep. 14, 2001))
[Patent Document 3]
Japanese Unexamined Patent Publication No. 183937/1999 (Tokukaihei 11-183937 (published on Jul. 9, 1999))
[Patent Document 4]
Japanese Unexamined Patent Publication No. 221726/2002 (Tokukai 2002-221726 (published on Aug. 9, 2002))
[Non-Patent Document 1]
Jun Yamamoto, "Liquid Crystal Microemulsion", EKISHO, 2000, Vol. 4, No. 3, p. 248-254
[Non-Patent Document 2]
Yukihide Shiraishi and four others, "Palladium Nanoparticles Protected By Liquid Crystal Molecules—Preparation and Application to Guest-Host Mode Liquid Crystal Display Element", KOBUNSHI RONBUNSHU (Japanese Journal of Polymer Science and Technology), December 2002, Vol. 59, No. 12, p. 753-759

[Non-Patent Document 3]
D. Demus and three others, "Handbook of Liquid Crystals Low Molecular Weight Liquid Crystal", Wiley-VCH, 1998, Vol. 2B, p. 887-900
[Non-Patent Document 4]
Jun Yamamoto, "Liquid Crystal Scientific Experiment Course 1: Identification of Liquid Crystal Phase: (4) Lyotropic Liquid Crystal", EKISHO, 2002, Vol. 6, No. 1, p.
[Non-Patent Document 5]
Eric Grelet and three others, "Structural Investigations on Smectic Blue Phases", PHYSICAL REVIEW LETTERS, The American Physical Society, Apr. 23, 2001, Vol. 86, No. 17, p. 3791-3794
[Non-Patent Document 6]
Takashi Kato and two others, "Fast and High-Contrast Electro-optical Switching of Liquid-Crystalline Physical Gels: Formation of Oriented Microphase-Separated Structures", Adv. Funct. Mater., April 2003, Vol. 13. No. 4, p. 313-317
[Non-Patent Document 7]
Hirotsugu Kikuchi and four others, "Polymer-stabilized liquid crystal blue phases", p. 64-68, [online], Sep. 2, 2002, Nature Materials, Vol. 1, [searched on Jul. 10, 2003], Internet <URL: http://www.nature.com/naturematerials>"

DISCLOSURE OF INVENTION

However, according to technologies disclosed in Patent Documents 2 and 3, magnitude of optical anisotropy in a medium in each pixel changes due to an electric field generated between each data signal line (or a signal scanning line, or a common signal line) for supplying a voltage for gradation display to each pixel and an electrode provided in each pixel. This causes a problem of deterioration in display performance.

Namely, in a display element that includes a plurality of pixels and carries out display by changing magnitude of the optical anisotropy in the medium by application of the electric field to the medium in each pixel, for example, it is necessary to apply various voltages (voltages for gradation display) to other pixels during application of 0V voltage to one pixel. Accordingly, various voltages are applied successively to the data signal line. This produces an electric field between the data signal line and an electrode of a pixel to which 0V voltage is applied. This electric field induces a change in the magnitude of the optical anisotropy in the medium. As a result, in the pixel that, by nature, should be in a state showing an optical isotropy by or according to application of 0V voltage, the medium does not show the optical isotropy. This causes light leakage.

In order to prevent such light leakage, for example, as in a technology disclosed in Patent Document 4, cover a region where light leaks with a black matrix is considered. However, when a black matrix is formed so as to cover the region where light leaks, an aperture ratio of the display element deteriorates. This causes a problem such that the power consumption increases because it becomes necessary to use a strong backlight for obtaining an appropriate brightness.

Moreover, in order to prevent the light leakage as mentioned above, Patent Document 4 discloses that a counter electrode and a pixel electrode are provided on a lower substrate of a pair of substrates on which external surfaces polarizers are bonded. Patent Document 4 also discloses that, in the liquid crystal element whose scanning line and data signal line are formed further on the lower substrate, a rubbing direction of the lower substrate is arranged to be identical to (i) a direction of an electric field (noise field) between the data signal line and the pixel electrode or counter electrode, and (ii) a direction of an electric field between the scanning signal line and the pixel electrode or counter electrode. In other words, in this technology, prevention of light leakage, in a case where a noise field occurs, is attempted by making the rubbing direction identical with the direction of the noise field. Furthermore, by preventing light leakage due to the noise field, it is not necessary to provide, for preventing light leakage, a black matrix layer over a wide area. This can increase an aperture ratio relatively.

However, the liquid crystal display elements of Patent Document 4 uses a conventional liquid crystal material whose liquid crystal molecules, which are aligned in a rubbing direction of the lower substrate when no electric field is applied, are rotated together in alignment by electric field application. Thus, the problem of a slow response speed cannot be solved in the liquid crystal display elements of Patent Document 4.

Moreover, a rubbing process is indispensable in the technology of Patent Document 4. In the rubbing process, the alignment film made of a polymer such as polyimide is rubbed with a cloth or the like. Thus, the rubbing process is associated with fine dust and fine electric discharge (local discharge) which occurs due to high voltage static electricity. The dusts are a big problem in highly fine pixel electrodes and TFT forming processes in which film deposition, exposure, and etching are repeated. The local electric discharge would damage the alignment film, or cause disconnection or electrostatic discharge damage in a TFT and a transparent electrode such as ITO. On this account, it is desirable to omit the rubbing process that would cause such problems.

Moreover, the liquid crystal display apparatus disclosed in Patent Document 1 has a problem such that the orientation would be disturbed by an electric field that occurs locally in the vicinity of an electrode edge. Because orientation changes have a long correlation distance in conventional generally-used liquid crystal materials, such orientation disturbance would be spread out widely from the vicinity of the electrode edge to remote regions. This would cause deterioration in display performance.

The present invention is attained in view of the aforementioned problems. An object of the present invention is to provide a display element realizing a high display quality with an improved response speed and a higher transmissivity. Moreover, another object of the present invention is to provide a display element which is produced without a rubbing step thereby to prevent defects that would be caused by dusts or high voltage static electricity caused by rubbing process, and to reduce production cost.

In order to solve the problem mentioned above, in a display panel of the present invention including: a pair of substrates facing each other; a medium layer being sandwiched between the pair of substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates: the medium layer includes a medium that shows an optical anisotropy when no electric field is applied and that varies in terms of magnitude of optical anisotropy in response to application of the electric field; the data signal lines are provided so as to be parallel to each other; and the polarizers have absorption axial directions parallel or perpendicular to a direction in which the data signal lines are extended.

In the present invention, the wording "the medium varies in terms of magnitude of optical anisotropy in response to application of the electric field" indicates that the magnitude of the optical anisotropy is changeable in response to application of the electric field. More specifically, a shape of a refractive index ellipsoid is changeable in response to application of the electric field. That is, in the display panel according to the present invention, it is possible to realize different display states by utilizing change in the shape of the refractive index ellipsoid depending on whether the electric field is applied or not.

Namely, the refractive index in materials is not isotropic in general and differs depending on directions. This anisotropy in the refractive index, that is, optical anisotropy of the material is generally shown by the refractive index ellipsoid. In general, it is considered that a plane passing the origin and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction.

In a conventional liquid crystal element, when the optical anisotropy is discussed in terms of the refractive index ellipsoid, the different display states are realized by changing (rotating) a direction of a major axial direction of the refractive index ellipsoid of a liquid crystal molecule by application of electric field. Here, the shape (shape of cross section of the refractive index ellipsoid) of the refractive index ellipsoid is not changed (constantly ellipsoidal). On the other hand, in the present invention, the different display states are realized by changing the shape (shape of cross section of the refractive index ellipsoid) of the refractive index ellipsoid of the molecule constituting the medium.

In other words, in the conventional liquid crystal display element, the display operation is carried out by utilizing only the change in the orientation direction of the liquid crystal molecules due to rotation thereof caused by the electric field application. The liquid crystal molecules are rotated all together, in alignment in one direction. Thus, a viscosity inherent to the liquid crystal largely affects a responding speed. On the other hand, the liquid crystal element according to the present invention in which the display is carried out by utilizing the change in the modulation of the optical anisotropy in the medium is free from the problem that the viscosity inherent to the liquid crystal largely affects the responding speed, unlike the conventional liquid crystal display element. Thus, it is possible to realize a high responding speed. Moreover, the high responding speed allows the display panel to be used, for example, in a display apparatus of the field sequential color mode.

Moreover, in the display panel of the present invention, the medium is optically isotropic when no electric field is applied, and becomes optically anisotropic when an electric field applied thereon. In this specific case, the shape of the refractive index ellipsoid is spherical when no electric field is applied thereon, and is changed to an elliptical shape when an electric field is applied thereon. This allows performing display by changing the magnitude (orientational order, refractive index) of the optical anisotropy, thereby attaining a wider viewing angle property and a higher speed response property than those of the conventional liquid crystal display element in which the display is performed by changing the orientation direction of the liquid crystal molecules.

Moreover, according to the arrangement mentioned above, the absorption axial directions of the polarizers are parallel or orthogonal to the direction in which the data signal lines are extended. Because of this, a change in the magnitude of the optical anisotropy of the medium is induced by electric fields formed in respective spaces between the data signal lines and the electric field application means. As a result, it becomes possible to prevent light leakage from a region between the data signal lines and the electric field application means. This is because, even when the medium does not show optical isotropy, a direction of the induced optical anisotropy, that is, a direction of a major axis of a refractive index ellipsoid becomes parallel to or orthogonal to the absorption axial directions of the polarlizers. Therefore, it becomes not necessary to cover, with a black matrix, the region between the data signal lines and the electric field application means. This makes it possible to improve an aperture ratio of the display panel.

Unlike the conventional liquid crystal display elements using IPS mode or FFS mode, the medium used in the liquid crystal panel of the present invention is optically isotropic when no electric field is applied thereon, and becomes optically anisotropic when an electric field is applied thereon. Therefore, there is no need of aligning, by using an alignment film, the liquid crystal molecules so as to specify the alignment that the liquid crystal molecules have when no electric field is applied, unlike the conventional liquid crystal display elements. Thus, the alignment film is not essential in the display panel of the present invention. On this account, an alignment process such as a rubbing alignment process etc. is not necessary in the present invention. In the rubbing alignment process, the alignment film made of a polymer such as polyimide is rubbed with a cloth or the like. Thus, the rubbing alignment process is associated with fine dust and fine electric discharge (local discharge) which occurs due to high voltage static electricity. The dust is a big problem in highly fine pixel electrode forming processes and TFT forming processes in which film deposition, exposure, and etching are repeated. The local electric discharge would damage the alignment film, or cause disconnection or electrostatic discharge damage in TFT and transparent electrode such as ITO. In the display panel of the present invention, the rubbing alignment process, which is carried out in the conventional liquid crystal display elements, can be omitted. Thus, it is possible to prevent the problems of dust and local discharge which are caused by the rubbing alignment process. Further, the omission of the alignment process such as rubbing reduces production cost.

Compared with the conventional liquid crystal materials, a correlation distance in orientation change is shorter in the medium that is optically isotropic when no electric field is applied and whose magnitude of optical anisotropy is changeable in response to application of the electric field. Because of this, even if a large electric field is generated locally in the vicinity of an edge of the electrodes, orientation disturbance due to the large electric field will not be transmitted in a long distance. Therefore, the display panel of the present invention has a better prevention for deterioration, caused by orientation disturbance, in the display performance, compared with the conventional liquid crystal display apparatuses.

In order to solve the problem mentioned above, in another display panel of the present invention including: a pair of substrates facing each other; a medium layer being sandwiched between the pair of substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates: the medium layer includes a medium that shows an optical isotropy when no electric field is applied and that varies in terms of magnitude of optical anisotropy in response to application of the electric field; the scanning signal lines are provided so as to be parallel to each other; and the polarizers have absorption axial directions parallel or perpendicular to a direction in which the scanning signal lines are extended.

According to the arrangement mentioned above, the absorption axial directions of the polarizers are parallel or orthogonal to the direction in which the scanning signal lines are extended. Because of this, a change in the optical anisotropy of a medium is induced by electric fields formed in respective spaces between the scanning signal lines and the electric field application means. As a result, it becomes possible to prevent light leakage from a region between the scanning signal lines and the electric field application means. This is because, even when the medium does not show optical isotropy, a direction of the induced anisotropy, that is, a direction of a major axis of a refractive index ellipsoid becomes parallel to or orthogonal to the absorption axis directions of the polarizers. Therefore, it becomes not necessary to cover the region between the scanning signal lines and the electric field application means. This makes it possible to improve an aperture ratio of the display panel.

In the display panel of the present invention, the rubbing alignment process, which is carried out in the conventional liquid crystal display elements, can be omitted. Thus, it is possible to prevent the problems of dust and local discharge which are caused by the rubbing alignment process. Further, the omission of the alignment process such as rubbing reduces production cost.

In order to solve the problem mentioned above, in a still another display panel of the present invention including: a pair of substrates facing each other; a medium layer being sandwiched between the pair of substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates: the medium layer includes a medium that shows an optical isotropy when no electric field is applied and that varies in terms of magnitude of optical anisotropy in response to application of the electric field; the electric field application means includes a pair of electrodes one of which being connected to corresponding one of the data signal lines via an switching element that is turned ON and OFF in accordance with a signal supplied to corresponding one of the scanning signal lines; the other one of the pair of electrodes is connected to corresponding one of common signal lines; and the polarizers have absorption axial directions parallel or perpendicular to a direction in which the common signal lines are extended.

According to the arrangement mentioned above, the absorption axial directions of the polarizers are parallel or orthogonal to the direction in which the common signal lines are extended. Because of this, a change in the optical anisotropy of a medium is induced by electric fields formed in respective spaces between the common signal lines and the electric field application means. As a result, it becomes possible to prevent light leakage from a region between the common signal lines and the electric field application means. This is because, even when the medium does not show optical isotropy, a direction of the induced optical anisotropy, that is, a direction of a major axis of a refractive index ellipsoid becomes parallel to or orthogonal to the absorption axial directions of the polarizers. Therefore, it becomes not necessary to cover the region, with a black matrix, between the common signal lines and the electric field application means. This makes it possible to improve an aperture ratio of the display panel.

In the display panel of the present invention, the rubbing alignment process, which is carried out in the conventional liquid crystal display elements, can be omitted. Thus, it is possible to prevent the problems of dust and local discharge which are caused by the rubbing alignment process. Further, the omission of the alignment process such as rubbing reduces production cost.

A direction in which the common signal lines are extended may be arranged to be parallel or perpendicular to a direction in which at least either the scanning signal lines or the data signal lines are extended.

According to the arrangement mentioned above, the absorption axial directions of the polarizers are parallel or orthogonal to the direction in which the common signal lines are extended. Moreover, the absorption axial directions of the polarizers are parallel to or orthogonal to a direction in which at least either the scanning signal lines or the data signal lines are extended. As a result, it becomes possible to prevent light leakage from a region between the common signal lines and the electric field application means. Moreover, it also becomes possible to prevent light leakage from a region between the scanning signal lines and/or data signal lines and the electric field application means. This further reduces an area that needs to be covered with a black matrix. This makes it possible to further improve an aperture ratio of the display panel.

Moreover, (i) in an arrangement in which the absorption axial directions of the polarizers are parallel or orthogonal to the direction in which the data signal lines are extended or (ii) in an arrangement in which a direction in which the common signal lines are extended is parallel or perpendicular to a direction in which at least either the scanning signal lines or the data signal lines are extended, a direction in which the data signal lines are extended may be arranged to be perpendicular to a direction in which the scanning signal lines are extended.

In this case, the absorption axial directions of the polarizers are parallel or orthogonal to the directions in which the data signal lines and scanning signal lines are extended. Alternatively, the absorption axial directions of the polarizers are parallel to or orthogonal to directions in which the data signal lines, the scanning signal lines, and the common signal lines are extended. As a result, it becomes possible to further reduce a region from which light leakage occurs. This further reduces an area that needs to be covered with a black matrix. This makes it possible to further improve an aperture ratio of the display panel.

It may be arranged that a black matrix having a width equal to or less than widths of the signal lines is formed in a region where the black matrix overlaps the signal lines that are parallel or perpendicular to absorption axial directions of the polarizers when viewed from a normal direction of the substrate plane, the region being on at least one of the pair of substrates.

According to the arrangement, light leakage due to disturbance in the orientation of the medium can be prevented with the black matrix. Moreover, light leakage is prevented in a region between the electric field application means and the signal lines that are parallel to or perpendicular to the absorption axial directions of the polarizers. This makes it possible to attain a sufficient effect of preventing light leakage even when the width of the black matrix to cover the signal lines is arranged to be equal to or less than the widths of the signal lines. This allows a black matrix having a narrow width to effectively provide an effect of preventing light leakage and, consequently, prevent decrease in an aperture ratio. Preferable widths of the signal lines and the black matrix are 100 μm or less.

The electric field application means may be arranged so as to include a plurality of electrodes on one substrate; and an electric field is applied to the medium layer by applying an electric field between the plurality of the electrodes.

According to the arrangement, the magnitude of the optical anisotropy of the medium may be changed by applying an electric field to the medium.

Moreover, the electric field application means may be arranged to include first and second electrodes; the first and second electrodes are transparent electrodes and insulated from each other by an insulating film; and a distance between the first and second electrodes is shorter than a distance between the pair of substrates.

According to the arrangement, a distance between the first and second electrodes is short. This allows a fringe electric field to occur and makes it possible to change the magnitude of the optical anisotropy of the medium in the regions above the electrodes (i.e., regions that overlap the first and second electrodes when viewed in the normal direction of the substrate plane). Moreover, the first and second electrodes are transparent electrodes. This allows the regions above the electrodes to be utilized as display. Thus, this improves a transmissivity of the display panel.

Further, the electric field application means may be arranged so as to apply the electric field in two or more electric field application directions when viewed in the normal direction of the substrate plane.

According to the arrangement, it becomes possible to form a plurality of domains (minute regions) in which the medium shows different optical anisotropy directions, respectively. This improves the viewing angle property of the display panel.

Moreover, in this case, it is preferable that two of the electric field application directions make an angle of 90 degrees±less than 20 degrees therebetween. This makes it possible to form two domains in which the medium shows optical anisotropy in directions that cross each other substantially orthogonally. This makes it possible to compensate for the coloring phenomenon at oblique viewing angle in one domain with that in the other domain. Thus, it is possible to improve the viewing angle property without sacrificing the transmissivity.

It is preferable that each of the electric field application directions makes an angle of 45 degrees±less than 10 degrees with each of the absorption axial directions of polarizers.

When the direction of the electric field application, namely, the optical anisotropy is at an angle of $\pm\theta$ (degrees) with respect to the absorption axial directions of the polarizers, the transmissivity (P) can be estimated by using an equation $P(\%)=\sin^2(2\theta)$. Therefore, a maximum transmissivity is attained when the direction of the optical anisotropy makes 45 degrees with the absorption axial directions of the polarizers. Where it is put that the transmissivity at $\theta=45$ degrees is 100%, the brightness appears as 100% to human eyes when the transmissivity is about 90% or higher (for the human eyes, brightness of about 90% transmissivity or higher seems to be equivalent to the maximum brightness). Therefore, if 35 degrees<$\theta$<55 degrees, substantially maximum brightness for the human eyes is attained or the human eyes sense that the maximum brightness is attained. Therefore, a high transimissivity can be realized.

The electric field application means may be arranged to include comb-shaped electrodes. Here, the "comb-shaped electrodes" are electrodes having a structure such that a plurality of electrodes (e.g., tooth portions) are extended from one electrode (comb-base portion) in a certain direction with respect to the longitudinal of the one electrode (comb-base portion). The tooth portions may have a wedge-like shape that is bent at a predetermined angle to form zigzag shapes. With the use of a pair of electrodes whose wedge-like shaped tooth portions are arranged to interleave each other, it becomes possible to apply electric fields in at least two directions.

Moreover, the medium may have an orientational order (orderly structure) smaller than a visible light wavelength when no electric field is applied thereon. With an orientational order smaller than the visible light wavelength, the medium shows optical isotropy. Therefore, the use of a medium whose orientational order becomes smaller than visible light wavelength when no electric field is applied thereon makes it possible to have transmissivity that changes more largely between when the electric field is applied and when no electric field is applied.

It is preferable that a selective reflection wavelength band or a helical pitch of the medium be not more than 400 nm.

When the helical pitch of the medium is greater than 400 nm, the medium would appear in a color that is caused by the helical pitch. That is, in the medium having the helical pitch of greater than 400 nm, the light of the wavelength of the same order as the helical pitch is selectively reflected (i.e., selective reflection). The display color of the display panel would be influenced by the color being caused by the helical pitch.

Such coloring can be prevented by arranging such that the selective reflection range or helical pitch of the medium is 400 nm or less. That is, it is possible to prevent the problem of the coloring by the arrangement as mentioned above, because the light of 400 nm or less is almost undetectable for human eyes and does not cause a problem of coloring as mentioned above.

The medium may include a liquid crystalline material. Moreover, the medium layer may contain a polymerized compound. Further, the medium may be made of molecules showing a cholesteric blue phase.

A display apparatus of the present invention includes any one of display panels mentioned above. Therefore, the display apparatus of the present invention can realize a high transmissivity property, a high-speed response property, and a wide viewing angle property.

As mentioned above, the display panel of the present invention includes a medium layer containing a medium that shows optical isotropy when no electric field is applied thereon and that varies in terms of magnitude of optical anisotropy in response to application of the electric field. Moreover, the absorption axial directions of polarizers are parallel to or perpendicular to a direction in which at least one of the data signal lines, the scanning signal lines, and the common signal lines are extended.

Accordingly, the liquid crystal element of the present invention is free from the problem that the viscosity inherent to the liquid crystal largely affects the responding speed, unlike the conventional liquid crystal display element. Thus, it is possible to realize a wider viewing angle property and a higher speed response property than those of the conventional liquid crystal display element in which the display is performed by changing the orientation direction of the liquid crystal molecules.

Moreover, a change in the magnitude of the optical anisotropy of a medium is induced by electric fields formed in a region between the data signal lines, the scanning signal lines, or the common signal lines, and the electric field application means. As a result, it becomes possible to prevent light leakage from the region. This is because, even when the medium does not show optical isotropy, a direction of the induced optical anisotropy becomes parallel to or orthogonal to the absorption axial directions of the polarizers. Therefore, it becomes not necessary to cover, with a black matrix, the region. This makes it possible to improve an aperture ratio of the display panel.

Further, in the display panel of the present invention, the rubbing alignment process, which is carried out in the conventional liquid crystal display elements, can be omitted. Thus, it is possible to prevent the problems of dust and local discharge which are caused by the rubbing alignment process. Further, the omission of the alignment process such as rubbing reduces production cost.

A display apparatus of the present invention includes the display panel described above. Therefore, the display apparatus of the present invention can realize a high transmissivity property, a high-speed response property, and a wide viewing angle property.

BRIEF DESCRIPTION OF DRAWINGS

FIG. 5(a) illustrates the pixels when no electric field is applied.

FIG. 5(b) illustrates the pixels when an electric field is applied.

FIG. 6(a) illustrates the pixels when no electric field is applied.

FIG. 6(b) illustrates the pixels when an electric field is applied.

FIG. 14(a) illustrates the display panel when no electric field is applied.

FIG. 14(b) illustrates the display panel when an electric field is applied.

FIG. 15 is an explanatory view schematically illustrating differences between the display panel of the present invention and conventional liquid crystal display elements in terms of display principle.

FIG. 16 illustrates the refractive index ellipsoid when an electric field is applied.

REFERENCE NUMERALS

30 Lower Substrate
32 Counter Electrodes
32b Tooth Portions
33 Insulating Film
34 Pixel Electrodes
34a Comb-Base Portion
34b Tooth Portions
35 Medium Layer
35a Refractive Index Ellipsoid
36 Upper Substrate
37, 38 Polarizers
37a, 38a Absorption Axial Directions
39 Color Filter
40 Black Matrix
41 Scanning Signal Lines
42 Common Signal Lines
47 Data Signal Lines
49a, 49b Electric Field Application Directions
50 Switching Element
60 Display Apparatus 70 Display Panel
71 Pixel
81 Direction of Noise Field
82 Rubbing Direction

BEST MODE FOR CARRYING OUT THE INVENTION

One embodiment of the present invention is explained below.

(1. Configuration of Display Panel 70)

Figure 2:
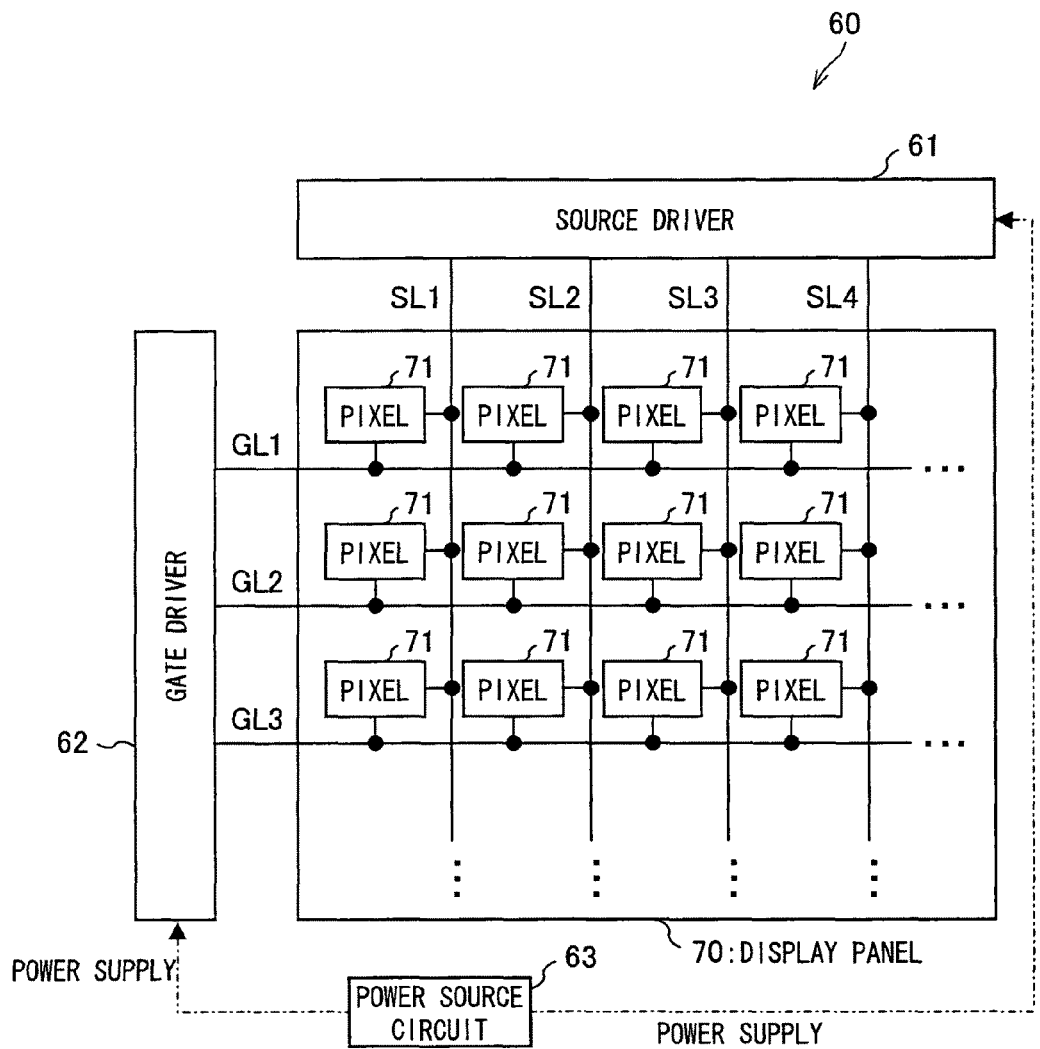
FIG. 2 is a block diagram illustrating a schematic configuration of various parts of a display apparatus in accordance with one embodiment of the present invention.
Figure 3:
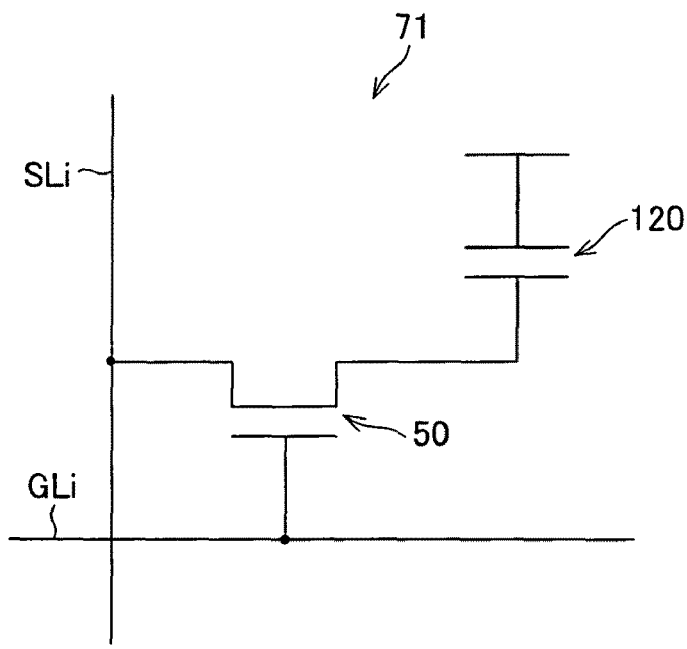
FIG. 3 is a schematic diagram illustrating a configuration of a pixel of the display panel in accordance with the embodiment of the present invention.

FIG. 2 is a block diagram illustrating a schematic configuration of various parts of a display apparatus 60 according to the present embodiment. FIG. 3 is a schematic diagram schematically illustrating a configuration of a pixel 71 in a display panel 70 in accordance with the present embodiment. The display apparatus 60 includes the display panel (display element) 70 as well as driving circuits, data signal lines, scanning lines, switching elements, and the like.

As illustrated in FIG. 2, the display apparatus 60 according to the present embodiment is provided with a display panel 70 in which pixels 71 are arranged in a matrix, a source driver 61 and a gate driver 62 as driving circuits, a power source circuit 63, and the like.

Each pixel 71 is, as illustrated in FIG. 3, provided with a pixel capacitor 120 and a switching element 50.

Moreover, the display panel 70 is provided with a plurality of data signal lines SL1 to SLn (n is an arbitral integer not less than 2), and a plurality of scanning signal lines GL1 to GLm (m is an arbitral integer not less than 2) each crossing with the data signal lines SL1 to SLn at any angle that may or may not be orthogonal. The pixels 71 are provided corresponding to respective combinations (respective intersections) of the data signal lines SL1 to SLn and the scanning signal lines GL1 to GLm.

The power source circuit 63 supplies a voltage to the source driver 61 and the gate driver 62 in order to cause the display panel 70 to perform display operation. By using the voltage, the source driver 61 drives (addresses) the data signal lines SL1 to SLn in the display panel 70. Meanwhile, by using the voltage, the gate driver 62 drives (addresses) the scanning signal lines GL1 to GLm in the display panel 70.

The switching element 50 may be, for example, an FET (Field Effect Transistor), a TFT (Thin Film Transistor), or the like. The switching element 50 is connected to the scanning signal line GLi via its gate electrode 52, and to the data signal line SLi via its drain electrode 53. Further, the switching element 50 is connected with the pixel capacitor 120 via its source electrode 54. The other end of the pixel capacitor 120 is connected to a common signal line (common electrode line: not illustrated), which are commonly connected with all the pixels 71. With this arrangement, each pixel 71 works as follows: the switching element 50 is turned ON in the pixel 71 when a scanning signal line GLi (i is an arbitral integer not less than 1) is selected. Then, a signal voltage determined in accordance with a display data signal inputted from a controller (not illustrated) is applied on the pixel capacitor 120 via the data signal line SLi (i is an arbitral integer not less than 1) from the source driver 61. While the switching element 50 is OFF after the period in which the scanning signal line GLi is selected is ended, the pixel capacitor 120, ideally, keeps holding the voltage that it has when the switching element 50 is turned OFF.

Figure 4:
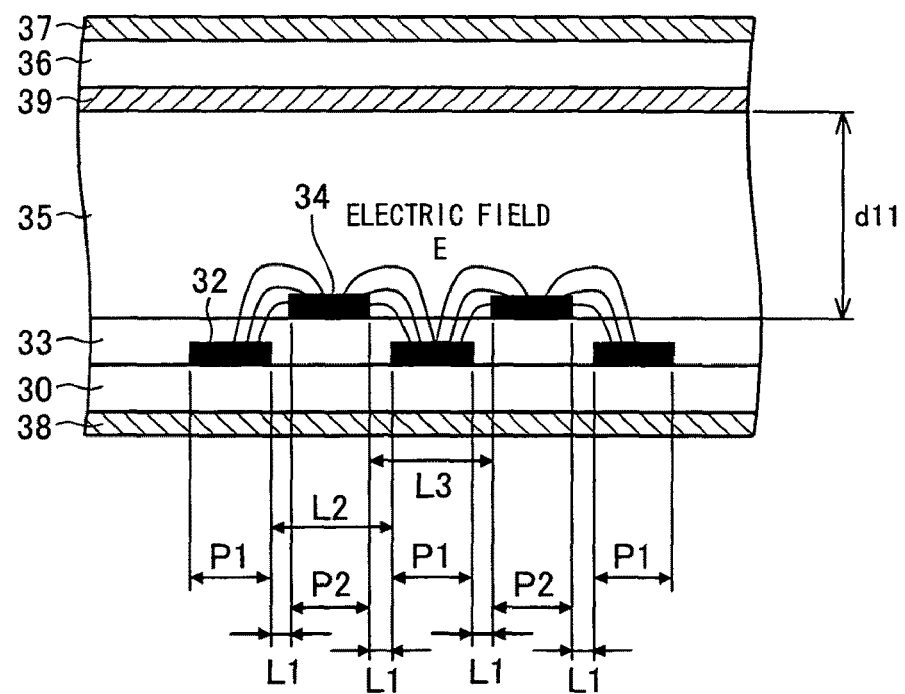
FIG. 4 is a cross-sectional view illustrating a configuration of a pixel of the display panel in accordance with the embodiment of the present invention.

FIG. 4 is a cross-sectional view schematically illustrating configuration of various parts of the display panel 70. As illustrated in FIG. 4, the display panel 70 has a structure such that a medium layer 35 is sandwiched between two substrates (lower substrate 30 and upper substrate 36) facing each other. The medium layer 35 is an optical modulation layer.

The lower substrate 30 and the upper substrate 36 are transparent substrates such as glass substrates or the like. The glass substrates may be provided with, for example, a protecting film (not illustrated) thereon in order to prevent permeation of alkali ion. Moreover, the medium layer 35 is formed by bonding the lower substrate (pixel substrate) 30 and the upper substrate (counter substrate) 36 together with a spacer (not illustrated: e.g., a plastic beads, glass fiber spacer, or the like) therebetween by using a sealing agent (not illustrated) in such a manner that the sealing agent surrounds a pixel region, and then sealing a medium A in a gap thus formed between the substrates 30 and 36.

The medium A may be a medium that shows optical isotropy when no electric field is applied thereon, and the medium varies in terms of magnitude of optical anisotropy in response to application of the electric field. In the present embodiment, the medium A is a mixture containing the following compounds at the ratio as described below.

JC-1041xx (50.0 wt %)
5CB (38.5 wt %)
ZLI-4572 (11.1 wt %)

JC-1041xx (made by Chisso Corporation) is a nematic liquid crystal mixture. 5CB ((4-cyano-4'-pentylbiphenyl) made by Aldrich) is a nematic liquid crystal. ZLI-4572 (made by Merck Ltd.) is a chiral agent. Samples of the above composition showed phase transition from an isotropic phase to optically anisotropic phase at a temperature of approximately 53° C. The following is the chemical structural formula of 5CB:

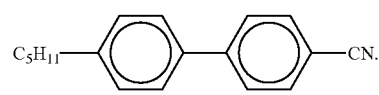

(1)

The lower substrate 30 and the upper substrate 36 have a cell gap of d11 therebetween. On the facing surface (facing side) of the lower substrate 30 which surface faces the upper substrate 36, counter electrodes (first electrodes) 32 and pixel electrodes (second electrodes) 34, which are insulated from the lower substrate 30 via an insulating film 33, are provided. On the facing surface (facing side) of the lower substrate 30 which surface faces the upper substrate 36, the data signal lines and scanning signal lines (not illustrated) are also provided. Moreover, on a facing surface (facing side) of the upper substrate 36 which surface faces the lower substrate 30, a color filter 39, and a black matrix (not illustrated) are formed. The black matrix has the same width as the scanning signal lines so that the black matrix can overlap the scanning signal lines when viewed in the normal direction of the substrate plane. Further, on external surfaces of the lower substrate 30 and the upper substrate 36 which surfaces are on reverse sides of the facing surfaces, polarizers 37 and 38 are provided.

Figure 1:
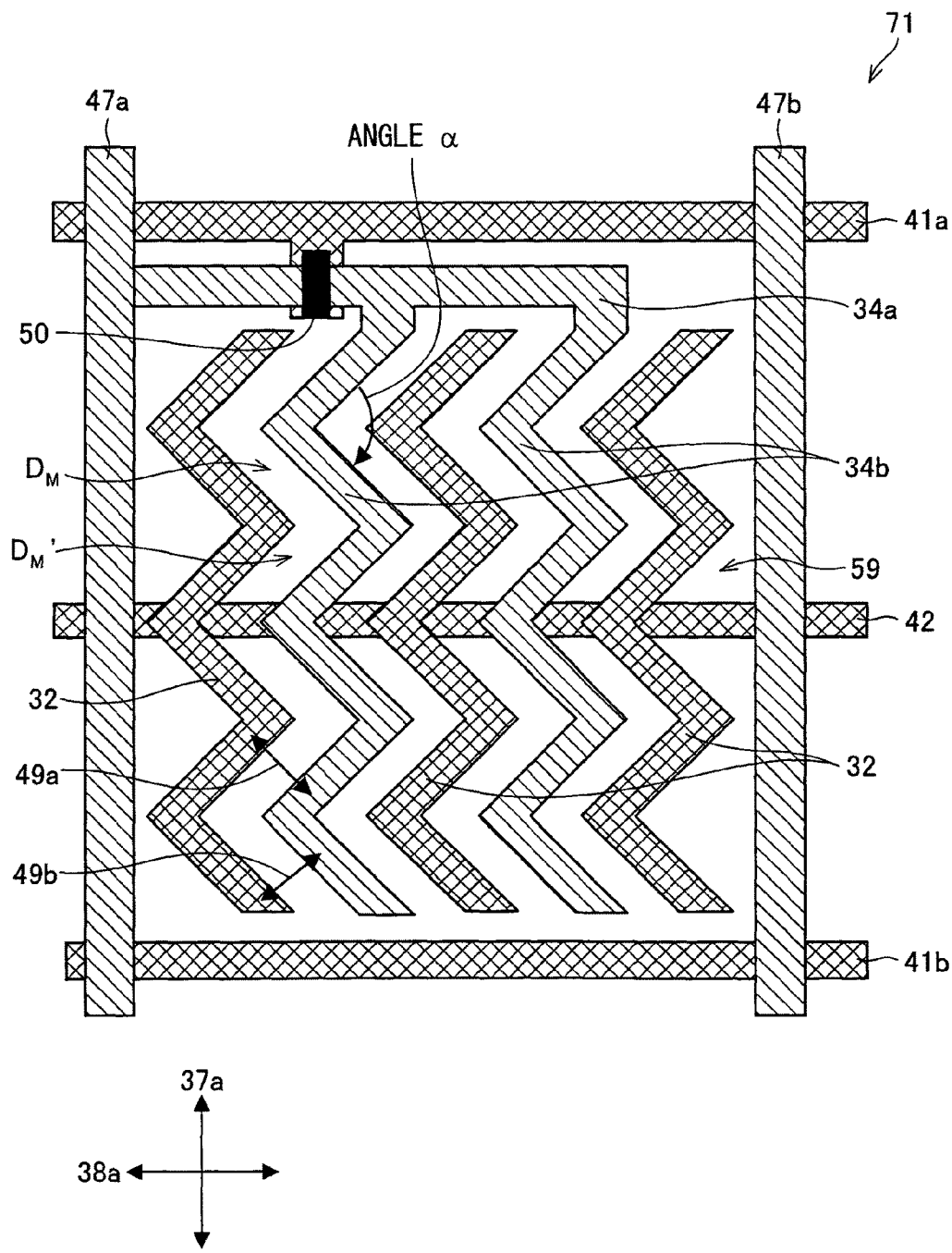
FIG. 1 is a plan view illustrating a schematic configuration of various parts of a display panel in accordance with one embodiment of the present invention.

FIG. 1 is a plan view illustrating a configuration of one pixel when viewing the lower substrate 30 from the upper substrate 36. As illustrated in FIG. 1, a large number of the scanning signal lines 41 (41a, 41b, . . . ) are arranged in substantially parallel to each other at constant intervals therebetween on the lower substrate 30. Moreover, a large number of the data signal lines 47 (47a, 47b, . . . ) are arranged in substantially parallel to each other at constant intervals therebetween to be orthogonal with respect to the scanning signal lines 41, on the lower substrate 30. Moreover, unit pixels are provided per region segmented by a pair of scanning signal lines 41 and a pair of data signal lines 47. Moreover, the scanning signal lines 41 and the data signal lines 47 are insulated from each other by the insulating film 33 (see FIG. 4) provided between the scanning signal lines 41 and the data signal lines 47.

Moreover, as illustrated in FIG. 1, the TFT 50, which acts as a switching element, is provided in the vicinity of an intersection of a scanning signal line 41 and a data signal line 47. A storage capacitance (pixel capacitance) of each pixel is generated between the each counter electrode 32 and each pixel electrode 34. The storage capacitance acts for holding a data signal in one frame.

A common signal line 42 is extended between a pair of scanning signal lines 41 substantially in parallel to the scanning signal lines 41. The scanning signal lines 41, the common signal lines 42, and the data signal lines 47 are made of any one of highly conductive metals: Al, Mo, Ti, W, Ta, Cr, Nd, and Cu, or an alloy of two or more of these metals. In the present embodiment, MoW alloy is used.

The scanning signal lines 41 have a width smaller than a distance between the scanning signal line 41 and the common signal line 42.

The pixel electrode 34 is formed in each unit pixel region on the lower substrate 30. The pixel electrode 34 is made of a transparent and conductive material (e.g., ITO, IZO, ZnO, or the like) and is a comb-shaped electrode (comb-teeth electrode) that has tooth portions each having a zigzag shape with a bending angle of angle α (α=90 degrees in the present embodiment. The present invention is not limited to this.). The "comb-shaped electrode" here means an electrode including a plurality of electrodes (tooth portions 34b) extending from one electrode (comb-base portion 34a) in a predetermined direction with respect to a longitudinal direction of this one electrode (comb-base portion 34a). A tip of the tooth portion may be connected to a tip of an adjacent tooth portion of the pixel electrode 34.

The counter electrodes 32 are formed in each unit pixel region of the lower substrate 30. In this embodiment, the counter electrodes 32 are formed on the same plane as the scanning signal lines 41, that is, on the lower substrate 30, and are electrically connected with the common signal line 42. The counter electrodes 32 are made of a transparent and electrically conductive material, like the pixel electrode 32, and are zigzag-shaped with a bending angle of α. A tip of the tooth portion may be connected to a tip of an adjacent tooth portion of the counter electrode 32.

The pixel electrode 34 and the counter electrodes 32 are interleaved with each other via the insulating film 33 as illustrated in FIG. 1 in a manner that their tooth portions are arranged in parallel. With this configuration, electric fields are applied on the medium layer 35 in two directions (first direction 49a and second direction 49b) with respect to the normal direction of the substrate plane as illustrated in FIG. 1. Thereby, domains (medium domains) $D_M$ and $D_M'$ in which the medium A shows optical anisotropy in different directions are formed.

As illustrated in FIG. 4, the counter electrodes 32 have a width of P1 in the in-plane direction and the pixel electrode 34 has a width of P2 in the in-plane direction. The width P2 of the tooth portions 34b of the pixel electrode 34 and the width P1 of the tooth portions 32b of the counter electrodes 32 are narrower than widths of electrodes in conventional IPS-mode liquid crystal display elements. Specifically, the widths of counter electrodes and pixel electrodes in the conventional IPS-mode liquid crystal display elements are approximately 10 μm to 20 μm. On the contrary, the widths P1 and P2 are in a range of 1 μm to 8 μm (more preferably in a range of 1 μm to 5 μm) in the display panel 70.

Moreover, the present embodiment is arranged so that the width P2 of the tooth portions 34b of the pixel electrode 34 is narrower than the width P1 of the tooth portions 32b of the counter electrodes 32, and the tooth portions 34b of the pixel electrode 34 are distanced from their adjacent tooth portions 32b of the counter electrodes 32 by distance L1. That is, a shortest distance between the tooth portions 34b and 32b is L1. Further, the present embodiment is arranged so that the distance L1 is shorter than the cell gap d11.

Moreover, the present embodiment is arranged such that, as illustrated in FIG. 1, absorption axial directions of the polarizers 37 and 38, which are respectively provided to the lower substrates 30 and the upper substrate 36, are orthogonal to each other, and orthogonal to or parallel to the direction in which the data signal lines 47 (47a and 47b) are extended, the direction in which the scanning signal lines 41 (41a and 41b) are extended, and the direction in which the common signal line 42 is extended.

Moreover, on that surface of the upper substrate 36 which surface faces the lower substrate 30, the color filter 39 and the black matrix 40 are formed. The black matrix 40 is formed so that the black matrix 40 overlaps the scanning signal lines 41, the common signal lines 42, and the data signal lines 47 when viewed from the normal direction of the substrate plane. The black matrix 40 has the same width as the scanning signal lines 41, the common signal lines 42, and the data signal lines 47. It should be noted that the present invention is not limited to this configuration. The width of the black matrix 40 may be narrower than those of the scanning signal lines 41, the common signal lines 42, and the data signal lines 47. The widths of the scanning signal lines 41, the common signal lines 42, and the data signal lines 47 are preferably not more than 100 μm. More specifically, preferable widths of the scanning signal lines 41, the common signal line 42, and the data signal lines 47 are selected in consideration of how large the display panel 70 is, and how many pixels 71 the display 70 has. For example, in a case where the display panel 70 has a size such that diagonal lines of the display panel 70 are less than 10 inches (25.4 cm) long, the width of the scanning signal lines 41 is preferably 15 μm or less, and the width of the data signal lines 47 is preferably 8 μm or less. Moreover, in a case where the display panel 70 has a size such that the diagonal lines of the display panel 70 are 10 inches (25.4 cm) or longer but less than 30 inches (76.2 cm), the width of the scanning signal lines 41 are preferably 30 μm or less, and the width of the data signal lines 47 is preferably 10 μm or less. In a case where the display panel 70 has a size such that the diagonal lines of the display panel 70 are 30 inches (76.2 cm) or longer but less than 50 inches (127 cm), the width of the scanning signal lines 41 is preferably 65 μm or less, and the width of the data signal lines 47 is preferably 20 μm or less.

(2. Production Method of Display Panel 70)

Next, an example of a production method of the display panel 70 is described below. Firstly, on the lower substrate 30, an ITO layer is vapor-deposited in a thickness in a range of 400 Å to 1200 Å. Then, on the ITO layer, a metal layer (e.g., MoW layer) is formed in a thickness in range of 2500 Å to 3500 Å. After that, photolithography is performed on the metal layer to pattern the metal layer in a prescribed pattern, thereby forming the scanning signal lines 41 and the common signal lines 42. Then, the ITO layer is patterned in a prescribed pattern, for example, in a comb-like shape as illustrated in FIG. 1, thereby forming the counter electrodes 32. The tooth portions 32b of the counter electrodes 32 are formed to have the constant width P1 and the constant distance L1 between each tooth portion. Moreover, the counter electrodes 32 are formed so as to be electrically connected with the common signal line 42. It should be noted that the present invention is not limited to the present embodiment in which the counter electrodes 32, the common signal line 42, and the scanning signal lines 41 are formed in the order described above. The counter electrodes 32, the common signal line 42, and the scanning signal lines 41 may be formed in other orders as appropriate. For example, the ITO layer may be formed after the formation of the metal layer.

Then, the insulating film (gate insulating film) 33 is formed above the counter electrodes 32, the common signal lines 42, and the scanning signal line 41. The gate insulating film 33 may be, for example, (i) a silicon oxide film, (ii) a silicon nitride film, (iii) a lamination film in which a silicon oxide film and a silicon nitride film are layered, (iv) a metal oxide film, or (v) the like film. The present embodiment is arranged so that the gate insulating film 33 is in a thickness in a range of 1000 Å to 7500 Å. It should be noted that the present invention is not limited to the present embodiment in which the gate insulating film of the TFT 50 and the insulating film for insulating the scanning signal lines 41 from the source bus lines 47 are formed by a common insulating film.

After that, a silicon film (whose crystal morphology is amorphous, polysilicon, or monocrystal) is vapor-deposited. Then, the silicon film is patterned in a prescribed pattern, thereby forming a channel layer of the TFTs 50.

Then, an ITO layer is vapor-deposited in a thickness in a range of 400 Å to 1200 Å. This ITO layer is then patterned thereby to form the pixel electrodes 34 so that the pixel electrodes 34 overlap the counter electrodes 32.

After that, a non-transparent metal film having a high electric conductivity is formed. For example, the non-transparent metal film is made of an alloy that contains one of, or two or more of Al, Mo, Ti, W, Ta, Cr, Nd, and Cu. In the present embodiment, the non-transparent metal film is made of MoW alloy and has a thickness in a range of 3500 Å to 5500 Å

Then, the non-transparent metal film is patterned thereby to form the data signal lines 47, and the drain and source electrodes of the TFTs 50.

After that, the upper substrate 36 and the lower substrate 30 are bonded together with a certain cell gap d11 therebetween. Then, the medium A is filled between the upper substrate 36 and the lower substrate 30. In a case where the medium A has a high viscosity, for example, it is possible to bond the upper substrate 36 and the lower substrate 30 together with a certain cell gap d11 therebetween after providing (e.g. by dropping or the like) the medium A onto one of the upper substrate 36 and the lower substrate 30.

After the bonding, the polarizers 37 and 38 are bonded respectively to the external surfaces of the upper substrate 36 and the lower substrate 30 which surfaces are on reverse sides to the facing surfaces thereof. In this way, the display panel 70 is accomplished.

(3. Effect of Display Panel 70)

As described above, the display panel 70 of the present embodiment is configured such that the scanning signal lines 41 and the data signal lines 47 cross each other orthogonally and the common signal lines 42 are parallel to the scanning signal lines 41. Further, the display panel 70 is configured such that the polarizer 37 provided to the upper substrate 36 and the polarizer 38 of the lower substrate 37 have absorption axial directions crossing each other orthogonally and the absorption axes of the polarizers 37 and 38 are orthogonal to or parallel to the directions in which the data signal lines 47, the scanning signal lines 41, and the common signal lines 42 are extended.

Because of this, it becomes possible to prevent light leakage, even when (i) a change in the optical anisotropy of the medium A is induced by the electric fields formed in respective spaces between (a) the data signal lines 47, the scanning signal lines 41, and the common signal lines 42 and (b) the pixel electrodes 34 and the counter electrodes 32 and (ii) the medium A does not show optical isotropy. This is because a direction of the induced anisotropy, that is, a direction of a major axis of a refractive index ellipsoid is parallel to or orthogonal to the absorption axes of the polarizers 37 and 38.

In order to prevent the light leakage, it is conventionally necessary that the respective regions between the signal lines (data signal lines, scanning signal lines, common signal lines) and the electrodes (pixel electrodes 34 and counter electrodes 32) be covered with the black matrix. On the contrary, the display panel 70 according to the present embodiment is such that the light can be prevented from leaking from the regions between the signal lines and the electrodes. Thus, it is not necessary to over the regions with the black matrix. This allows the black matrix to have a width equal to or less than that of the signal lines, and thus attain a better aperture ratio of the display panel.

In the present embodiment where the absorption axial directions of the polarizers 37 and 38 cross each other orthogonally and are orthogonal to or parallel to the directions in which the data signal lines 47, the scanning signal lines 41, and the common signal lines 42 are extended. However, the present invention is not limited to this as long as the absorption axial directions of the polarizers 37 and 38 cross each other orthogonally and are orthogonal to or parallel to at least one of the scanning signal lines 41, the data signal lines 47, and the common signal lines 42.

Moreover, unlike the conventional liquid crystal display elements of the IPS mode and FFS mode, the display panel 70 of the present embodiment employs a medium showing optical isotropy when no electric field is applied thereon, but showing optical anisotropy when an electric field is applied. Unlike the conventional liquid crystal display elements, this makes it unnecessary to specify with the alignment film the alignment of the liquid crystal molecules at the time when no electric field is applied. Thus, the alignment film is not essential in the display panel 70 according to the present embodiment. Namely, it becomes possible to omit the rubbing step which is necessary in the production process of the conventional liquid crystal display elements.

In the rubbing step (rubbing alignment process), the alignment film made of a polymer such as polyimide is rubbed with a cloth or the like. Thus, the rubbing step is associated with fine dust and fine electric discharge (local discharge) which occur due to high voltage static electricity. The occurrence of dust causes a big problem in highly fine pixel electrodes and TFT forming processes in which film deposition, exposure, and etching are repeated. The local electric discharge would damage the alignment film, or cause disconnection or electrostatic discharge damage in a TFT and a transparent electrode such as ITO.

On the contrary, the rubbing step can be omitted for the display panel 70 according to the present embodiment. Thus, the display panel 70 according to the present embodiment is free from such dust or local electric discharge problems because no dust nor local electric discharge occur therein. Moreover, the elimination of the rubbing step cuts the production cost.

The display panel 70 may be configured such that an alignment film (not illustrated) is applied on each facing surfaces of the upper substrate 36 and the lower substrate 30. In this case, for example, it is preferable that the direction of the alignment process (rubbing process or optical alignment) is parallel with one of the absorption axial directions of the polarizers 37 and 38. Such alignment process aligns, along the absorption axial direction of one of the polarizers, the molecules adsorbed on a surface of the substrates (alignment film). This alleviates light leakage that occurs during black display, thereby attaining a high contrast.

Moreover, the display panel 70 may be treated with an alignment process to align the liquid crystal molecules along the direction (electric field application direction) in which the electric field is applied by the pixel electrodes 34 and the counter electrodes 32. In this case, molecules in the vicinity of the alignment films can orient along the electric field application direction more easily. That is, the molecules can be more easily oriented when an electric field is applied, compared with the arrangement in which no alignment process is carried out. This reduces a driving voltage. It should be noted that the medium A used in the present embodiment shows optical isotropy when no electric field is applied thereon, and has a shorter correlation distance (a distance in which orientation is transferred intermolecularly) than the medium used in the conventional liquid crystal display element. Thus, the molecules are correlated over a relatively long distance in the conventional liquid crystal display element. Thus, the alignment process such as rubbing on the substrates on which the alignment films are formed causes the liquid crystal molecules in a wide range to orient together. However, the medium A has a short correlation distance of molecules compared with the medium of the conventional liquid crystal display element, as described above. Thus, the alignment films influence the molecules in a narrower range in the vicinity of the alignment films. Thus, the effect of the alignment process to reduce the driving voltage is smaller than that in the conventional liquid crystal display elements.

Furthermore, the display panel 70 according to the present embodiment is configured such that the pixel electrodes 34 having the width of P1 and the counter electrodes 32 having the width of P2 have the distance L1 therebetween so as to sandwich the insulating film 33, on the facing surface of the lower substrate 30 which surface faces the upper substrate 36. Moreover, the pixel electrodes 34 and the counter electrodes 32 are transparent electrodes.

In the conventional liquid crystal display element of IPS mode, it is necessary that a distance between the counter electrodes and the pixel electrodes be relatively larger than a cell gap in order to form an in-plane electric field. Specifically, if the cell gap is 4.5 µm, the distance between the counter electrodes and the pixel electrodes should be approximately 20 µm (i.e., about 4 times larger than the cell gap). On the contrary, the display panel 70 is configured such that the distance L1 between the tooth portions 32b of the counter electrodes 32 and the tooth portions 34b of the pixel electrodes 34 is shorter than the cell gap d11. For example in a case where the unit pixel is in a size of 330 µm×110 µm, it is preferable that the distance L1 be not less than 0.1 µm and not more than 5 µm. Moreover, the cell gap d11 is preferably not less than 2 µm but not more than 20 µm, and more preferably not less than 2.5 µm but not more than 12 µm. If the cell gap d11 is too narrow, production becomes more difficult with a poor yield rate thereby resulting in a higher production cost. Further, if the cell gap d11 is too thick, an amount of the medium A is increased thereby resulting in a higher production cost. In other words, the distance L1 between the counter electrodes 32 and the pixel electrodes 34 should be equal to or less than 2.5 times as large as the cell gap.

With the electrode configuration, the distance L1 between the electrodes can be shortened. Further, formed is a parabolic fringe electric field having a larger curvature and radius than those in the conventional configuration. Thus, this electrode configuration allows induction of a change in magnitude of the optical anisotropy of the medium A in the regions above each electrode (i.e., the regions which overlap the counter electrodes and the pixel electrodes when viewed from the normal direction of the substrate plane). That is, when an electric field is applied, equipotential lines are also formed on the region above the counter electrodes 32 and the pixel electrodes 34, in addition to the regions between the counter electrodes 32 and the pixel electrodes 34. Therefore, the electric field application can induce a change in the magnitude of the optical anisotropy of the medium A in the regions above each electrode. This gives the display panel 70 a better aperture ratio.

The width P1 of the tooth portions 23b of the counter electrodes 32 and the width P2 of the tooth portions 34b of the pixel electrodes 34 are appropriately designed so that it becomes possible to change the magnitude of the optical anisotropy of the medium A on the regions above the tooth portions 32b of the counter electrodes 32 and the tooth portions 34b of the pixel electrodes 34. It is preferable that the widths P1 and P2 are designed to be narrower than typical electrode widths in the conventional liquid crystal display apparatuses.

Specifically, in the conventional liquid crystal display elements of the IPS mode, for obtaining an electric field necessary to carry out display operation, the widths of the counter electrodes and the pixel electrodes should be approximately 10 µm to 20 µm in a case where the unit pixel has a size of 330 µm×110 µm. On the contrary, in the display panel 70, the width P1 of the tooth portions 32b of the counter electrodes 32 and the width P2 of the tooth portions 34b of the pixel electrodes 34 are preferably in a range of 1 µm to 8 µm, and more preferably in a range of 1 µm to 5 µm.

The configuration in which both the electrodes have such widths makes it possible to induce a change in the magnitude of the optical anisotropy of the entire medium A in the regions above the tooth portions 32b of the counter electrodes 32 and the tooth portions 34b of the pixel electrodes 34 (i.e., the regions that overlap the tooth portions 32b of the counter electrodes 32 and the regions that overlap the tooth portions 34b of the pixel electrodes 34 when viewing these electrodes in the normal direction of the substrate plane) by a parabolic electric field formed between the counter electrodes 32 and the pixel electrodes 34. In other words, if the tooth portions 32b and 34b were too narrow or too wide, the electric field applied on the regions above these electrodes would become so week in intensity that a change in the magnitude of the optical anisotropy of the medium A cannot be induced in all the regions above these electrodes (the regions when viewing these electrodes in the normal direction of the substrate plane).

Figure 14:
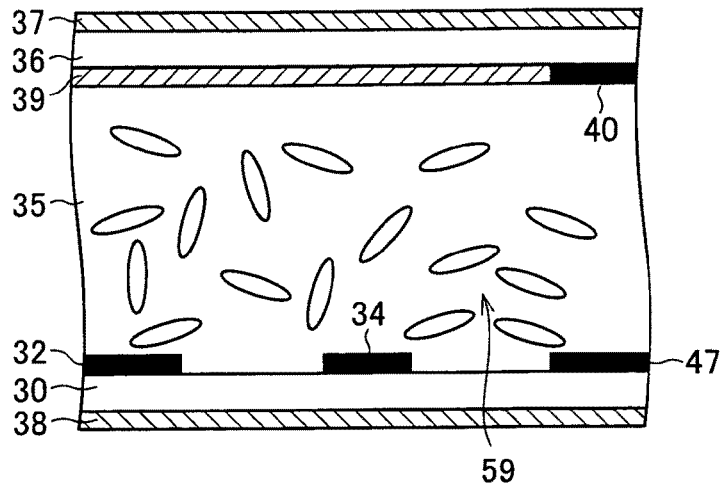
FIG. 14(a) is a cross-sectional view schematically illustrating a state of the display panel according to the embodiment of the present invention.
FIG. 14(b) is a cross-sectional view schematically illustrating a state of the display panel according to the embodiment of the present invention.
FIG. 14(c) is a graph in which applied voltage is plotted against transmissivity in the display panel according to the embodiment of the present invention.
Figure 14:
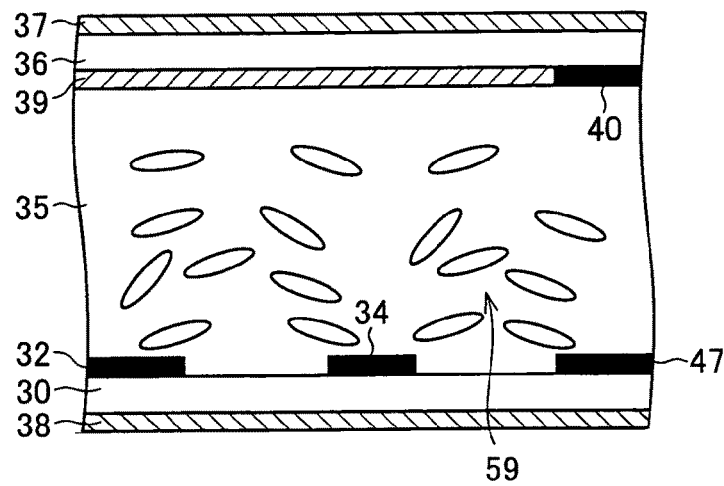
Figure 14:
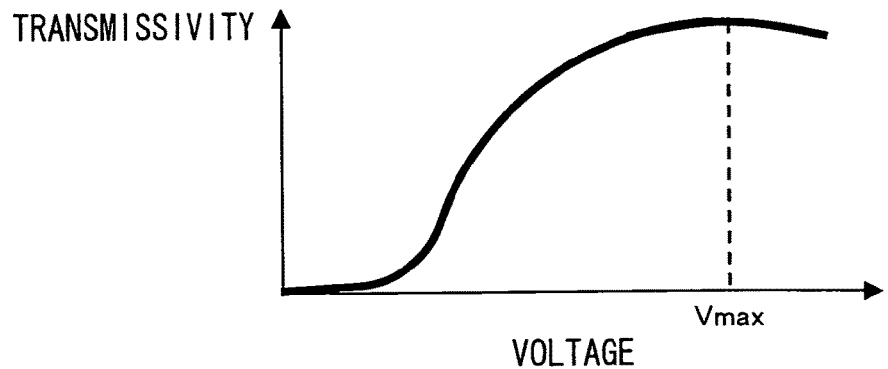

What is meant by the expression "it is possible to induce a change in the magnitude of the optical anisotropy of all the medium A existing above these electrodes" is that, when a voltage Vmax at which a maximum transmittance is attained on a voltage-transmissivity curve that is obtained by application of an electric field between the electrodes and shown in FIG. 14(c) is applied, the magnitude of the optical anisotropy of the medium A is different at least partially in the normal direction of the substrate plane in the medium layer 35 in all the regions above these electrodes from the magnitude attained when no voltage is applied (i.e., it is not required that the magnitude of the optical anisotropy be different at all positions in the normal direction of the substrate plane in the medium layer 35 in all the regions above the electrodes from the magnitude attained when no voltage is applied).

Moreover, the present invention is not limited to the present embodiment where the width P2 of the tooth portions 34b of the pixel electrodes 34 are narrower than the width P1 of the tooth portions 32b of the counter electrodes 32. The widths P1 and P2 of the tooth portions 32b and 34b of these electrodes 32 and 34 may be identical with or different from each other. However, it is preferable that the width P2 of the tooth portions 34b of the pixel electrodes 34 be 0.2 to 4 times greater than the width P1 of the tooth portions 34b of the pixel electrodes 34. This ratio between the widths P1 and P2 makes it possible to change the magnitude of the optical anisotropy of the medium A appropriately in the regions above the tooth portions 32b of the counter electrodes 32 and the regions above the tooth portions 34b of the pixel electrodes 34 by the electric field application.

(4. Modifications of Display Panel 70)

Figure 7:
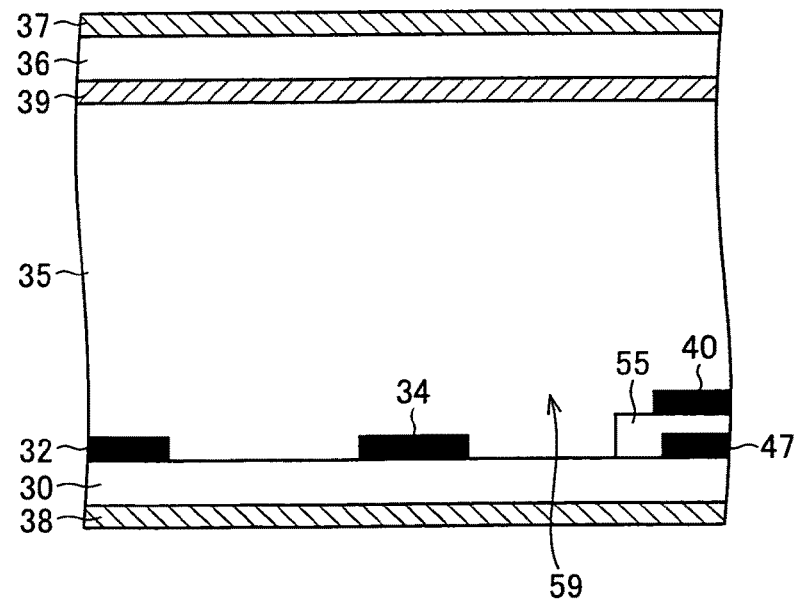
FIG. 7 is a cross-sectional view illustrating a modification of the configuration of a pixel of the display panel in accordance with the embodiment of the present invention.

The present invention is not limited to the present embodiment in which the black matrix 40 is provided to the upper substrate 36. The black matrix 40 may be provided to the lower substrate 30. For example, as illustrated in FIG. 7, the black matrix 40 may be formed on an insulating film 55 provided above the data signal lines 47 (on a side provided with the upper substrate 36) in such a manner that the black matrix 40 covers the data signal lines 47. In a case where the black matrix is provided to the upper substrate 36, the black matrix should be formed with a certain margin in case where accuracy is low in bonding the upper substrate 36 and the lower substrate 30. The aperture ratio becomes lower accordingly for the margin. On the other hand, in a case where the black matrix is provided to the lower substrate 30, the margin for bonding can be omitted. Thus, the aperture ratio is improved accordingly due to the omission of the margin. This leads to a better transmissivity.

In the configuration of the present embodiment, the counter electrodes 32 and the pixel electrodes 34 are comb-shaped electrodes having a plurality of tooth portions in a zigzag shape (saw-toothed shape) bent at a bending angle (saw-tooth angle) a. The "saw-toothed shape (wedge-like shape, chevron shape)" refers to a shape whose tooth portions 34b are extended away from a longitudinal direction of the comb-base portion 34a, the tooth portions 34b bending in two directions alternately at the saw-tooth angle α, as illustrated in FIG. 1. In other words, the "saw-tooth shape" may be referred to as a shape made up with L-shaped constituents. Thus, the "saw-tooth shape" may be referred to as a shape whose L-shaped constituents each of which corresponds to "tooth unit" and is aligned away from the longitudinal direction of the comb-base portion. Moreover, the "saw-tooth shape of the tooth portions" may be referred to as a shape of the tooth portions which is made of L-shaped constituents aligned to form zigzag lines. Moreover, the saw-tooth shape may be referred to as a shape made up with V-shaped constituents. Thus, the "saw-tooth shape" may be referred to as a shape whose V-shaped constituents, corresponding to "tooth unit", are aligned away from the longitudinal direction of the comb-base portion. Moreover, the "saw-tooth shape of the tooth portions" may be referred to as a shape of the tooth portions which is made of V-shaped constituents aligned to form zigzag lines.

Furthermore, in the present embodiment, the tooth portions of the counter electrodes 32 and the pixel electrodes 34 are arranged in parallel to each other so as to sandwich the insulating film 33 therebetween. With this configuration, an electric field is applied on the medium layer 35 in two directions (first direction 49a and second direction 49b) when viewed from the normal direction of the substrate plane. This forms domains (medium domains) $D_M$ and $D_M'$ in which the directions the optical anisotropy of the medium A are different from each other.

That is, the display panel 70 according to the present embodiment includes: the data signal lines 47; the scanning signal lines 41; the TFTs 50 (switching elements) at least one of which is provided corresponding to each intersection of the data signal lines 47 and the scanning signal lines 41; the pixel electrodes 34 being respectively connected to the TFTs 50 and having a comb-like shape with tooth portions 34b; and the counter electrodes 32 having tooth portions 32b that interleave with the tooth portions 34b, the tooth portions 32b and tooth portions 34b being in a zigzag shape (wedge-like shape) that bends at a curving angle (bending angle) of 90 degrees, whereby in each pixel 71, an electric field is applied in two or more directions that make 90 degrees therebetween in order to form at least two domains (minute regions) $D_M$ and $D_M'$ in the medium layer 35.

By forming the counter electrodes 32 and the pixel electrodes 34 so that the electric fields are applied in two or more directions, it becomes possible to form medium domains in which the medium A shows the optical anisotropies in different directions, respectively, in the medium layer 35. This improves the display panel 70 in terms of its viewing angle property.

In a case where the counter electrodes 32 and pixel electrodes 34 are formed so that the electric fields are applied in two or more directions, it is preferable that at least two directions in which the electric fields are applied be orthogonal to each other. With this configuration, it is possible to form medium domains such that the optical anisotropy of the medium A in one of the medium domains is orthogonal to (makes 90 degrees with) the optical anisotropy of the medium A in another one of the medium domains. This makes it possible to compensate for (canceling out) coloring phenomenon in a diagonal viewing angle in one medium domain with the other medium domain. Thus, this configuration further improves the viewing angle property without sacrificing the transmissivity.

Moreover, the electric field application directions 49a and 49b cross each other orthogonally and make 45 degrees with the absorption axial directions 37a and 38b of the polarizers 37 and 38, respectively, in the configuration illustrated in FIG. 1. This configuration allows better compensation for the coloring phenomenon in the diagonal viewing angle, and thus further improves the viewing angle property.

The display panel 70 can function as a shutter-type display panel in which the transmissivity of the medium layer 35 is changed by the optical anisotropy of the medium A that occurs due to an increase in magnitude of orientational order along the electric field application direction. The transmissivity (P) can be estimated by using an equation $P(\%)=\sin^2(2\theta)$ when the direction of the optical anisotropy in each of the medium domains of the medium A exists at an angle of $\pm\theta$ (degrees) with respect to the absorption axial directions of the polarizers. Therefore, a maximum transmissivity is attained when the direction of the optical anisotropy makes 45 degrees with the absorption axial directions of the polarizers 37 and 38 that cross each other orthogonally.

Where it is assumed that the transmissivity at 45 degrees is 100%, the brightness appears as 100% to human eyes when the transmissivity is about 90% or higher (for the human eyes, brightness of about 90% transmissivity or higher seems to be equivalent to the maximum brightness). Therefore, if 35 degrees<θ<55 degrees, substantially maximum brightness for the human eyes is attained or the human eyes sense that the maximum brightness is attained. That is, as illustrated in the present embodiment, a preferable configuration of a display panel in which the electric field is applied in the in-plane direction of the substrates is such that: (i) the directions (optical anisotropy directions) of the optical anisotropies generated by electric field application in the electric field application directions 49a and 49b make about 45 degrees (angles of 45 degrees±less than 10 degrees, more preferably angles of 45 degrees±not more than 5 degrees, most preferably the angles of 45 degrees) with respect to the absorption axial directions 37a and 37b of the polarizers 37 and 38, respectively; and the directions (optical anisotropy directions) of the optical anisotropies generated by electric field application in the electric field application directions 49a and 49b make, with each other, about 90 degrees (angles of 90 degrees±less than 20 degrees, preferably angles of 90 degrees±not more than 10 degrees, and most preferably the angles of 90 degrees).

Moreover, it is preferable that the ratio of the two domains $D_M$ and $D_M'$ (ratio of total areas) in each pixel 71 is in a range of 1:9 to 1:1 (preferably about 1:1). A large improvement (compensation) in the coloring phenomenon appear to be attained for human eyes when the ratio between the two domains $D_M$ and $D_M'$ is in the range of 1:9 to 1:1.

It was proved by an experiment that when the polar angle was ±60°, a domain segmentation in which the ratio between the domains $D_M$ and $D_M'$ in which the optical anisotropies occurred in different directions that made 90 degrees therebetween was 1:1 could substantially halved the color change (a range in which a change in chromaticity coordinates occurred when the same image is viewed from different angles, the chromaticity coordinates expressed as the distance between chromaticity coordinates: $\sqrt{\{\Delta x^2 + \Delta y^2\}}$), compared with the arrangement in which no domain segmentation was done.

Moreover, it was observed that the color change was smaller with larger ratios between the two domains ($D_M/D_M'$) from 1/9 to 1/1, and was smallest when the ratio was 1/1. Thus, it is preferable that the ratio between domains $D_M$ and $D_M'$ be 1:1.

Moreover, the present invention is not limited to the arrangement, discussed above as a main example, in which each pixel 71 has two types of domains and optical anisotropy of the same direction occur in each type of domains. The present invention may be arranged such that more than two types of domains are provided and optical anisotropy of the same direction occur in each type of domains. More specifically, as described above, it is preferable that the directions of the optical anisotropies that occur in the respective domains when the electric field is applied make about 45 degrees (within a range of 45 degrees±10 degrees) with respect to the absorption axes 37a and 38a of the polarizers 37 and 38, and that the directions of the optical anisotropies that occur in the respective domains when the electric field is applied or when no electric field is applied make, between themselves, about 90 degrees (in a range of 90 degrees+20 degrees). However, the angles may be independently shifted from 45 degrees or 90 degrees.

Besides, the counter electrodes 32 and pixel electrodes 34 may be configured to apply the electric field in more than two directions or in one direction. For example, the counter electrodes 32 and pixel electrodes 34 may respectively have tooth portions 32b and 34b each having bent portions (saw-tooth portions) $32b_1, 32b_2, 32b_r,$ and $34b_1, 34b_2, \ldots, 34b_r$ (r is an arbitral integer that indicates in how many directions the optical anisotropies occur in each pixel 71 by electric field applications) that make 90 degrees respectively with their adjacent bent portions, thereby being configured to apply electric fields in more than two directions, some of which cross each other substantially orthogonally.

Again in this configuration, it is preferable that the absorption axial directions 37a and 38a of the polarizers 37 and 38 cross each other orthogonally, and make 45 degrees with the electric field application directions that cross each other orthogonally.

The inventors of the present invention found that this configuration also attained a display panel 70 having a wide viewing angle by preventing the coloring phenomenon in all the directions without deteriorating a transmissivity.

Moreover, in the configuration illustrated in FIG. 1, there is a non-display contributing region (which does not contributes to the display) in a part of a region 59 between each data signal line 47 and each counter electrode 32 that is arranged to face the data signal line 47 in the pixel 71.

Figure 8:
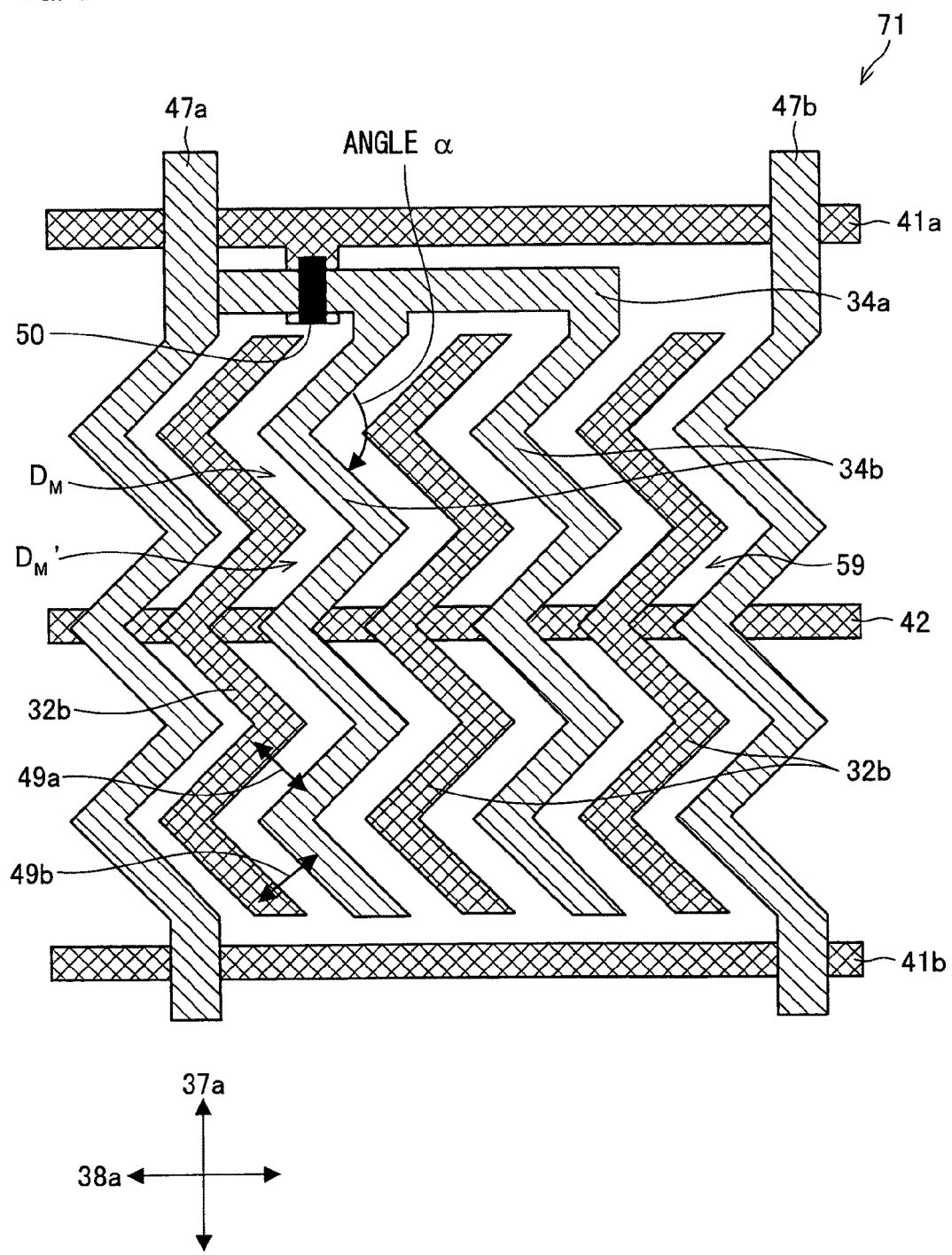
FIG. 8 is a plan view illustrating a modification of the configuration of a pixel of the display panel in accordance with the embodiment of the present invention.

In view of this, as in the configuration illustrated in FIG. 8, the data signal lines 47 may not be linear, but bent (zigzagged) in parallel with bending (tooth portions) of the counter electrodes 32 and the pixel electrodes 34 in the pixel 71. This significantly reduces an area of the non-display contributing region that occur in the region 59.

While it reduces the area of the non-display contributing region, the zigzag-shaped data signal lines 47 cannot be parallel or orthogonal to the absorption axial directions 37a and 38a of the polarizers 37 and 38. Because of this, the electric field formed between the data signal lines 47 and the electrodes in the pixels (i.e., pixel electrodes 34 or counter electrodes 32) induces a change in the magnitude of the optical anisotropy of the medium A. This results in light leakage. Therefore, in the configuration in which the data signal lines 47 are zigzag-shaped, it is preferable to use a medium having a large threshold (a voltage value at which the change in the magnitude of the optical anisotropy occurs). Such a medium A with a large threshold requires a large electric field intensity to change the magnitude of the optical anisotropy thereof. This makes it difficult for the electric field that occur between the data signal lines 47 and the electrodes in the pixel to induce the change in the magnitude of the optical anisotropy of the medium A. Thereby, the light leakage becomes hard to occur.

The present invention is not limited to the configuration in which the data signal lines 47 are zigzag-shaped, and may be arranged so that the scanning signal lines (gate signal lines) 41 or common signal lines 42 are zigzag-shaped. However, it is preferable that at least one of the data signal lines 47, the gate signal lines 41, and the common signal lines 42 are arranged to be linear and extended in a direction orthogonal or parallel to the absorption axial directions 37a and 38a of the polarizers.

Figure 9:
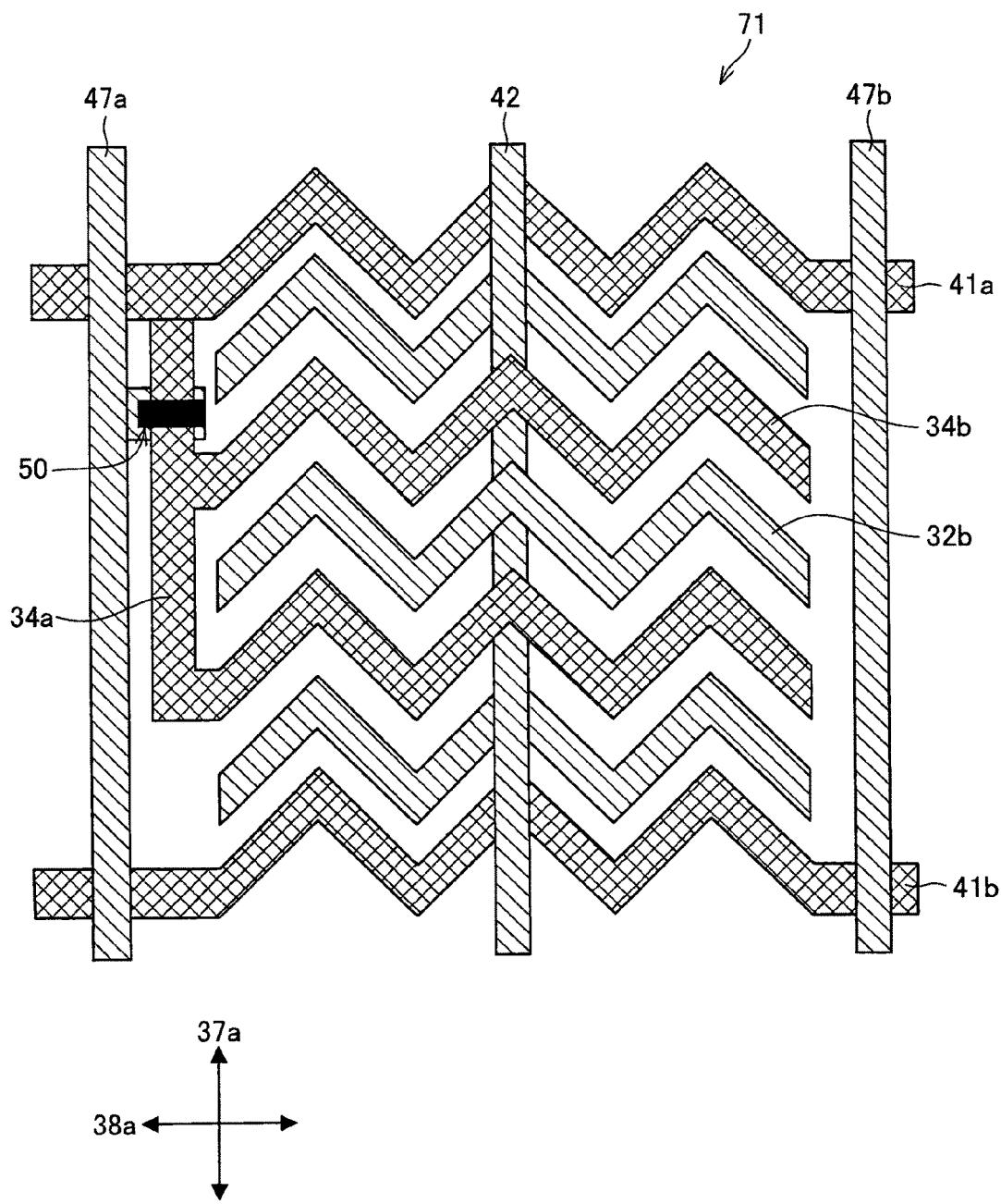
FIG. 9 is a plan view illustrating a modification of the configuration of a pixel of the display panel in accordance with the embodiment of the present invention.

Moreover, the present invention is not limited to the present embodiment in which the counter electrodes 32 and the pixel electrodes 34 are arranged along the data signal lines 47. For example, as illustrated in FIG. 9, the counter electrodes 32 and the pixel electrodes 34 may be arranged along the scanning signal lines 41. Alternatively, as illustrated in FIG. 9, the common signal lines 42 may be arranged in parallel with the data signal lines 47.

In the example illustrated in FIG. 9, the scanning signal lines 41 may be zigzag-shaped so as to be parallel with the bending of the tooth portions of the counter electrodes 32 and the pixel electrodes 34. In the configuration in which the scanning signal lines 41 are zigzag-shaped, a medium A with a large threshold value is preferable as in the configuration illustrated in FIG. 8 in which the data signal lines 47 are zigzag-shaped.

In the following, one example of a production method for the configuration as illustrated in FIG. 9 in which the common signal lines 42 are parallel with the data signal lines 47 is explained.

Firstly, a metal (e.g., MoW) of a high electric conductivity is vapor-deposited on the lower substrate 30, and then patterned into a prescribed pattern thereby to form the scanning signal lines 41. After that, a silicon nitrogen oxide film, a silicon nitride film, an amorphous silicon layer, or the like is vapor-deposited and then patterned into a prescribed pattern. Subsequently, ITO is vapor-deposited and then patterned into a prescribed pattern thereby to form the counter electrodes 32.

Next, a metal film containing highly conductive aluminum is formed by vapor deposition and then patterned into a prescribed pattern thereby to form the data signal lines 47 and the common signal lines 42 in such a way that the common signal lines 42 are electrically connected with the counter electrodes 32, and that each distance between the data signal lines 47 and common signal lines 42 is wider than the width of the data signal lines 47. The data signal lines 47 and the common signal lines 42 are prevented from being electrically connected with each other by having a wider distance therebetween than the width of the data signal lines 47.

After that, a protective film is formed. Then, ITO is vapor-deposited and then patterned into a prescribed pattern thereby to form the pixel electrodes 34.

In this production method, the scanning signal lines 41 are formed at an early stage in the display element formation process. Thus, the scanning signal lines 41 should satisfactorily resistant to heat applied thereon throughout the display element formation process. Thus, the scanning signal lines 41 should be made of a metal (e.g., MoW) that is excellent in heat resistance. On the other hand, the common signal lines 42 and the data signal lines 47, which are formed at later stages in the display element formation process, may be made of a metal having a lower heat resistance compared with the metal of which the scanning signal lines 41 are made. Thus, the common signal lines 42 and the data signal lines 47 may be made of a metal that is less resistant to heat but more electrically conductive than the material of which the scanning signal lines 41 are made. For example, the common signal lines 42 and the data signal lines 47 may be made of aluminum. The common signal lines 42 made of a metal of high electrical conductivity may have a narrower line width, which leads to a smaller area of the common signal lines 42 per unit pixel. This improves the transmissivity of the display panel.

Moreover, in the configuration in FIG. 1, the distance between the scanning signal lines 41 and the common signal lines 42 is greater than the width of the scanning signal lines 41. Such large distance between the scanning signal lines 41 and the common signal lines 42 prevents the electric conduction (i.e., electric connection) between the scanning signal lines 41 and the common signal lines 42.

Figure 10:
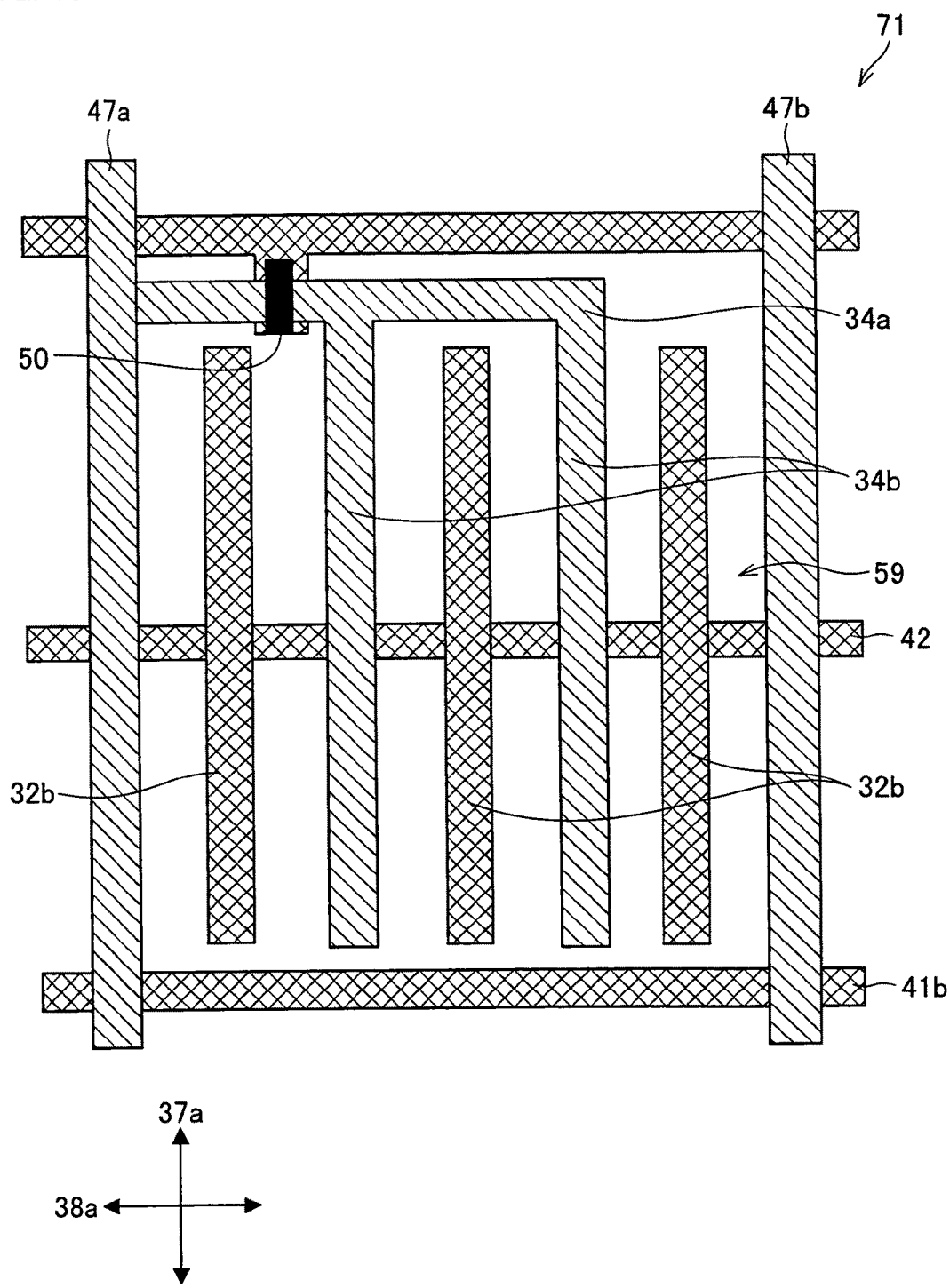
FIG. 10 is a plan view illustrating a modification of the configuration of a pixel of the display panel in accordance with the embodiment of the present invention.

Moreover, the present invention is not limited to the configuration of FIG. 1 in which the counter electrodes 32 and the pixel electrodes 34 have tooth portions in the zigzag shape. For example, as illustrated in FIG. 10, the counter electrodes 32 and the pixel electrodes 34 may have tooth portions in a linear shape.

Moreover, the distance L2 between the adjacent tooth portions 32b of the counter electrodes 32 may be same as or different from the width P2 of the tooth portions 34b of the pixel electrodes 34. Moreover, the distance L3 between the tooth portions 34b of the pixel electrodes 34 may be same or different from the width P1 of the tooth portions 32b of the counter electrodes 32.

Moreover, the present invention is not limited to the configuration of FIG. 4 in which the pixel electrodes 34 and the counter electrodes 32 do not overlap each other when viewed in the normal direction of the substrate plane. For example, a part or whole of the pixel electrodes 34 may overlap the counter electrodes 32 when viewed in the normal direction of the substrate plane.

That is, the counter electrodes 32 may not have a comb-like shape. For example, the counter electrodes 32 may have a rectangular (or square) shape whose size is smaller than that of the unit pixel, as illustrated in FIG. 10.

Figure 5:
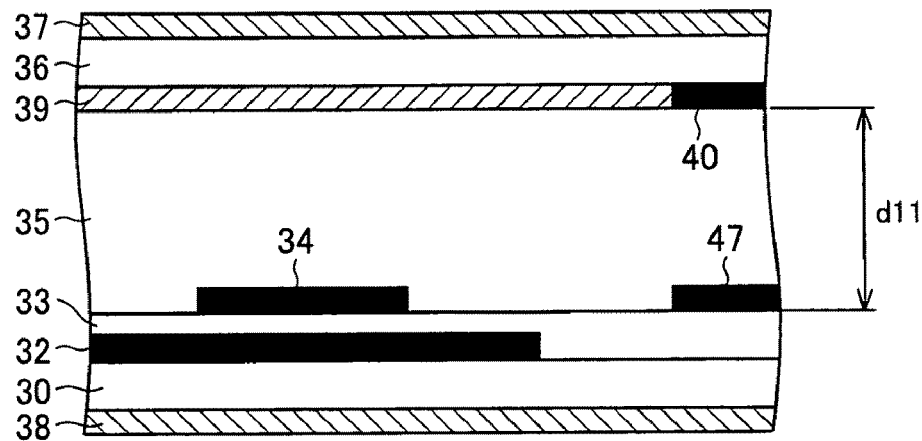
FIG. 5(a) is a cross-sectional view illustrating a modification of the configuration of a pixel of the display panel in accordance with the embodiment of the present invention.
FIG. 5(b) is a cross-sectional view illustrating a modification of the configuration of a pixel of the display panel in accordance with the embodiment of the present invention.
Figure 5:
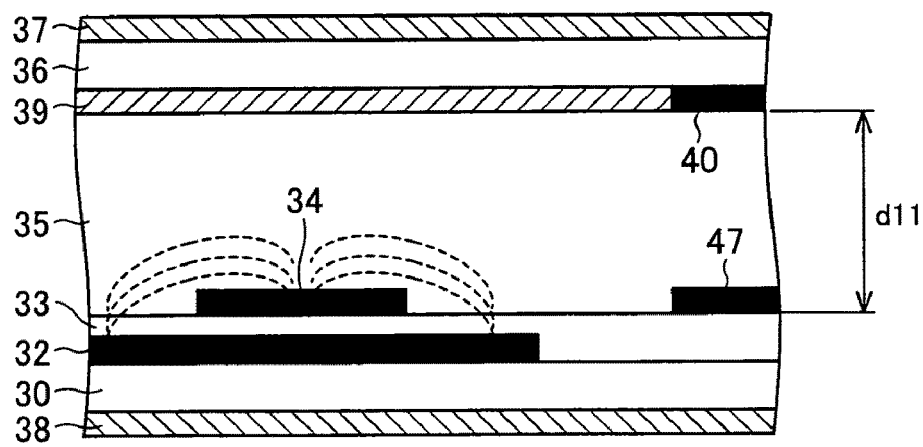

FIGS. 5(a) and 5(b) are cross sectional views illustrating an example in which the pixels electrodes 34 overlap the counter electrodes 32 when viewed in the normal direction of the substrate plane. FIG. 5(a) illustrates a case where no electric field is applied, while FIG. 5(b) illustrates a case where an electric field is applied.

As illustrated in FIG. 5(b), the configuration in which the pixels electrodes 34 overlap the counter electrodes 32 when viewed in the normal direction of the substrate plane can attain a parabolic fringe electric field having a larger curvature and radius than in the conventional configuration in which the pixel electrodes 34 and the counter electrodes 32 are formed in the same layer. The change in the orientation of the medium A is induced in the region above the electrodes with this fringe electric field. More specifically, the equipotential lines are formed on regions above the counter electrodes 32 and pixel electrodes 34, in addition to between the counter electrodes 32 and the pixel electrodes 34, when an electric field is applied thereon. With this, it is possible to induce the change in the magnitude of the optical anisotropy of the medium A in the regions above the counter electrodes 32 and the pixel electrodes 34 by the electric field application.

Figure 6:
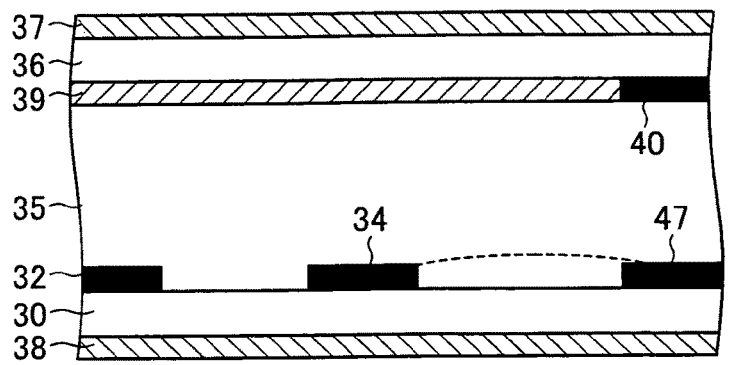
FIG. 6(a) is a cross-sectional view illustrating a modification of the configuration of a pixel of the display panel in accordance with the embodiment of the present invention.
FIG. 6(b) is a cross-sectional view illustrating a modification of the configuration of a pixel of the display panel in accordance with the embodiment of the present invention.
Figure 6:
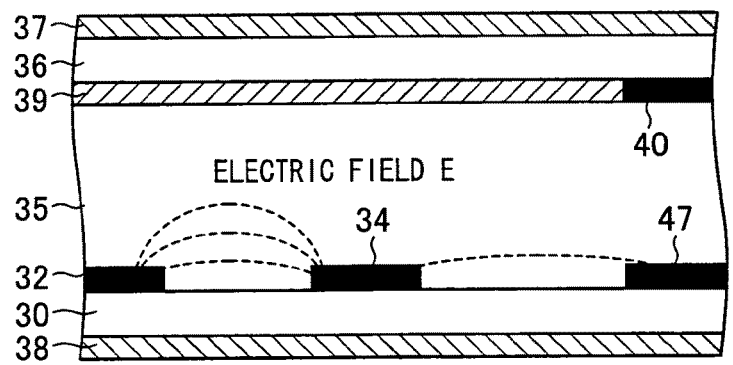

In the configurations as illustrated in FIGS. 4, 5(a), and 5(b), a parabolic fringe electric field having a large curvature and radius are formed by providing the insulating film 33 between the counter electrodes 32 and the pixel electrodes and reducing the distance between the electrodes. However, the present invention is not limited to these configurations. For example, as illustrated in FIGS. 6(a) and 6(b), the counter electrodes 32 and the pixel electrodes 34 may be provided in the same layer without an insulating film therebetween. FIG. 6(a) illustrates a case where no electric field is applied, while FIG. 6(b) illustrates a case where an electric field is applied.

Figure 11:
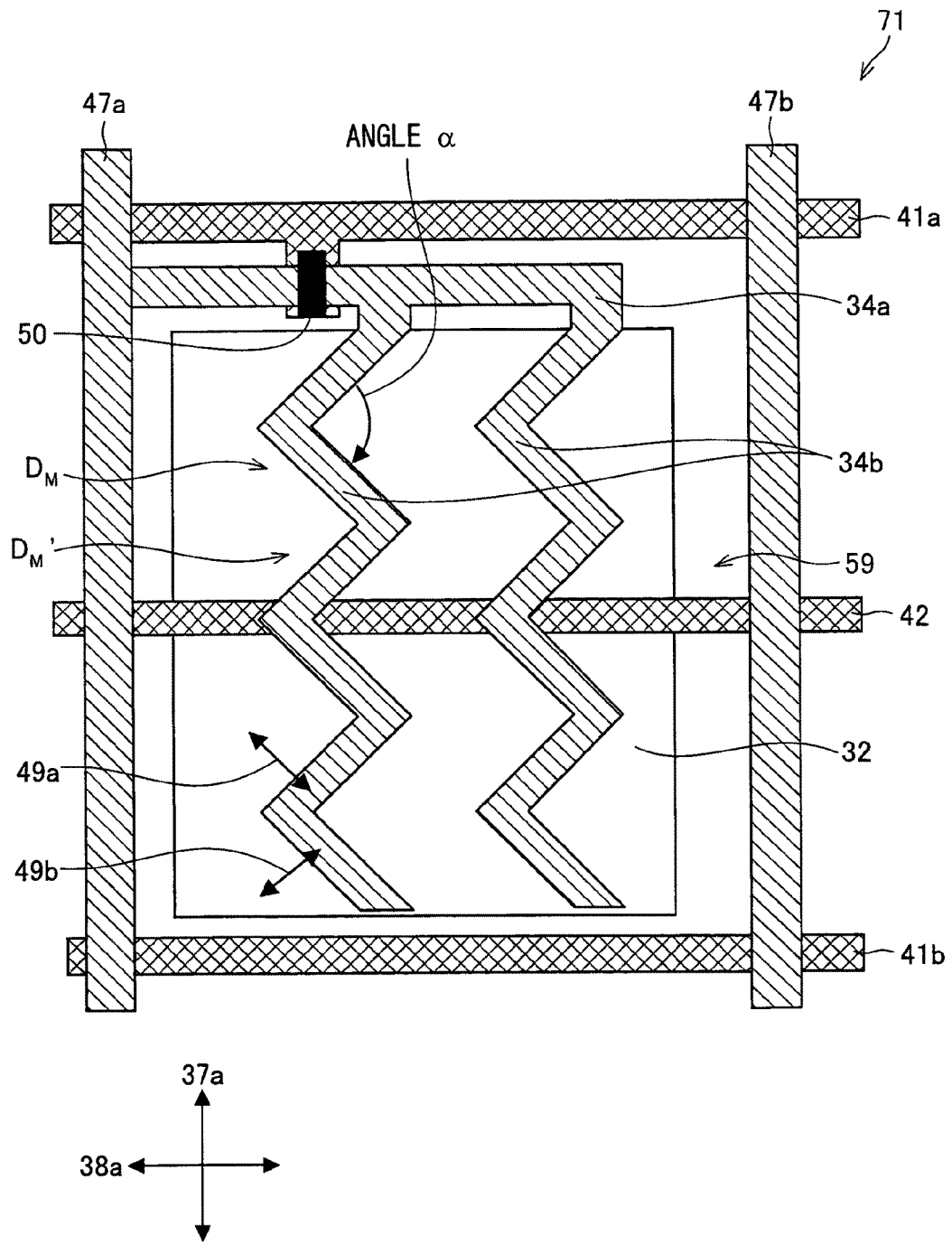
FIG. 11 is a plan view illustrating a modification of the configuration of a pixel of the display panel in accordance with the embodiment of the present invention.

It was observed in the configuration in which the counter electrodes 32 have a shape as illustrated in FIG. 11 that the maximum transmissivity of a display panel 70 was approximately 4%, which is better than those of conventional typical display apparatuses. (In the liquid crystal display apparatus employing the conventional IPS mode in which electrodes are formed on a substrate surface, the maximum transmissivity was approximately 2%.) This indicates that electric lines of force occur between the electrodes by electric field application between the electrodes even in the configuration of FIG. 11. That is, the configuration in which the counter electrodes 32 and the pixel electrodes 34 overlap each other in the normal direction of the substrate plane allows the formation of the equipotential lines on the region above the pixel electrodes 34 and the counter electrodes 32, in addition to between the pixel electrodes 34 and the counter electrodes 32, when the electric field is applied thereon. This makes it possible to induce a change in the magnitude of the optical anisotropy of the medium A in the regions above the pixel electrodes 34 and the counter electrodes 32 by electric field application. Thus, the equipotential lines are formed in the regions substantially the same to the regions where the equipotential lines are formed in the configuration in which the counter electrodes 32 are formed in the comb-like shape. Thus, this configuration attains an effect similar to that of the configuration in which the counter electrodes 32 are comb-like shaped.

The shape of the counter electrodes 32 are not limited to the rectangular (square) shape or comb-like shape, and may have any shape as appropriate as long as an electric field can be properly applied on the medium A in the pixels in which the counter electrodes 32 are respectively provided.

Figure 12:
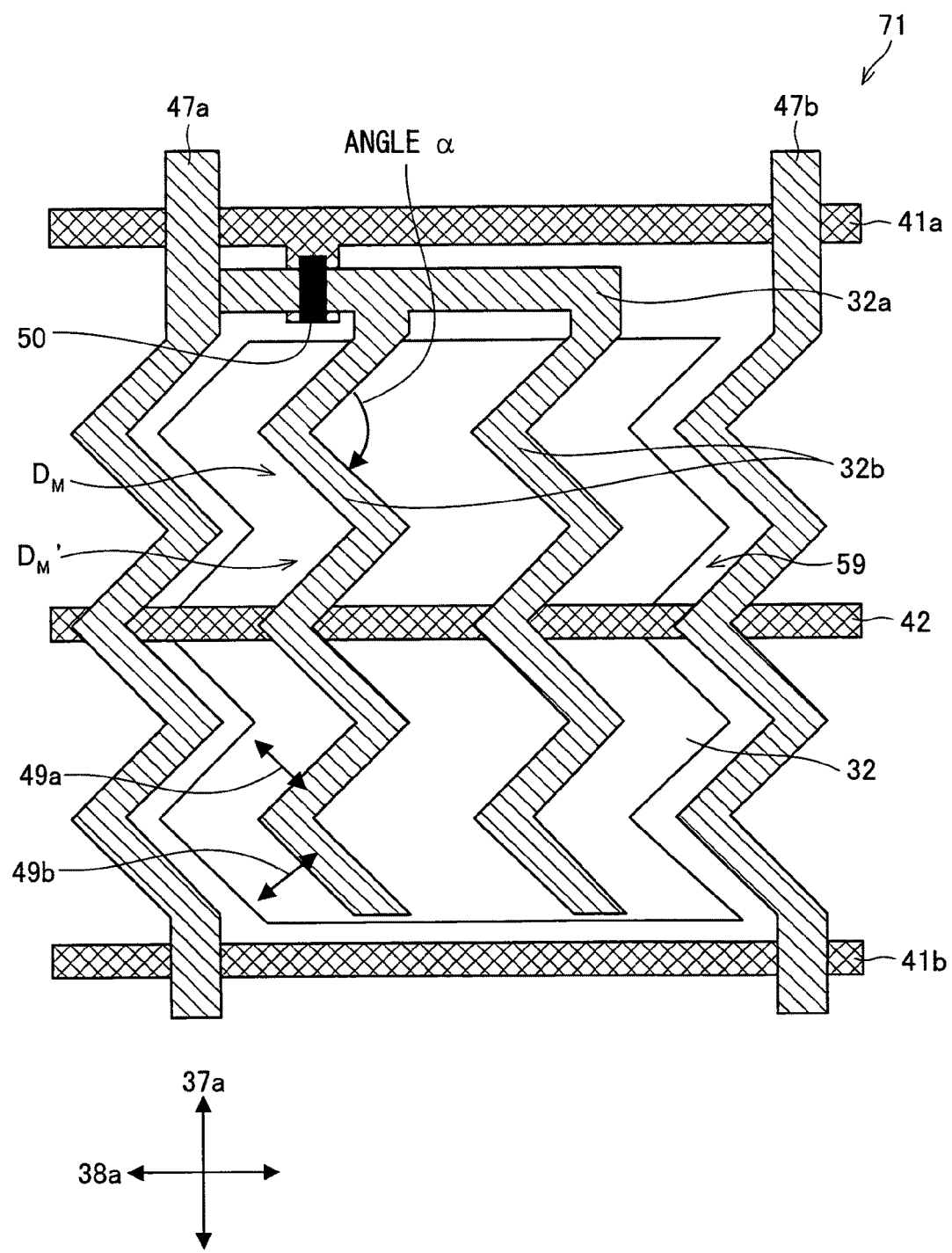
FIG. 12 is a plan view illustrating a modification of the configuration of a pixel of the display panel in accordance with the embodiment of the present invention.
Figure 13:
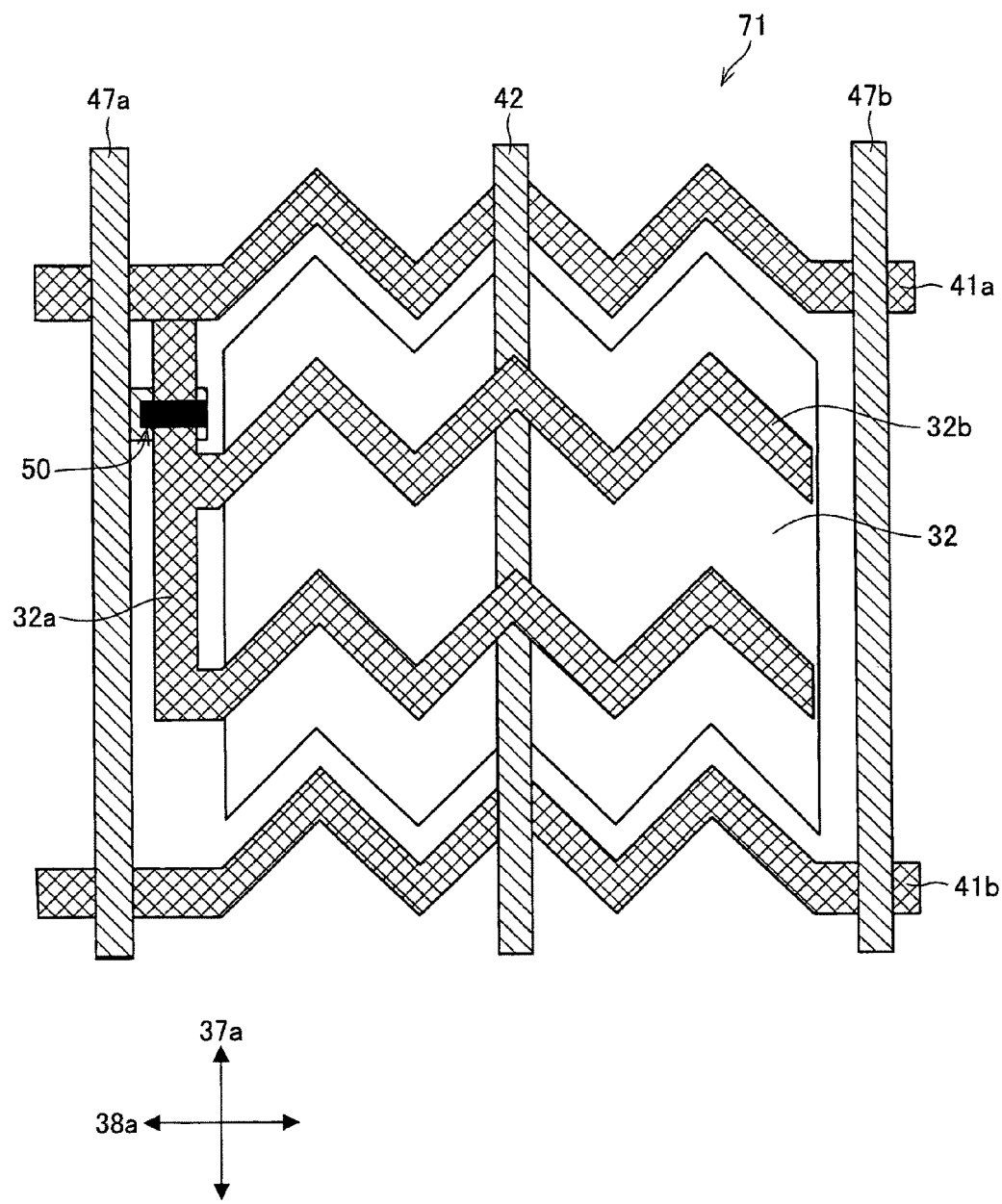
FIG. 13 is a plan view illustrating a modification of the configuration of a pixel of the display panel in accordance with the embodiment of the present invention.

For example, in the configuration in which the data signal lines 47 are zigzag-shaped, the counter electrodes 32 may be configured such that edges thereof which face the data signal lines 47 have a zigzag shape that is along the zigzag shape of the data signal lines 47, as illustrated in FIG. 12. Moreover, in the configuration in which the scanning signal lines 41 are zigzag-shaped, the counter electrodes 32 may be configured such that edges thereof which face the scanning signal lines 41 are along the shape of the scanning signal lines 41, as illustrated in FIG. 13.

Moreover, as with the counter electrodes 32, the shape of the pixel electrodes 34 is not limited to a comb-like shape, but may be varied as appropriate.

While the counter electrodes 32 and pixel electrodes 34 are provided to the lower substrates 30 in the present embodiment, a shield electrode (third electrode, not illustrated) may be additionally provided to the upper substrate 36 so as to cover the surface of the upper substrate 36. The shield electrode can provide shielding against external static electricity and prevent fluctuation in brightness due to a response of the medium A to the external static electricity. Consequently, it becomes possible to prevent display unevenness caused by the static electricity, thereby suppressing and preventing the deterioration of the display quality. In other words, a display panel capable of performing a stable display that is not affected by the static electricity can be realized by providing the shield electrode.

It is preferable to fix a potential of the shield electrode to a constant value. The constant potential of the shield electrode provides more reliable shielding effect against the external static electricity.

The shield electrode may have a function as a heating means for heating the medium layer 35, in addition to the function as the shield electrode for shielding the static electricity. This makes it possible to more effectively reduce or prevent the display unevenness caused by the temperature unevenness in the medium layer 35.

The shield electrode may have such a shape that the shield electrode does not overlap the counter electrodes 32 and the pixel electrodes 34 when viewed in the normal direction of the substrate plane. With this configuration, it is possible to reduce a load capacitance that occurs between (i) the shield electrode and (ii) the counter electrodes 32 and the pixel electrodes 34. This improves the charging property of the pixels.

Moreover, the shield electrode is preferably made of a transparent electrode such as ITO (Indium Tin Oxide), IZO (Indium Zinc Oxide), ZnO, or the like. By configuring the shield electrode as transparent electrodes, it is possible to prevent transmissivity deterioration while attaining the static electricity shielding effect. This can realize a display panel of high reliability.

(5. Display Principle of Display Panel 70)

Next, a display principle of the display element (display panel) according to the present embodiment is described below. The following description mainly discuss a configuration in which the display element according to the present embodiment is a transmissive type of display panel and is substantially optically isotropic or preferably optically isotropic when no electric field is applied but becomes optically anisotropic when the electric field is applied. However, it should be noted that present invention is not limited to this configuration.

The medium A used in the present embodiment is a medium whose optical anisotropy is changed in magnitude in response to application of the electric field. When an electric field $E_j$ is externally applied on a material, electric displacement $D_{ij}$ occurs (electric displacement $D_{ij} = \in_{ij} \cdot E_j$). When such electric displacement $D_{ij}$ occurs, there is a slight change in a dielectric constant ($\in_{ij}$). As to the frequencies of light, the square of the refractive index (n) is equivalent to the dielectric constant. Thus, the medium A may be referred to as a material whose refractive index is changed in response to application of the electric field.

As described above, the display element according to the present embodiment carries out its display operation by utilizing the phenomenon (electro-optical effect) in which the refractive index of the material is changed in response to application of the electric field. Unlike liquid crystal display element in which rotation of the molecules (molecular orientation direction) due to electric field application is utilized, the optical anisotropy is not changed in its direction, and the change (mainly, electronic polarization, orientation polarization) in the magnitude of the optical anisotropy is utilized to perform the display operation in the display element.

FIG. 14(a) is a cross sectional view schematically illustrating the configuration of the display element according to the present embodiment when no electric field is applied (OFF state), whereas FIG. 14(b) is a cross sectional view schematically illustrating the configuration of the display element according to the present embodiment when an electric field is applied (ON state). Moreover, FIG. 14(c) is a graph illustrating a relationship between the applied voltage and the transmissivity in the display element according to the present embodiment. Moreover, FIG. 15 is an explanatory view schematically illustrating differences of the display principle between the display element according to the present embodiment and the conventional liquid crystal display element. The differences are shown by average shapes of refractive index ellipsoids of the medium (i.e. shapes of cross sections of refractive index ellipsoids) and their main axis directions, when no electric field (voltage) is applied (OFF state) and when an electric field (voltage) is applied (ON state). That is, (a) of FIG. 15 is a cross-sectional view illustrating the display element according to the present embodiment when no electric field is applied (OFF state). (b) of FIG. 15 is a cross-sectional view illustrating the display element according to the present embodiment when an electric field is applied (ON state). (c) of FIG. 15 is a cross-sectional view illustrating a conventional TN (Twisted Nematic) mode liquid crystal display element when no electric field is applied. (d) of FIG. 15 is a cross-sectional view illustrating the conventional TN mode liquid crystal display element when an electric field is applied. (e) of FIG. 15 is a cross-sectional view illustrating a conventional VA (Vertical Alignment) mode liquid crystal display element when no electric field is applied. (f) of FIG. 15 is a cross-sectional view illustrating the conventional VA mode liquid crystal display element when an electric field is applied. (g) of FIG. 15 is a cross-sectional view illustrating a conventional IPS (In Plane Switching) mode liquid crystal display element when no electric field is applied. (h) of FIG. 15 is a cross-sectional view illustrating the conventional IPS mode liquid crystal display element when an electric field is applied.

Generally, the refractive index of a material is not isotropic but varies according to its directions. Here, in a case where: an x direction is a direction parallel to a substrate surface (in-plane direction of the substrate, substrate in-plane direction) and a direction opposite to the electrodes 32 and 34; a y direction is a direction parallel to the substrate surface (in-plane direction of the substrate, substrate in-plane direction) and a direction perpendicular to the direction opposite to the electrodes 32 and 34; and a z direction is a direction perpendicular to the substrate surface (normal direction of the substrate, substrate normal direction), the anisotropy of the refractive index (i.e., optical anisotropy) is shown by an ellipsoid (refractive index ellipsoid) shown by the following equation (1) using an arbitrary orthogonal coordinate system ($X_1$, $X_2$, $X_3$)

$$\sum_{ij}\left(\frac{1}{n_{ij}^2}\right)X_i X_j = 1 \quad (1)$$

($n_{ji}=n_{ij}$, i, j=1, 2, 3).

When the equation (1) is rewritten by using a coordinate system ($Y_1$, $Y_2$, $Y_3$) of the main axis directions of the ellipsoid, the following relational equation (2) is obtained:

$$Y_1^2/n_1^2 + Y_2^2/n_2^2 + Y_3^2/n_3^2 = 1 \quad (2)$$

$n_1$, $n_2$, and $n_3$ (hereinafter referred to as nx, ny, and nz) are called main refractive indices, and correspond to halves in length of three main axes in the ellipsoid. In case of a light wave proceeding from an origin to a direction perpendicular to a surface of $Y_3=0$, the light wave has polarization components in $Y_1$ direction and $Y_2$ direction. The refractive indices of the components in $Y_1$ direction and $Y_2$ direction are respectively nx and ny. Generally, with respect to a light proceeding in an arbitrary direction, a plane that passes the origin and is perpendicular to a direction in which the light wave proceeds is a cross section of the refractive index ellipsoid. Directions of main axes of this ellipse are polarization component directions of the light wave. A half in length of the main axis corresponds to the refractive index.

The following description explains the differences of the display principle between the display element according to the present embodiment and the conventional liquid crystal display elements. TN mode, VA mode, and IPS mode are used as examples of the modes of the conventional liquid crystal display elements.

As illustrated in FIG. 15, the conventional TN mode liquid crystal display element is structured such that a liquid crystal layer 105 is sandwiched between a pair of substrates 101 and 102 which are provided face to face, and transparent electrodes (electrodes) 103 and 104 are respectively provided on the substrates 101 and 102. When no electric field is applied, liquid crystal molecules of the liquid crystal layer 105 are oriented such that long-axis directions of the liquid crystal molecules are oriented in spirally twisted directions. When an electric field is applied, the liquid crystal molecules are oriented such that the long-axis direction of each of the liquid crystal molecules is along an electric field direction. As illustrated in FIG. 15, a typical refractive index ellipsoid 105a is such that its main axis direction (long-axis direction) is parallel to the substrate surface (substrate in-plane direction) when no electric field is applied. As illustrated in FIG. 15, the typical refractive index ellipsoid 105a is such that its main axis direction turns to the substrate normal direction when an electric field is applied. That is, the shape of the refractive index ellipsoid 105a is an ellipse when no electric field is applied and when an electric field is applied. The long-axis direction (main axis direction, direction of the refractive index ellipsoid 105a) changes depending on whether or not an electric field is applied. That is, the refractive index ellipsoid 105a rotates. Note that, the shape and the size of the refractive index ellipsoid 105a do not change substantially.

As illustrated in FIG. 15, the conventional VA mode liquid crystal display element is structured such that a liquid crystal layer 205 is sandwiched between a pair of substrates 201 and 202 which are provided face to face, and transparent electrodes (electrodes) 203 and 204 are respectively provided on the substrates 201 and 202. When no electric field is applied, liquid crystal molecules of the liquid crystal layer 205 are oriented such that the long-axis direction of each of the liquid crystal molecules is substantially perpendicular to the substrate surface. When an electric field is applied, the liquid crystal molecules are oriented such that the long axis direction of each of the liquid crystal molecules is perpendicular to an electric field. As illustrated in FIG. 15, a typical refractive index ellipsoid 205a is oriented such that the main axis direction (long-axis direction) turns to the substrate normal direction when no electric field is applied. As illustrated in FIG. 15, the typical refractive index ellipsoid 205a is oriented such that the main axis direction is parallel to the substrate surface (substrate in-plane direction) when an electric field is applied. That is, in case of the VA mode liquid crystal display element, just like the TN mode liquid crystal display element, the shape of the refractive index ellipsoid 205a is an ellipse. The long-axis direction changes (the refractive index ellipsoid 205a rotates) depending on whether or not an electric field is applied. Moreover, the shape and the size of the refractive index ellipsoid 205a do not change substantially.

As illustrated in FIG. 15, the conventional IPS mode liquid crystal display element is structured such that a pair of electrodes 302 and 303 are provided face to face on a substrate 301. When a voltage is applied from the electrodes 302 and 303 to a liquid crystal layer sandwiched between the substrate 301 and a counter substrate (not illustrated), liquid crystal molecules of the liquid crystal layer change their orientation directions (main axis direction (long-axis direction) of the refractive index ellipsoid 305a). Therefore, it is possible to realize different display states depending on whether or not an electric field is applied. That is, in case of the IPS mode liquid crystal display element, just like the TN mode liquid crystal display element and the VA mode liquid crystal display element, the shape and the size of the refractive index ellipsoid 305a do not change substantially, but the main axis direction changes (the refractive index ellipsoid 305a rotates) depending on whether or not an electric field is applied.

Thus, according to the conventional liquid crystal display elements, the liquid crystal molecules are oriented in a certain direction (typically, in a single direction) when no electric field is applied. When an electric field is applied, the liquid crystal molecules change their orientation direction all together so as to carry out the display (modulation of transmittance). That is, although the shape and the size of the refractive index ellipsoid do not change (that is, the shape is an ellipse), only the main axis direction (long-axis direction) of the refractive index ellipsoid is rotated (changed) by applying an electric field, so that the display is carried out. Therefore, the long-axis direction of the refractive index ellipsoid is not limited to a direction perpendicular to or parallel to a direction of an electric field application. That is, according to the conventional liquid crystal display elements, the orientational order parameter of the liquid crystal molecules is substantially constant, and the display is carried out by changing the orientation directions (modulation of transmittance). That is, according to the conventional liquid crystal display elements, when an electric field is applied, the orientational order parameter is substantially constant, but a direction of an orientational easy axis changes.

Meanwhile, as illustrated in FIG. 15, the display element according to the present embodiment, the refractive index ellipsoid 35a is spherical when no electric field is applied, that is, the refractive index ellipsoid 35a is optically isotropic when no electric field is applied (nx=ny=nz, orientational order parameter≈0 (substantially 0) in a scale not smaller than the wavelength of visible light). Moreover, the refractive index ellipsoid is optically anisotropic when an electric field is applied (nx>ny, orientational order parameter>0 in the scale not smaller than the wavelength of visible light), and the refractive index ellipsoid 35a becomes an ellipse (shows the optical anisotropy). Moreover, the major axis direction of the refractive index ellipsoid 35a becomes perpendicular to the electric field application direction when the dielectric anisotropy of the medium layer 35 is negative, while the major axis direction of the refractive index ellipsoid 35a becomes parallel to the electric field application direction when the dielectric anisotropy is positive. That is, when the dielectric anisotropy of the medium A is negative (negative type liquid crystal), the major axis direction of the refractive index ellipsoid 35a is perpendicular to the electric field direction (perpendicular state) regardless of how much voltage is applied. When the dielectric anisotropy of the medium A is positive (positive type liquid crystal), the major axis direction of the refractive index ellipsoid 35a is parallel to the electric field direction regardless of how much voltage is applied. In the present invention, the electric field application direction and at least one of the major axis directions of the refractive index ellipsoid 35a are parallel or perpendicular to each other always.

Note that, in the present invention, the orientational order parameter≈0 in the scale not less than the wavelength of visible light indicates that the orientational order parameter is such a state: when the orientational order parameter≈0 in the scale not less than the wavelength of visible light, a majority of the liquid crystal molecules or the like are oriented in a certain direction (there is an orientational order) when observed in a scale smaller than the wavelength of visible light, whereas, in the scale larger than the wavelength of visible light, the orientation directions of the molecules are averaged (that is, random) and there is no orientational order. Therefore, when the orientational order parameter≈0 in the scale not less than the wavelength of visible light, the orientational order parameter is so small that it causes no effect on the light in the wavelength range of the visible light and the light larger than the wavelength of visible light. For example, when the orientational order parameter≈0 in the scale equal to or greater than the wavelength of visible light, the black display is realized under crossed nicols.

Furthermore, in the present invention, "the orientational order parameter>0 in the scale equal to or greater than the wavelength of visible light" indicates that the orientational order parameter in the scale equal to or greater than the wavelength of visible light is greater than the orientational order parameter of substantially 0. For example, when the orientational order parameter>0 in the scale equal to or greater than the wavelength of visible light, the white display (and/or gray display, which is a gradation display) is realized under crossed nicols That is, the display element according to the present embodiment is such that the molecules constituting the medium A are directed randomly in any directions in regions other than the region 59 as illustrated in FIG. 14(a), when no electric field is applied. However, the molecules are oriented in an order (orderly structure, orientational order) in the scale smaller than the wavelength of visible light (the orientational order parameter in the scale not smaller than the wavelength of visible light≈0) and thus no optical anisotropy is caused. Therefore, the shape of the refractive index ellipsoid 35a is spherical as illustrated in FIG. 15. As illustrated in FIG. 14(b), when the electric field is applied, an orientational state of the respective molecules is changed because the respective molecules are directed along the in-plane direction of the substrates (direction parallel to the surfaces of the substrates) due to the positive dielectric anisotropy of the molecules. Moreover, when the orientation state is changed, the optical anisotropy is caused (the orientational order parameter in the scale not smaller than the wavelength of visible light>0) as a result of distortion that occurs in the orderly structure smaller than the wavelength of visible light. As described above, the display element in accordance with the present embodiment is arranged such that, when no electric field is applied, the refractive index ellipsoid 35a has a shape (nx=ny=nz) that causes the optical isotropy, and when the electric field is applied, the refractive index ellipsoid 35a has a shape that causes the optical anisotropy. That is, the display element in accordance with the present embodiment is arranged such that the shape and the size of the refractive index ellipsoid 35a are changeable in response to application of the electric field.

Figure 16:
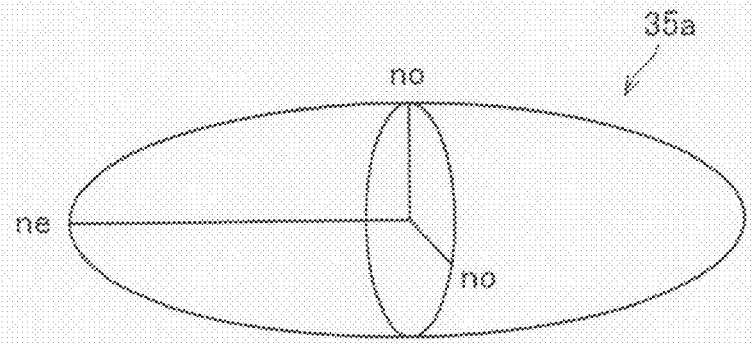
FIG. 16 is a view schematically illustrating a shape of a refractive index ellipsoid according to the embodiment of the present invention.

Moreover, FIG. 16 is a schematic view illustrating the shape of the refractive index ellipsoid 35a of one molecule in the medium A when the electric field is applied, in the display element in accordance with the present embodiment. As illustrated in FIG. 16, the shape of the refractive index ellipsoid 35a is indicated as a cross section of the refractive index ellipsoid (ellipsoid) taken along a plane passing through an original point and perpendicular to a propagation (traveling, proceeding) direction of light wave. As described above, the major axis direction of the ellipsoid is a component direction of the polarized light of the light wave, and a half of the length of the major axis corresponds to a refractive index along that direction.

The medium A according to the present embodiment is optically isotropic (in an isotropic phase) when no electric field is applied, and becomes optically anisotropic when the electric field is applied thereon. Thus, the refractive index ellipsoid 35a has a spherical shape, that is, is optically isotropic when no electric field is applied thereon. When an electric field is applied thereon, the refractive index ellipsoid 35a becomes optically anisotropic.

Where, as illustrated in FIG. 16, ne is the refractive index along the major axis direction of the ellipsoid (that is, the component direction of the polarized light of the light wave) due to the occurrence of the optical anisotropy when the electric field is applied, that is, the refractive index (extraordinary light refractive index) along the major axis direction of the molecule 9, and no is the refractive index along the direction perpendicular to the major axis direction of the ellipsoid, that is, the refractive index (ordinary light refractive index) along the minor axis direction of the molecule 9, the refractive index anisotropy (Δn) (change in birefringence) is expressed by Δn=ne−no.

That is, in the present invention, the refractive index anisotropy (Δn) indicates the change in the birefringence expressed as Δn=ne−no (ne: extraordinary light refractive index, no: ordinary light refractive index). ne and no are changed in the present invention, but not in the conventional liquid crystal display apparatuses.

The major axis direction of the refractive index ellipsoid 35a is parallel to the electric field application direction when the electric field is applied (in case of the medium having the positive dielectric anisotropy), or the major axis direction of the refractive index ellipsoid 3a is perpendicular to the electric field application direction when the electric field is applied (in case of the medium having the negative dielectric anisotropy).

On the other hand, in the conventional liquid crystal display element, the display operation is carried out by utilizing the rotation of the major axis direction of the refractive index ellipsoid by the electric field application. Thus, in the conventional liquid crystal display element, the major axis direction of the refractive index ellipsoid is not always parallel or perpendicular to the electric field application direction.

According to the display element of the present embodiment, the direction of the optical anisotropy is constant (electric field application direction does not change), and the display is carried out by, for example, changing the orientational order parameter in the scale not smaller than the wavelength of visible light. The magnitude of the optical anisotropy (for example, the orientational order in the scale not smaller than the wavelength of visible light) of the medium A itself is changed in the display element of the present embodiment. Therefore, the display element of the present embodiment is totally different from the conventional display elements in terms of the display principle.

Figure 23:
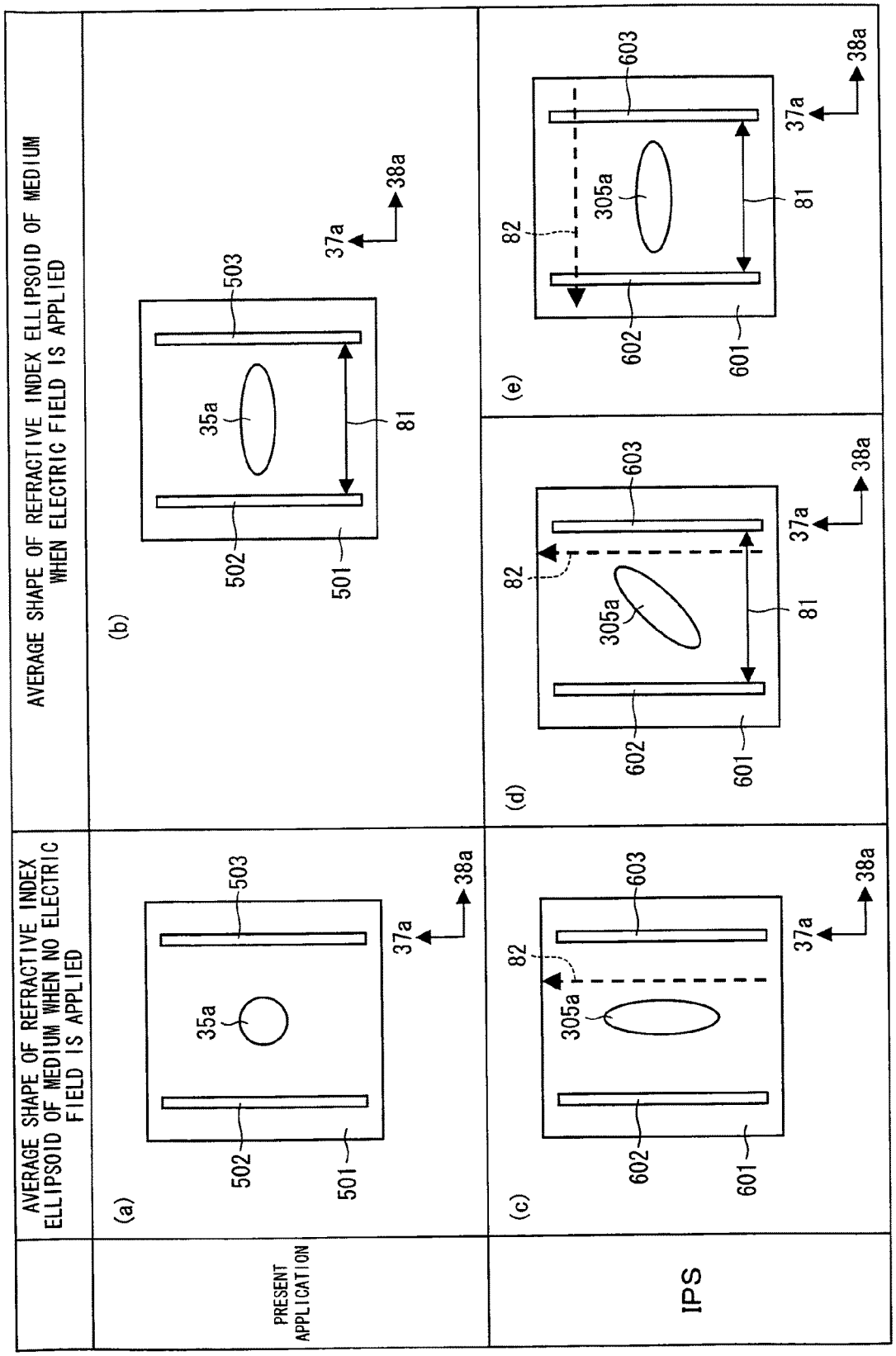
FIG. 23 is an explanatory view schematically illustrating differences between the display panel of the present invention and conventional liquid crystal display elements in terms of display principle.

FIG. 23 schematically illustrates changes of the refractive index ellipsoids of the medium when a noise field occurs, the changes caused by differences between the display element (display panel) of the present invention and conventional liquid crystal display elements in terms of display principle. Here, the changes are shown by average shapes of refractive index ellipsoids of the medium (i.e. shapes of cross sections of refractive index ellipsoids), as illustrated in FIG. 15. The IPS mode liquid crystal display element is used as an example of the conventional liquid crystal display element.

(c) through (e) of FIG. 23 schematically illustrate electrodes 602 and 603 (electrodes generating the noise field) provided to the display element of the IPS mode and shapes of the refractive index ellipsoid 305a. (c) of FIG. 23 illustrates a state when no electric field is applied, while (d) and (e) of FIG. 23 illustrate states when an electric field is applied.

In the state as illustrated in (c) of FIG. 23, the liquid crystal molecule is aligned by rubbing in a direction of a dotted arrow 82 shown in (c) of FIG. 23. When an electric field is applied to the display element in this state, a noise field 81 as illustrated in (d) of FIG. 23 occurs.

In other words, in the IPS mode (in the conventional liquid crystal display element), the refractive index ellipsoid rotates and the major axis direction thereof is changed in accordance with the occurrence of the noise field. When the refractive index ellipsoid rotates, an angle of the rotation depends on strength of the electric field (noise field). Therefore, for reduction of the light leakage due to the noise field in the conventional liquid crystal display element, it is necessary (i) that the liquid crystal molecule does not move even when the noise field occurs and (ii) that the direction of the alignment of the liquid crystal molecule is perpendicular to or parallel to the absorption axes of the polarizers. More specifically, it is necessary that the direction 82 of the alignment of the liquid crystal molecule caused by the rubbing needs to be parallel to the noise field direction 81, and the direction 82 of the alignment of the liquid crystal molecule and the noise field direction 81 is perpendicular or parallel to the absorption axes 37a and 38a of the polarizers. Therefore, in order to reduce the light leakage due to the noise field in the conventional liquid crystal display apparatus, control of the initial alignment of the liquid crystal molecule (for example, control of the alignment by rubbing) is inevitable and the direction of the alignment is also predetermined.

On the contrary, the display principle of the liquid crystal element of the present invention is significantly different from the display principle of the conventional liquid crystal element. Therefore, the structure of the liquid crystal element for reducing the light leakage due to the noise field is also different between the liquid crystal of the present invention and the conventional liquid crystal element.

(a) and (b) of FIG. 23 schematically illustrate electrodes 502 and 503 (electrodes generating the noise field) provided to the display element of the present invention and shapes of the refractive index ellipsoids 35a. (a) of FIG. 23 illustrates a state when no electric field is applied, while (b) of FIG. 23 illustrates a state when an electric field is applied.

As illustrated in (a) of FIG. 23, the shape of the refractive index ellipsoid is spherical, that is, optically isotropic when no electric field is applied. In this state, there is no noise field.

When an electric field is applied to the display element in the state as illustrated in (a) of FIG. 23, the noise field 81 as illustrated in (b) of FIG. 23 occurs. Due to the occurrence of this noise field, the shape of the refractive index ellipsoid changes from a spherical shape to an ellipsoidal shape. That is, the display element of the present invention changes only the shape of the refractive index ellipsoid, but does not rotate as the refractive index ellipsoid of the conventional liquid crystal display element rotates (changes the direction of the major axis). Therefore, in the display element of the present invention, the direction of the optical anisotropy caused by the noise field is fixed.

Accordingly, the display element of the present invention does not necessarily need to stop the movement of the liquid crystal due to the occurrence of the noise filed, for preventing the light leakage caused by the noise field. In other words, as illustrated in (b) of FIG. 23, only the direction of the noise field and the absorption axial directions of the polarizers need to be defined, but the control of the initial alignment of the liquid crystal molecule is not necessary as the conventional liquid crystal element.

More specifically, in the display element of the present invention, the light leakage due to the noise field can be prevented only by arranging the noise field direction 81 to be perpendicular to or parallel to the absorption axial directions 37a and 37b of the polarizers, as illustrated in (b) of FIG. 23. That is, even in a case where the noise field induces a change in the magnitude of the optical anisotropy of the medium and, consequently, the medium does not show optical isotropy, it is possible to prevent light leakage from the region that is affected by the noise field by an arrangement in which the direction of the optical anisotropy induced, that is, the direction of the major axis of the refractive index ellipsoid becomes perpendicular to or parallel to the direction of the absorption axes of the polarizers. Accordingly, it becomes not necessary to cover the region to be affected by this noise field with a black matrix. This makes it possible to improve an aperture ratio.

Moreover, because the liquid crystal element of the present invention has a different display principle from the conventional liquid crystal display elements, it is possible in the liquid crystal element of the present invention to omit an initial alignment process such as rubbing that is carried out for the conventional liquid crystal display elements. This makes it possible to prevent problems such as dust and local discharge caused by the rubbing process. Moreover, by omitting the initial alignment process, it becomes possible to simplify the production process and reduce the production cost.

Note that, the medium A sealed between the substrates 30 and 36 to form the medium layer 35 may be any medium provided that the magnitude of the optical anisotropy thereof is changeable in response to application of the electric field. For example, the medium A may be a medium that is substantially optically isotropic (the orientational order parameter in the scale not smaller than the wavelength of visible light≈0) when no electric field is applied, and in which medium optical modulation is induced by the electric field application (that is, the medium becomes optically anisotropic by the electric field application). Moreover, the medium A may be a material (medium) in which the orientational order parameter in the scale not smaller than the wavelength of visible light is increased in the molecules 9 or molecular agglomerations (clusters) in response to application of the electric field (the orientational order parameter of the molecules 9 in the scale not smaller than the wavelength of visible light is further increased from a value of the orientational order parameter in a state where the optical modulation is already induced (the orientational order parameter in the scale not smaller than the wavelength of visible light>0)).

In the present invention, the medium A varies in terms of magnitude of optical anisotropy in response to application of the electric field indicates that, as described above, is to change the shape of the refractive index ellipsoid 35a in response to application of the electric field on the medium A. In the aforementioned configuration in which the medium A is optically isotropic when no electric field is applied and the magnitude of its optical anisotropy is changeable in response to application of the electric field, that is, in the configuration in which the optical anisotropy of the medium A is generated when the electric field is applied, the shape of the refractive index ellipsoid 35a is changed from the spherical shape to the ellipsoidal shape in response to application of the electric field.

As illustrated by the display element of the present embodiment, as illustrated in FIG. 14(a), the medium A sealed in a space between the substrates 30 and 36 is in the isotropic phase in the region other than the region 59 when no electric field (voltage) is applied to the electrodes 32 and 34, and the medium A is optically isotropic. On this account, the black display is carried out. Moreover, in the region 59, where the electric field is applied between the data signal line 47 and the electrode 34, the direction of the optical anisotropy induced in the medium A is parallel to or perpendicular to the absorption axes 37a and 38a of the polarizers 37 and 38. On this account, the black display is carried out.

Meanwhile, as illustrated in FIG. 14(b), when an electric field is applied between the electrodes 32 and 34, each of the molecules in the medium A is aligned such that the long-axis directions of the molecules are along the electric field formed between the electrodes 32 and 34, in the region other than the region 59. Therefore, the birefringence phenomenon occurs. As illustrated in FIG. 14(c), due to the birefringence phenomenon, it is possible to modulate transmissivity of the display element according to the voltage between the electrodes 32 and 34.

Note that, at a temperature which is sufficiently far from a phase transition temperature (transition point), a high voltage is required in modulating the transmissivity of the display element. However, at a temperature which is just above the transition point, it is possible to adequately modulate the transmissivity of the display element with a voltage from 0V to about 100V.

For example, according to Non-Patent Document 3, in cases where the refractive index of the electric field direction is n// and the refractive index of the direction perpendicular to the electric field direction is n⊥, a relationship between double refractive change (Δn=n//−n⊥) and the outer electric field, that is, the electric field E (V/m) is shown by the equation (3) as follows:

$$\Delta n = \lambda B_k E^2 \qquad (3),$$

where λ is a wavelength (m) of the incident light in a vacuum, and $B_k$ is the Kerr constant (m/V$^2$), and E is an intensity of applied electric field (V/m).

It is well-known that, with a rise in temperature (T), Kerr constant $B_k$ decreases according to a function proportional to 1/(T−Tni). It is possible to drive the molecules with low electric field intensity when the temperature is around the transition point (Tni). However, necessary electric intensity increases drastically with a rise in temperature (T). On this account, at a temperature which is very far from the transition temperature (a temperature which is sufficiently higher than the transition temperature), a high voltage is required in modulating the transmittance of the display element. However, at a temperature which is just above the phase transition point, it is possible to adequately modulate the transmittance of the display panel with a voltage of about 100V or less.

(6. Examples of Medium)

The present invention is not limited to the present embodiment in which the medium A is a mixture of JC-1041xx (50.0 wt %), 5CB (38.5 wt %), and ZLI-4572 (11.1 wt %). The medium A may be any material, as long as it is optically isotropic (at least macroscopically isotropic in the direction parallel to the substrate plane) when no electric field is applied thereon, and the magnitude of whose optical anisotropy (at least optical anisotropy in the direction parallel to the substrate plane) is changeable in response to application of the electric field. A material whose birefringence is increased by electric field application is especially preferable.

Examples of such materials are materials showing the Pockels effect, materials showing the Kerr effect, or the like material (various organic materials and inorganic materials). The Pockels effect and the Kerr effect (which themselves are observed in isotropic states) are an electro-optical effect proportional to the electric field and an electro-optical effect proportional to square of the electric field, respectively. When no electric field is applied, the material of the Pockels effect or the Kerr effect is in an isotropic phase, and thus optically isotropic. When an electric field is applied, however, major axial directions of molecules of a compound are orientated along the direction of the electric field in a region (part of the material) in which the electric field is applied, whereby birefringence occurs in the region (part of the material). The occurrence of birefringence changes (modulates) transmissivity of the material. For example, a display mode using a material showing the Kerr effect is such that localization of electrons within one molecule is controlled by the application of the electric field. By doing this, individual molecules randomly orientated are rotated individually to change their directions. Thus, the display mode using the material showing the Kerr effect is very fast in responding speed. Moreover, because the molecules are randomly orientated, this display mode has an advantage that it has no viewing angle limitation. Among materials that may be the medium A, materials whose property is roughly proportional to the electric field or the square of the electric field may be considered as the materials showing the Pockels effect or the Kerr effect.

Examples of the materials showing the Pockels effect include organic solid materials and the like such as hexamine. However, the present invention is not limited to this.

The medium layer 35 may include an orientation auxiliary agent for facilitating the change in the magnitude of the optical anisotropy of the medium A during electric field application, or for stabilizing the optical isotropy. For example, photopolymerizable monomer may be polymerized in the medium layer 35 by irradiating ultra violet on a mixture in an optical isotropic phase at a temperature in the vicinity of a cholesteric phase-optical isotropic phase transition temperature thereof, the mixture being prepared with the foregoing mixture (87.1%), TMPTA (trimethylolpropane triacrylate, Aldrich, acrylate monomer) (5.4 wt %), RM257 (Merch, diacrylate monomer) (7.1 wt %), and DMPA (2,2-dimethoxy-2-phenyl-acetophenone, photopolymerization initiator) (0.4 wt %). By forming an orientation auxiliary agent, it is possible to widen the temperature range in which the medium A (medium layer 35) shows optical isotropy. The mixture containing the photopolymerizable monomer shows positive dielectric anisotropy.

Other non-limiting examples of materials showing the Kerr effects are mixtures of liquid crystalline materials represented by the following structural formulas (2) to (4):

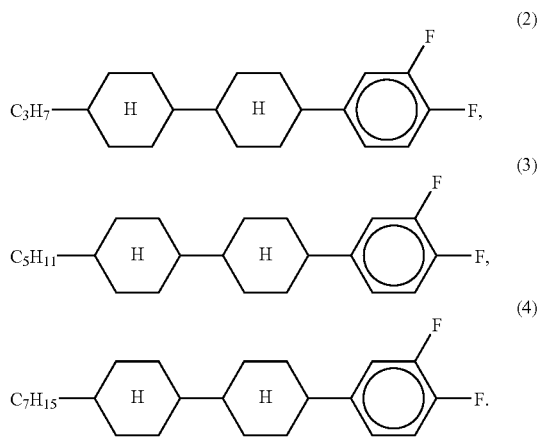

The compound represented by the structural formula (2) is 3HPFF, which is 1,2-difluoro-4-[trans-4-(trans-4-n-propyl-cyclohexyl) cyclohexyl]benzene. The compound represented by the structural formula (3) is 5HPFF, which is 1,2-difluoro-4-[trans-4-(trans-4-n-pentylcyclohexyl) cyclohexyl]benzene. The compound represented by the structural formula (4) is 7HPFF, which is 1,2-difluoro-4-[trans-4-(trans-4-n-heptyl-cyclohexyl) cyclohexyl]benzene. This mixture shows negative dielectric anisotropy.

The Kerr effect is observed in a material transparent to incident light. Therefore, the material showing the Kerr effect is used as a transparent medium. In general, temperature increase causes the liquid crystalline material to transit from a liquid phase having a short distance order to an isotropic phase having a random orientation at a molecular level (the isotropic phase in which the molecules are randomly orientated). That is, the Kerr effect of the liquid crystalline material is a phenomenon that is observed not in a nematic phase but in a liquid that is at its liquid phase-isotropic phase transition temperature or at a higher temperature (that is, the Kerr effect is observed in a material in the isotropic state). The liquid crystalline material is used as a transparent dielectric liquid.

Dielectric liquids of the liquid crystalline materials and the like are more isotropic at a higher operating environmental temperature (heating temperature) attained by heating. Thus, in a case where the medium A is a dielectric liquid of a liquid crystalline material or the like, the following configurations, for example, may be adopted in order to use the dielectric liquid while it is transparent, that is, to use the dielectric liquid in the liquid state transparent to the visible light: (1) to provide heating means (not shown) such as a heater or the like in a periphery of the medium layer 35 in order that the dielectric liquid heated to its transparent point or higher by using the heating means may be used; (2) to utilize heat radiation from a backlight or heat conduction from the backlight and/or a peripheral driving circuit in order that the dielectric liquid heated to its transparent point or higher may be used (in this case, the backlight and/or the peripheral driving circuit act as heating means); or the like arrangement. Moreover, it may be arranged that (3) as the heater, a sheet heater (heating means) is attached to at least one of the substrates 30 and 36 in order that the dielectric liquid heated to a designated temperature may be used. The shield electrode mentioned above may be used as the heating means. Further, in order that the dielectric liquid may be used in the transparent state, the dielectric liquid may be made of a material whose transparent point is lower than a lower limit of the operating temperature of the display panel.

The medium A preferably contains a liquid crystalline material. In a case where the medium A is a liquid crystalline material, it is preferable that the liquid crystalline material be macroscopically a transparent liquid in the isotropic phase but microscopically containing clusters, which are agglomerations of molecules orientated in a certain direction in a short distance order. Because, when used, the liquid crystalline material is arranged to be transparent with respect to the visible light, the clusters are also arranged to be transparent with respect to the visible light (that is, as being optically isotropic) when used.

In order to cause the liquid crystalline material containing the clusters to be transparent as such, the following configurations may be adopted, for example: the display panel may be controlled in terms of temperature by using heating means such as a heater as described above; the medium layer 35 may be segmented into small regions by using a polymer material or the like as described in Patent Document 3; the liquid crystalline material may be minute droplets having a diameter smaller than the wavelength of the visible light, for example by arranging such that the liquid crystalline material has a diameter of, for example, 0.1 μm or less, thereby restraining scattering of the light in order to cause such liquid crystalline material to be transparent; and the liquid crystalline material may be made of a liquid crystalline compound that is in the transparent isotropic phase at the operating environment temperature (room temperature). The scattering of light is negligible when the diameter of the liquid crystalline material and a diameter (major axis) of the clusters is 0.1 μm or less, that is, smaller than the wavelength of the visible light (wavelength of incident light). Thus, for example, if the diameter of the cluster is 0.1 μm or less, the clusters are also transparent with respect to visible light.

Note that, as described above, the medium A is not limited to the materials showing the Pockels effect or the Kerr effect. Therefore, the medium A may have an orderly molecular structure having a cubic symmetry in a scale (for example, nano scale) less than the light wavelength of the visible light, and thus may have a cubic phase that appears isotropic optically (see Non-Patent Documents 3 and 4). The cubic phase is one of those liquid crystal phases of the liquid crystalline material which can be used as the medium A. Examples of the liquid crystalline materials showing the cubic phase include BABH8 and the like. BABH8 is represented by the following Structural Formula (5):

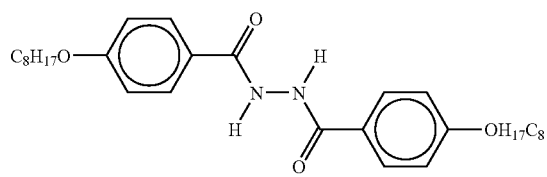

(5)

The application of an electric field slightly distorts the structure of the liquid crystalline material, thereby inducing optical modulation.

At temperatures not less than 136.7° C. but not more than 161° C., BABH8 is in the cubic phase having an orderly structure having a cubic symmetry (a symmetric cubic system) and being smaller in scale than the wavelength of the visible light. The orderly structure (cubic symmetric orderly structure) of the cubic phase has a lattice constant about 6 nm, that is, smaller than the light wavelength by more than 1 digit. BABH8 is transparent because the orderly structure (orientational order) of BABH8 is less than the light wavelength. That is, as described above, BABH8 has the orderly structure smaller than the light wavelength within the aforementioned temperature range and shows optical isotropy (at least macroscopically isotropic) within the temperature range when no electric field is applied thereon. Accordingly, BABH8 allows good black display under crossed nicols when applied to the display element of the present embodiment.

On the other hand, when an electric field is applied between the counter electrodes 34 and the pixel electrodes 32 while the temperature of BABH8 is controlled to be not less than 136.7° C. but not more than 161° C. by using, for example, the aforementioned heating means or the like, the structure (orderly structure) having the cubic symmetry is distorted. That is, within the temperature range, BABH 8 is isotropic when no electric field is applied thereon but becomes optically anisotropic when the electric field is applied.

As a result, birefringence occurs in the medium layer 35. Therefore, the display panel can perform good white display. Note that the birefringence occurs in a certain direction but magnitude of the birefringence is changeable in response to application of the electric field. Moreover, a voltage-transmissivity curve (depicting a relationship between (a) transmissivity and (b) the voltage to be applied between the counter electrodes 34 and pixel electrodes 32) is a stable curve in the temperature of range not less 136.7° C. but not more than 161° C., that is, in such a wide temperature range of about 20K. Therefore, the use of BABH8 as the medium A allows very easy temperature control. That is, the medium layer 35 made of BABH8 is in a thermally stable phase and thus does not have such temperature dependency that its property is suddenly changed by thermal change. Therefore, temperature control for the medium layer 35 made of BABH8 is very easy.

Moreover, the medium A may be a system that appears optically isotropic, the system filled with agglomerations of radially orientated liquid crystal molecules and of a size smaller than the wavelength of the visible light. Such a system may be a liquid crystal micro emulsion as described in Non-Patent Document 1, a liquid crystal-particle dispersion system (a mixture system in which particulates are dispersed in a solvent (liquid crystal)) as described in Non-Patent Documents 2 and 4, or the like. The agglomerations having the radial orientation is distorted by application of the electric field, thereby inducing the optical modulation.

Note that the liquid crystalline material may be a simple substance that solely shows its liquid crystalline property, or a mixture that shows its liquid crystalline property when a plurality of substances are mixed together. Further, the liquid crystalline material may be a mixture of (a) such a liquid crystalline simple substance or such a liquid crystalline mixture, and (b) a non-liquid crystalline material. Further, the liquid crystalline material may be a material in which a polymer and a liquid crystal are dispersed (this material is described in Non-Patent Document 4). Moreover, a hydrogen-bond compound as described in Non-Patent Document 7 may be added therein. The hydrogen-bond compound (hydrogen bond network, hydrogen-bonding material) is a compound formed via hydrogen bond, but not chemical bond.

The hydrogen-bond compound is obtained, for example, by mixing a gelling agent (hydrogen-bonding material) into the medium that is to be sealed in the medium layer 35. As the gelling agent, a gelling agent having an amide group is preferable, and a gelling agent having at least two amide groups in one molecule, or a urine-based or ricin-based gelling agent is more preferable. Examples of the gelling agents (gelling agents A and B) are represented by the following structural formulae (6) and (7), respectively:

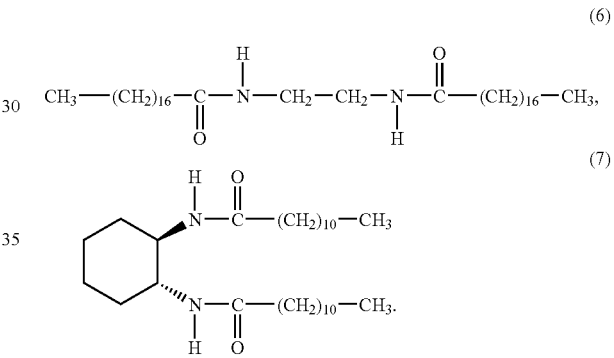

A little amount of any of these gelling agents can gelatinize a dielectric material such as liquid crystalline material.

Moreover, such a hydrogen-bond compound is attained by mixing Lys18 into the medium sealed in the medium layer 35 by 0.15 mol %. Lys18 is a gelling agent (hydrogen bonding material) described in Non-Patent Document 6 (p. 314, FIG. 2) as represented by the following formula (8):

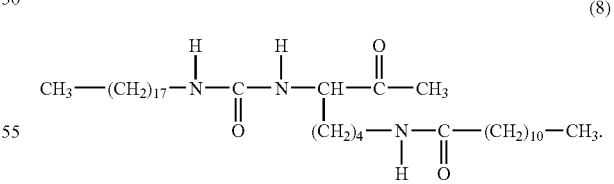

That is, a hydrogen bond network as described in Non-Patent Document 6 (p. 314, FIG. 1), which is obtained by mixing Lys18 in the medium by 0.15 mol %, and which shows a gel state, can be used as an orientation auxiliary agent for facilitating the orientation in inducing, by the electric field application, the change in the magnitude of the optical anisotropy, or as stabilizing means for stabilizing the optical isotropic phase. Further, the gelling agents are free from various problems of a polymer network, such as need of UV irradiation process, degradation of material due to the UV irradiation, decrease in reliability because of the groups left unreacted, unlike a photopolymerizable compound used as a material to be added.

Moreover, the medium A preferably contains a polar molecule. For example, nitrobenzene or the like is preferable as the medium A. Note that nitrobenzene is a medium showing the Kerr effect.

In the following, examples of the materials that can be used as the medium A, and an example of forms of the materials are provided. It should be noted that the present invention is not limited to the following examples.

[Smectic D Phase (SmD)]

Figure 17:
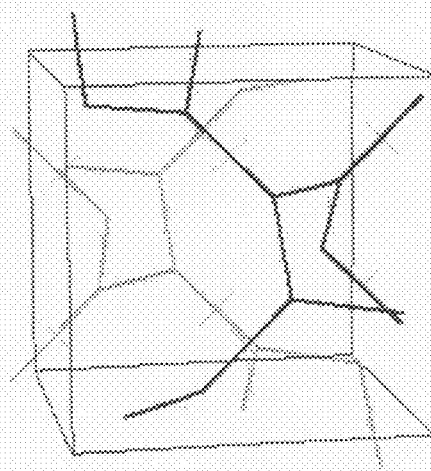
FIG. 17 is a view schematically illustrating a load network model of a cubic symmetric structure of smectic D phase.
Figure 18:
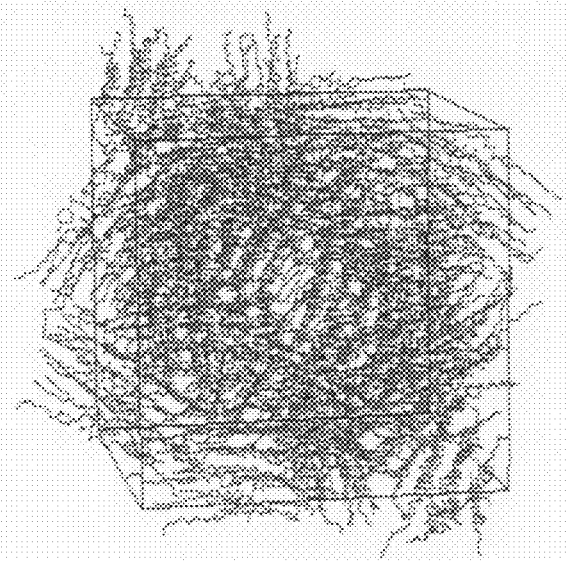
FIG. 18 is a view schematically illustrating the cubic symmetric structure of smectic D phase.

A smectic D phase (SmD) is one of liquid crystal phases of the liquid crystalline materials that can be used as the medium A. The smectic D phase has a 3-dimensional lattice structure and a lattice constant smaller than the wavelength of the visible light, as illustrated in FIGS. 17 and 18. Accordingly, the smectic D phase has a cubic symmetry. Therefore, the smectic D phase is optically isotropic.

Examples of liquid crystalline materials showing the smectic D phase are ANBC16 and the like which are described in Non-Patent Document 3, for example. ANBC16 is represented by Formula (9):

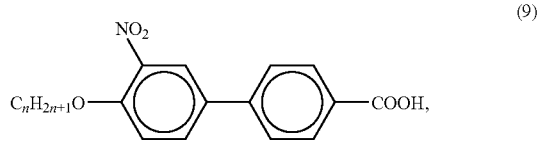

(9)

where n is an arbitral integer but specifically n=16.

ANBC16 shows the smectic D phase in a temperature range from 171.0° C. to 197.2° C. In the smectic D phase, a plurality of molecules form a 3-dimensional lattice like a jungle gym (Registered Trademark). The lattice has a lattice constant which is less than the wavelength of visible light. That is, the smectic D phase has a cubic symmetry. Note that the lattice constant of ANBC16 described in the present embodiment is about 6 nm. Because of this, the smectic D phase is optically isotropic.

When the electric field is applied on ANBC16 within the temperature range in which it shows the smectic D phase, molecules of ANBC16 change their directions to be orientated along the electric field direction due to the dielectric anisotropy of the ANBC16 itself, thereby causing distortion in the lattice structure. That is, the optical anisotropy occurs in ANBC16. The present invention is not limited to ANBC16. Any material showing the smectic D phase is applicable as the medium A for the display element according to the present embodiment

[Liquid Crystal Micro Emulsion]

Liquid crystal micro emulsion is a generic term for a system (mixture system) in which thermotropic liquid crystal molecules in a droplet form are dispersed in an oil continuous phase as in a O/W micro emulsion (water droplets are dispersed in an oil continuous phase by the aid of a surfactant) whose oil molecules are dispersed in lieu of the thermotropic liquid crystal molecules. Non-Patent Document 1 proposes the liquid crystal micro emulsion.

Figure 19:
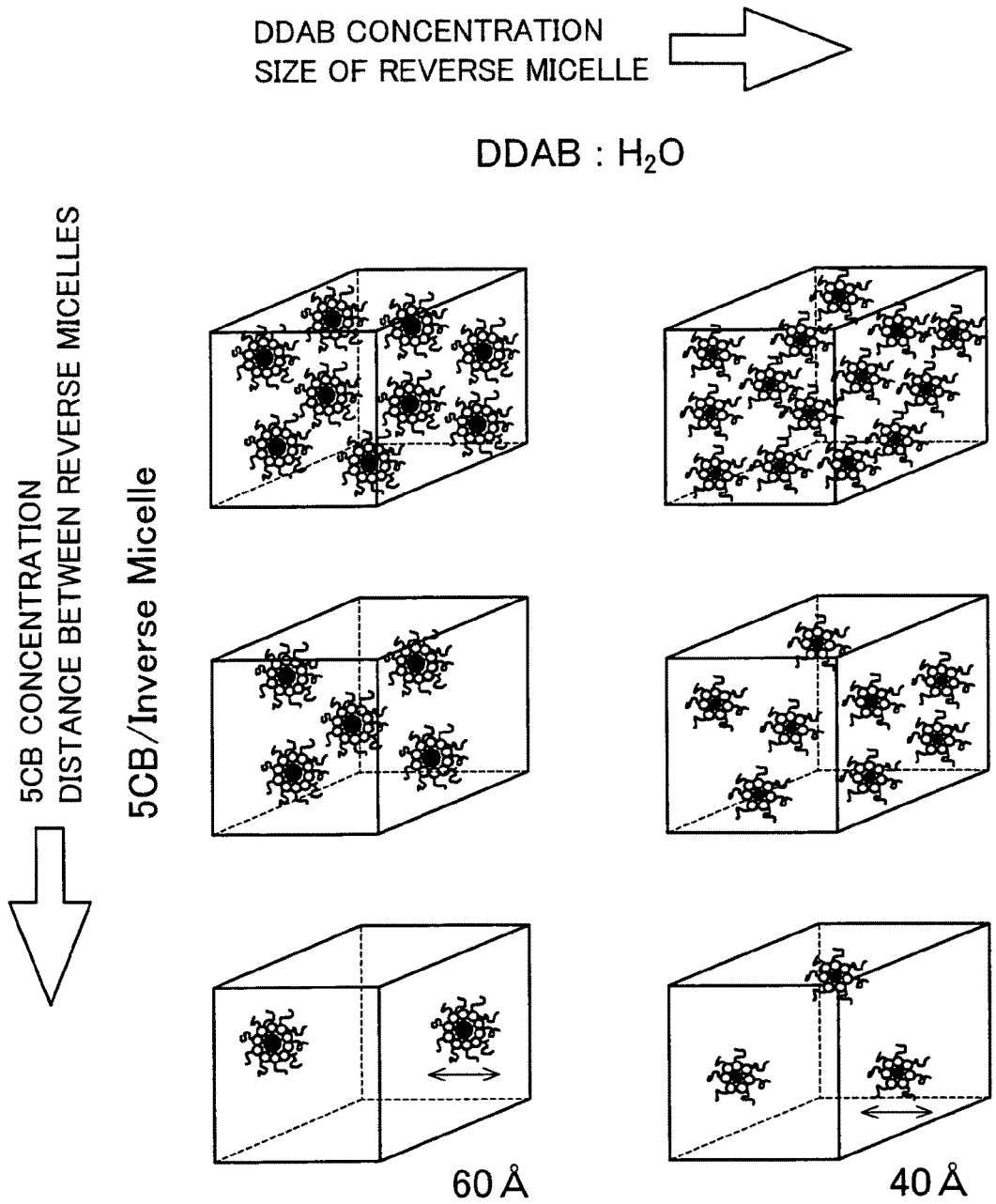
FIG. 19 is a view schematically illustrating an example of reverse micelle phase-mixture system of liquid crystal emulsion.
Figure 20:
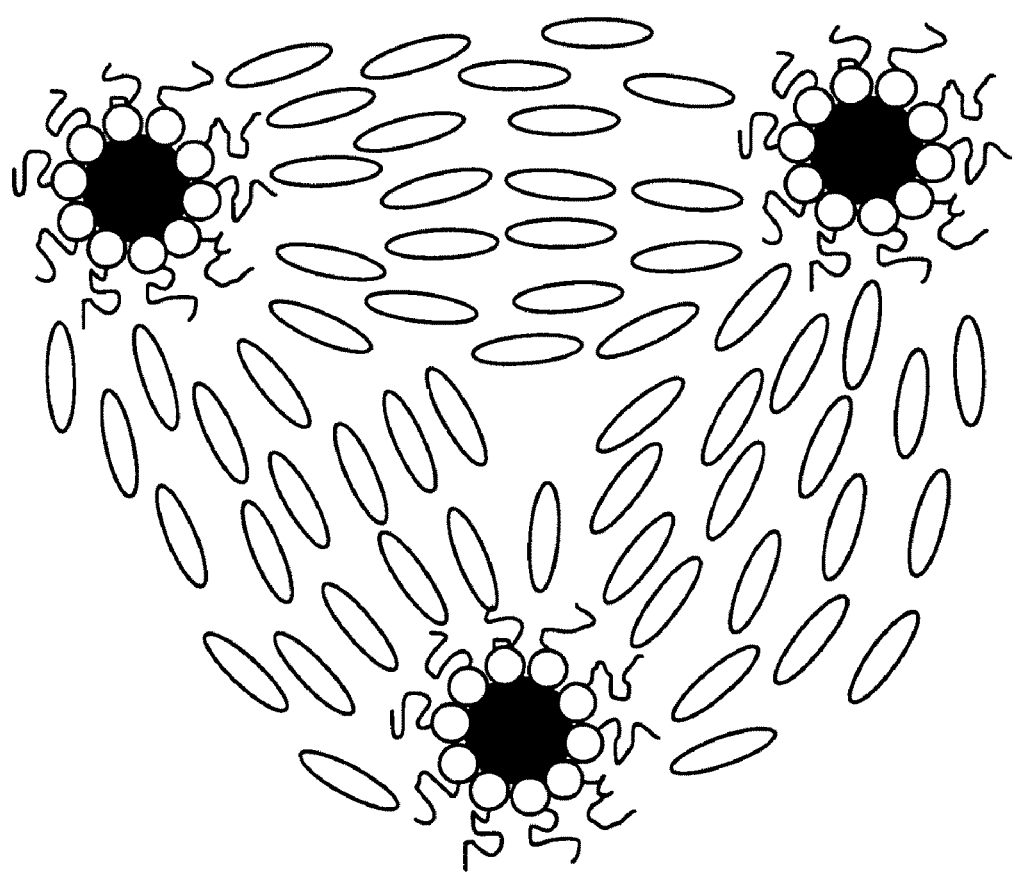
FIG. 20 is a view schematically illustrating another example of reverse micelle phase-mixture system of liquid crystal emulsion.

Specific examples of the liquid crystal micro emulsion include a mixture of pentylcyanobiphenyl (5CB) and an aqueous solution of didodecylammonium bromide (DDAB), described in Non-Patent Document 1. Pentylcyanobiphenyl (5CB) is a thermotropic liquid crystal that shows a nematic liquid phase. Didodecylammonium bromide (DDAB) is a lyotropic liquid crystal that shows a reverse micelle phase. This mixture system has a structure as schematically depicted in FIGS. 19 and 20.

Moreover, the mixture system is typically such that its reverse micelles have a diameter of about 50 Å, and distances between the reverse micelles are about 200 Å. These scales are smaller than the wavelength of visible light roughly by one digit. Moreover, the reverse micelles are randomly dispersed 3-dimensionally. Centered with respect to each reverse micelle, 5CB are aligned in a radial manner. Accordingly, the mixture system is optically isotropic.

By applying the electric field onto a medium made of the mixture system, the molecules are orientated along the electric field direction because 5CB is dielectrically anisotropic. That is, orientational anisotropy occurs in the system that has been optically isotropic due to the radial orientation centered with respect to the reverse micelles. This results in optical anisotropy. The present invention is not limited to the mixture system. The medium A of the display panel according to the present embodiment may be any liquid crystal micro emulsion that is optically isotropic when no electric field is applied thereon but becomes optically anisotropic when the electric field is applied thereon.

[Lyotropic Liquid Crystal]

Figure 21:
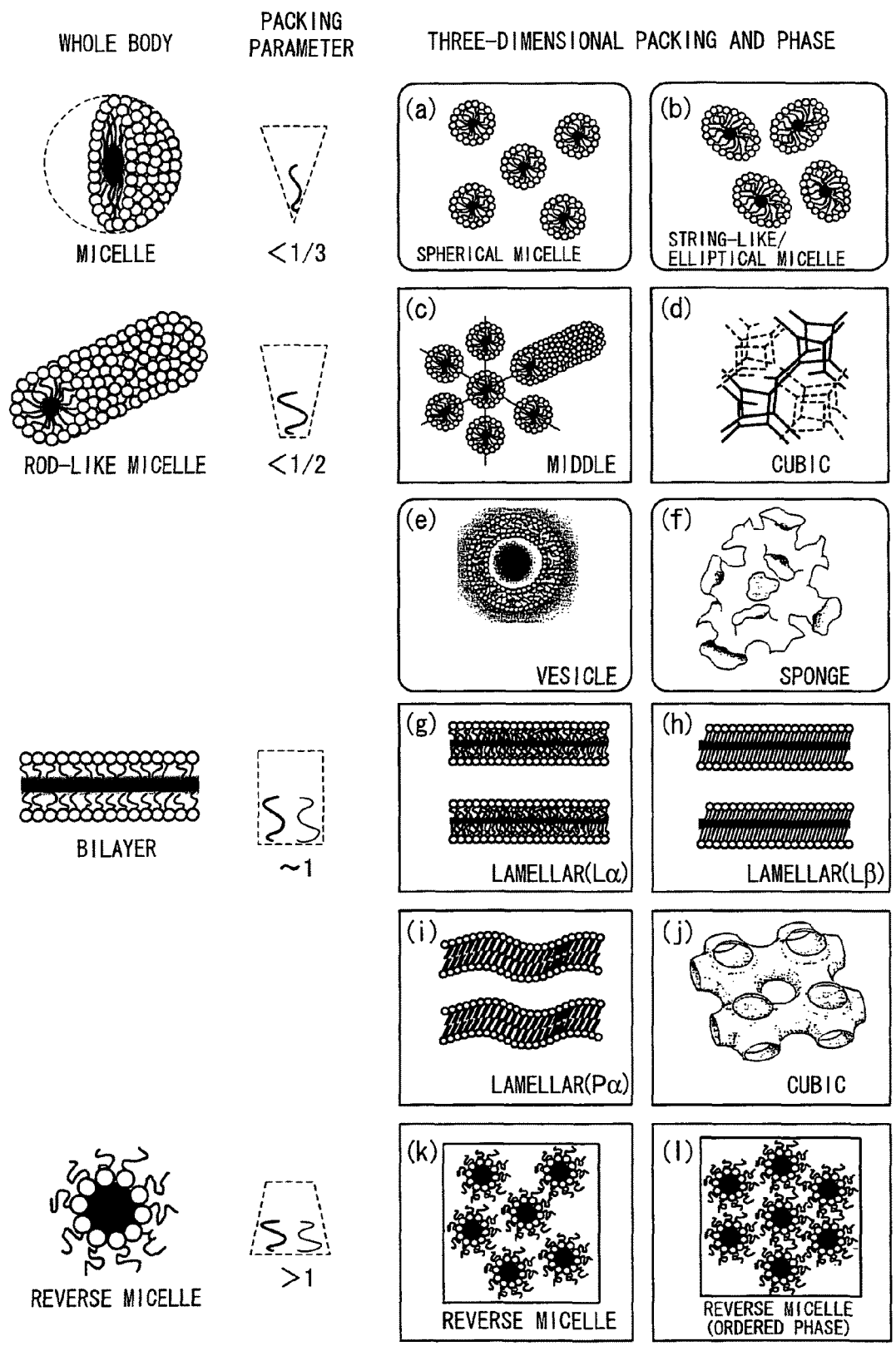
FIG. 21 is a view illustrating classification of lyotropic liquid phase.

Lyotropic liquid crystal is a liquid crystal that is a mixture in which liquid crystal molecules are dissolved in a solvent (water, an organic solvent, or the like) that has other property. The particular phases are phases that are optically isotropic when no electric field is applied thereon. Examples of the particular phases include a micelle phase, a sponge phase, a cubic phase, and a reverse micelle phase which are described in Non-Patent Document 4. In FIG. 21, classification of the lyotropic liquid crystal phase is illustrated.

There is a surfactant (which is an amphiphile) that shows a micelle phase. For example, an aqueous solution of dodecyl sodium sulfate, an aqueous solution of potassium palmitate, or the like that are ionic surfactants forms spherical micelles. Moreover, in a mixture solution of polyoxyethylenenonylphenylether (which is a non-ionic surfactant) and water, a nonylphenyl group acts as a hydrophobic group whereas oxyethylene chain acts as a hydrophilic group, thereby forming micelles. Besides these, micelles are formed in an aqueous solution of styrene-ethyleneoxide block copolymer.

For example, in the spherical micelles, the molecules are packed in such a manner that they are orientated respectively toward the all directions 3-dimensionally (thereby forming molecule agglomerations). In this way, the micelles are in the spherical shape. Moreover, the spherical micelles have a size smaller than the wavelength of the visible light. Thus, the spherical micelles show no optical anisotropy but appear isotropic. However, when an electric field is applied on the spherical micelles, the spherical micelles are distorted thereby showing the optical anisotropy. Therefore, the lyotropic liquid crystal having the spherical micelles phase is also applicable as the medium A of the display element according to the present embodiment. The present embodiment is not limited to the spherical micelles. Micelle phases having other shapes, that is, a string-like micelle phase, an elliptical micelle phase, a rod-like micelle phase, and the like are similarly effective as the medium A.

Moreover, it is generally known that reverse micelles are formed depending on concentration, temperature, and surfactant. Compared with the micelles, the reverse micelles are such that the molecules are located upside down in such a manner that the hydrophilic group and the hydrophobic group exchanges their positions. Such reverse micelles show a similar optical effect as the micelles. Therefore, by using the reverse micelle phase as the medium A, an effect equivalent to that in the use of the micelle phase is attained. Note that the aforementioned liquid crystal micro emulsion is an example of a lyotropic liquid crystal having the reverse micelle phase (reverse micelle structure).

Moreover, an aqueous solution of pentaethylene glycoldodecylether which is a non-ionic surfactant has concentration and temperature ranges in which it shows the sponge phase or cubic phase as shown in FIG. 21. Materials in the sponge phase and the cubic phase are transparent because the sponge phase and the cubic phase have an order (orientational order, orderly structure) smaller than the wavelength of the visible light. That is, media having these phases show optical isotropy, however, they show optical anisotropy when an electric field is applied thereon, because their orientational order (orderly structure) is changed by (and according to) the application of the electric field. Thus, the lyotropic liquid crystal having the sponge phase or the cubic phase is also applicable as the medium A of the display element according to the present embodiment.

[Liquid Crystal Particulate Dispersed System]

Moreover, the medium A may be a liquid crystal particulate dispersed system in which latex particulates are mixed in the aqueous solution of pentaethyleneglycol-dodecylether ($C_{12}E_5$; a non-ionic surfactant), the latex particulates having a surface modified with sulfate group and a diameter of about 100 Å.

The liquid crystal particulate dispersed system has an orientational order (orderly structure) smaller than light wavelength. The aforementioned liquid crystal particulate dispersed system shows the sponge phase. However, the present embodiment is not limited to this. Liquid-crystal-particulate-dispersed systems that show a micelle phase, a cubic phase, a reverse micelle phase, or the like may be applicable as the medium A used in the present embodiment. Note that it is possible to have an orientational structure similar to that of the liquid crystal micro emulsion by using aforementioned DDAB in lieu of the latex particulates.

One type of, or two or more types of particulates (liquid crystal particulates) may be preferably dispersed in the solvent.

Moreover, it is preferable that the particulates have an average particle diameter of 0.2 μm or less. The use of the fine particulates of an average particle diameter of 0.2 μm or less attains stable dispersion of the particulates in the medium layer 35, thereby preventing agglomeration of the particulates and phase separation, which would occur after a long time. Therefore, for example, it is possible to sufficiently prevent the display unevenness in the display panel, which display unevenness is caused by local unevenness of particulates due to precipitation of the particulates.

Moreover, it is preferable that a particle-particle distance of the particulates is 200 nm or less, and it is more preferable that the particle-particle distance of the particulates is 190 nm or less.

Incident light to 3-dimensionally dispersed particles causes diffraction light at a certain wavelength. Prevention of the occurrence of this diffraction light improves the optical isotropy, and gives the display panel higher contrast.

Even though it depends on the incident angle of the incident light, the approximate wavelength λ of the diffraction light due to the 3-dimensionally dispersed particles is obtained by λ=2d, where d is the particle-particle distance.

It is almost impossible for human eyes to detect diffraction light of 400 nm or less. Thus, it is preferable that $\lambda \leq 400$ nm. $\lambda \leq 400$ nm can be attained when the particle-particle distance d is 200 nm or less.

According to CIE (Commission Internationale de l'Eclairage), undetectable wavelength for human eyes is 380 nm or less. Thus, it is more preferable that $\lambda \leq 380$ nm. $\lambda < 380$ nm can be attained when the particle-particle distance d is 190 nm or less.

A long particle-particle distance would result in insufficient interaction between the particulates, thereby making it more difficult to cause a micelle phase, a sponge phase, a cubic phase, and a reverse micelle phase. This is another reason why it is preferable that the particle-particle distance is 200 nm or less and it is more preferable that the particle-particle distance is 190 nm or less.

Moreover, as to the concentration (content) of the particulates in the medium layer 35, it is preferable that the concentration is in a range of 0.05 wt % to 20 wt % with respect to a total weight of the particulates and the medium to be sealed in the medium layer 35. When the concentration of the particulates in the medium layer 35 is in a range of 0.05 wt % to 20 wt %, it is possible to prevent the agglomeration of the particulates.

The particulates to be sealed in the medium layer 35 are not particularly limited, and may be transparent or not transparent. Moreover, the particulates may be organic particulates (such as polymer), inorganic particulates, or metallic particulates.

In a case where the particulates are the organic particulates, it is preferable that the organic particulates be in the form of polymer beams such as polystyrene beads, polymethylmethacrylate beads, polyhydroxyacrylate beads, divinylbenzene beads, and the like. The particulates may be cross-linked or not cross-linked. In a case where the particulates are inorganic particulates, it is preferable to use particulates such as glass beads and silica beads.

As the metallic particulates, alkali metal, alkali earth metal, transition metal, rare earth metal are preferable. For example, particulates made of titania, alumina, palladium, silver, gold, copper, or an oxide of any of these metals can be preferably used as the metallic particulates. In a case where light metal is used, it is preferable to use particulates made of an oxide of light metal or the like, for example, magnesium oxide. These metallic particulates may be made of sole metal or may be made of an alloy of two or more of them or a complex of two or more of them. For example, particulates prepared by covering silver particulates with a metal such a titania, palladium, or the like may be used. The silver particulates themselves would possibly change the properties of the display element by oxidation of silver. By covering the surfaces of the silver particulates with a metal such as palladium, it is possible to prevent the oxidation of silver. Moreover, the metallic particulates in the beads form may be used as such, or may be used after subjected to heat treatment, or adding an organic material to the surfaces of the beads. The organic material to be added to the surfaces of the beads is preferably a material that shows a liquid crystallinity.

Moreover, it is preferable that the organic material to be added on the surfaces of the metallic particulates be not less than 1 mole but not more than 50 moles with respect to 1 mole of the metal.

For example, the metallic particulates to which the organic material is added may be prepared by mixing the organic material in a solvent in which metal ions are solved or dispersed, and then reducing the metal ions. The solvent may be water, an alcohol, an ether, or the like.

Further, the particulates to be dispersed may be in a form of fullerene, and/or in a carbon nano tube. The fullerene should be such that carbon atoms are arranged in a spherical shell configuration therein. For example, a preferable fullerene has a stable structure having a carbon number n of 24 to 96. An example of such fullerene is, for example, a spherical closed-shell carbon molecular structure of C60 (comprising 60 carbon atoms). Moreover, as the carbon nano tube, for example, a tube-like shaped nano tube is preferable, the tube-like shaped nano tube being formed by rolling a material that is made of carbon atoms arranged in graphite-like plane layers having a thickness of several atomic layers.

Moreover, the shape of the particulates is not particularly limited. For example, the shape may be a spherical shape, ellipsoidal shape, agglomeration-like shape, column-like shape, cone-like shape, any of these shapes with protrusion, or any of these shapes with a hole. Moreover, the particulates are not particularly limited in terms of their surface state. For example, the particulates may have a flat surface or a non-flat surface, or may have a hole or a groove.

[Dendrimer]

Dendrimer is a 3-dimensionally highly-branched polymer in which every monomer unit is branched. Because it is highly branched, dendrimer has a spherical structure when it has a molecular weight larger than a certain molecular weight. The spherical structure forms a transparent substance because it has an order (orderly structure, orientational order) smaller than the wavelength of the visible light. However, application of an electric field changes an orientational order in dendrimer, thereby causing dendrimer to have an optical anisotropy (and/or thereby changing the magnitude of the optical anisotropy of the dendrimer). Therefore, dendrimer is also applicable as the medium A of the display element according to the present embodiment. Moreover, it is possible to attain an orientational structure similar to that of the liquid crystal micro emulsion by using dendrimer in lieu of DDAB in the liquid crystal micro emulsion. The medium thus obtained can be used as the medium A, too.

[Cholesteric Blue Phase]

Figure 22:
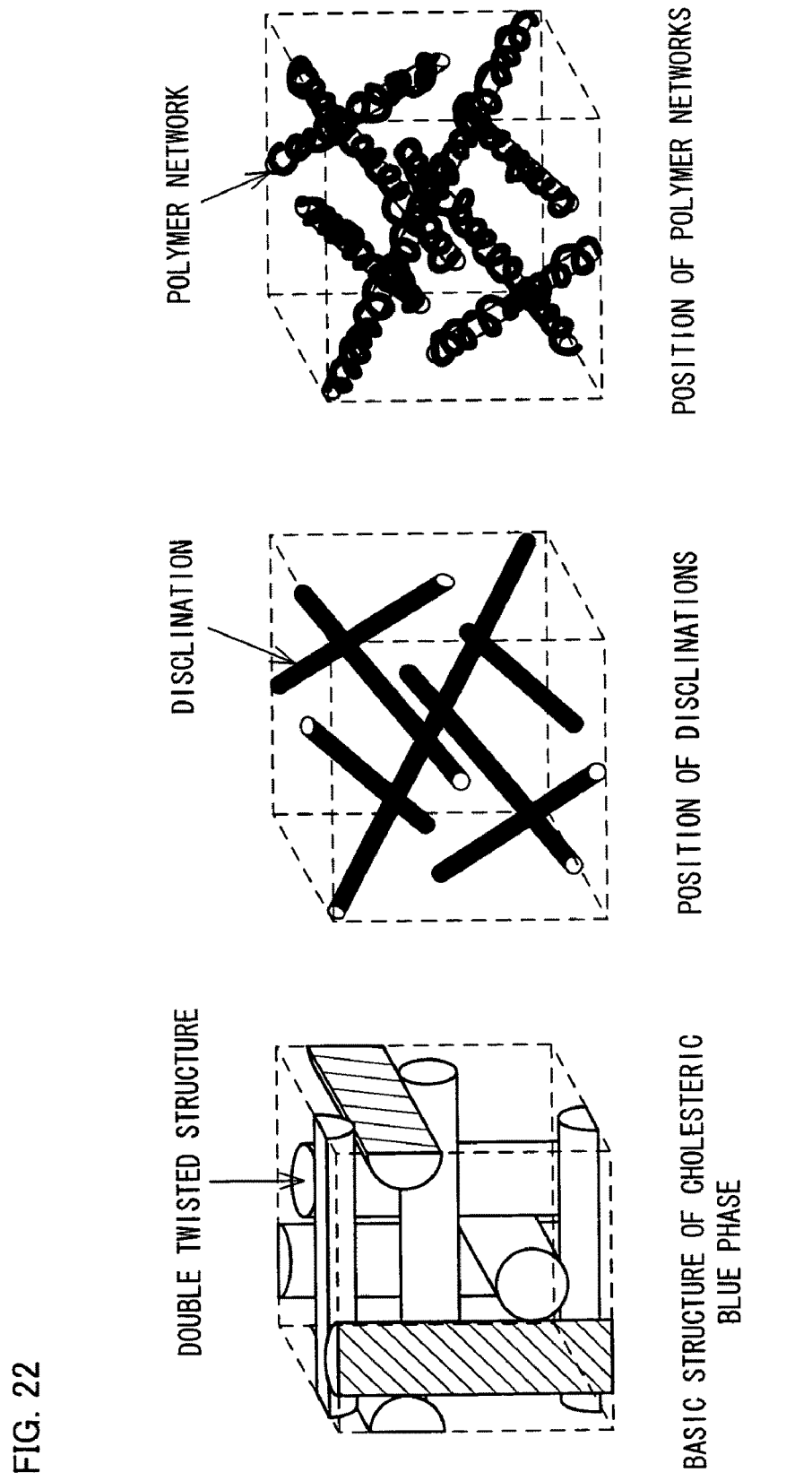
FIG. 22 is a view for explaining cholesteric blue phase and a mechanism of fixing according to the embodiment of the present invention.

Moreover, a cholesteric blue phase is applicable as the medium A. In FIG. 22, schematic structures of the cholesteric blue phase are illustrated.

It is known that, as illustrated in FIG. 22, screw axes form 3-dimensional periodic structures in a cholesteric blue phase and the structure of the cholesteric blue phase is highly symmetric (for example, see Non-Patent Documents 3 and 7). Materials in the cholesteric blue phase are substantially transparent because the cholesteric blue phase has an order (orderly structure, orientational order) smaller than the wavelength of the visible light. However, the application of an electric field changes magnitude of an orientational order in the cholesteric blue phase, thereby causing the cholesteric blue phase to show optical anisotropy. That is, the cholesteric blue phase, which is optically isotropic generally, shows optical anisotropy (and/or changes the magnitude of its optical anisotropy) when the electric field is applied, because the liquid crystal molecules are orientated along the electric field direction thereby distorting the lattice. Thus, a medium made of molecules that show a cholesteric blue phase is applicable as the medium A of the display element according to the present embodiment.

One of Examples of the materials showing the cholesteric blue phase is a compound prepared by mixing 48.2 molt % of "JC1041" (product name: a liquid crystal mixture made by Chisso Corporation), 47.4 mol % of "5CB" (4-ciano-4'-pentylbiphenyl; a nematic liquid crystal), and 4.4 mol % of "ZLI-4572" (product name: a chiral dopant made by Merck Ltd.). This compound shows a cholesteric blue phase in a temperature range from 330.7K to 331.8K.

Moreover, the cholesteric blue phase applicable to the present invention has a defective order smaller than light wavelength, and thus is substantially optically isotropic in the light wavelength. To be "optically isotropic" means that the cholesteric blue phase is optically isotropic except that the cholesteric blue phase shows a color thereof that is caused due to the helical pitch of the liquid crystals. A phenomenon in which light of the wavelength of the same order as the helical pitch is selectively reflected is referred to as selective reflection. When the selective reflection wavelength band is out of the visible range, the color does not appear (the color is not detectable for human eyes). However, the color appears when the wavelength band of the selective reflection is within the visible range.

In a case where the selective reflection wavelength band or the helical pitch is 400 nm or more, the cholesteric blue phase (blue phase) shows the color being caused due to the helical pitch. That is, visible light is reflected and the color caused by this is detected by human eyes. Therefore, for example, in application of the display element of the present invention to a television or the like in order to perform full color display, it is not preferable that reflection peak be within the visible range.

The selective reflection wavelength is also dependent on the incident angle of the light to the helical axis of the medium. The incident angle of the light to the helical axis has a distribution when the structure of the medium is not one-dimensional, that is, 3-dimensional as in the case of the cholesteric blue phase. Therefore, the width of the selective reflection wavelength has a distribution in this case.

Therefore, it is preferable that the selective reflection wavelength band or the helical pitch of the blue phase is not more than the visible range, that is 400 nm or less. As long as the selective reflection wavelength band or the helical pitch of the blue phase is 400 nm or less, the color will be almost undetectable for human eyes.

Moreover, according to CIE (Commission Internationale de l'Eclairage), the wavelength undetectable to human eyes is 380 nm or less. Thus, it is preferable that the selective reflection wavelength band or the helical pitch of the blue phase be 380 nm or less. In this case, it is possible to reliably prevent the color from being detected by human eyes.

The color also relates to an average refractive index of the medium, in addition to the helical pitch and incident angle of the light. Light of the color is light having a width of wavelength $\Delta\lambda=P\Delta n$, the width of wavelength being centered at wavelength $\lambda=nP$, where: n is the average refractive index; P is the helical pitch; and $\Delta n$ is anisotropy of the refractive index.

Every dielectric material has different $\Delta n$. For example, in a case where a liquid crystalline material is used as the medium to be sealed in the medium layer 35, the liquid crystalline material has an average refractive index of approximately 1.5 and $\Delta n$ of approximately 0.1. In order not to let the color be within the visible range in this case, the helical pitch P should be 400/1.5=267 nm, where $\lambda=400$ nm, while $\Delta\lambda=0.1\times267=26.7$. Therefore, the color can be almost undetectable for human eyes if the helical pitch of the medium is 253 nm or less, where 253 nm is a value obtained by deducting, from 267 nm, 13.4 nm that is approximately a half of 26.7 nm. Thus, it is preferable that the helical pitch of the medium be 253 nm or less, in order to prevent the color from being detectable.

In the above explanation, it is assumed that $\lambda=400$ nm in the relationship of $\lambda=nP$. In a case where $\lambda=380$ nm which is the wavelength undetectable for human eyes according to CIE, the helical pitch to let the color be out of the visible range is 240 nm or less. That is, when the helical pitch of the medium is 240 nm or less, the color can be reliably prevented from being detectable.

The mixture of JC1041 (50.0 wt %), 5CB (38.5 wt %), and ZLI-4572 (11.5 wt %) showed phase transition from liquid isotropic phase to optically isotropic phase at a temperature of about 53° C. or less. However, the mixture had a helical pitch of about 220 nm, which was less than the visible range. Thus, the color did not appear in this mixture.

Moreover, no orientational defect was observed in the vicinity of the electrode. It was deduced that the correlation distance of the medium was shorter than that of the conventional liquid crystals.

As described above, the cholesteric blue phase suitable for the present invention has a defective order smaller than the optical wavelength. The defective structure is caused by orienting molecules in largely twisted way, and therefore the medium exhibiting the cholesteric blue phase needs to have a chiral property to produce a greatly twisted structure. Then, to express a greatly twisted structure, it is preferable that a chiral agent be added to the medium as with the foregoing medium example.

The ideal concentration of the chiral agent depends on the twisting ability of the chiral agent, but a preferable concentration may be 8 wt % or 4 mol % or more. The chiral agent in an amount of equal to or greater than 8 wt % or 4 mol % widened the temperature range of the cholesteric blue phase by approximately 1° C. or more. On the other hand, the chiral agent less than 8 wt % or 4 mol % narrowed the temperature range of the cholesteric blue phase.

Further, the concentration of the chiral agent is preferably at or greater than 11.5 wt %. With the chiral agent with a concentration equal to or more than 11.5 wt %, the helical pitch becomes approximately 220 nm, and the color was not displayed.

As described above, a chiral agent with a higher concentration is preferred, as it eases expression of the cholesteric blue phase, and the helical pitch of the cholesteric blue phase is reduced.

However, when an excessive amount of chiral agent is added, the liquid crystal property of the entire medium layer 35 deteriorates. An insufficient liquid crystal property brings about deterioration in degree of generation of the optical anisotropy upon electric field application, thereby deteriorating function of the display element. Further, the deterioration in the liquid crystal property also causes a deterioration in stability of the cholesteric blue phase, which interferes the enlargement of temperature range of the cholesteric blue phase. The upper limit of the addition amount of the chiral agent can be decided according to the foregoing view. The upper limit of the concentration of the chiral agent was figured out as 80 wt % by the inventors of the present invention. More specifically, the concentration of the chiral agent is preferably not more than 80 wt %.

Moreover, the chiral agents in the present invention is not limited to ZLI-4572 and MLC-6248 which are used in the present embodiment.

Note that, in the foregoing explanation, the effect of the addition of chiral agent to the cholesteric blue phase was explained. However, the effect of the addition of chiral agent is not limited only to the cholesteric blue phase, but also obtained in a dielectric medium exhibiting other liquid crystal phases, such as a smectic blue phase or a nematic phase.

[Smectic Blue Phase]

A smectic blue phase is also applicable as the medium A. A smectic blue ($BP_{Sm}$) phase has a highly symmetric structure (for example, see Non-Patent Documents 3 and 5), similarly to the cholesteric blue phase. Because it has an order (orderly structure, orientational order) smaller than the wavelength of the visible light, a material in the smectic blue phase is substantially transparent. However, the application of an electric field changes the magnitude of an orientational order in the smectic blue phase, thereby causing the smectic blue phase to show the optical anisotropy (and/or changing the magnitude of the optical anisotropy). That is, the smectic blue phase, which is optically isotropic generally, shows optical anisotropy when the electric field is applied, because the liquid crystal molecules are orientated along the electric field direction, thereby distorting the lattice.

One of examples of the materials that show the smectic blue phase is FH/FH/HH-14BTMHC or the like. This material shows $BP_{Sm}$ 3 phase at temperatures from 74.4° C. to 72.3° C., $BP_{Sm}$ 2 phase at temperatures from 73.2° C. to 72.3° C., and $BP_{Sm}$ 1 phase at temperatures from 72.3° C. to 72.1° C. The $BP_{Sm}$ phase has a highly symmetric structure as described in Non-Patent Document 5, thus being optically isotropic generally. Moreover, when the electric field is applied on the material FH/FH/HH-14BTMHC, the liquid crystal molecules are orientated along the electric field direction, thereby distorting the lattice. As a result, the material shows optical anisotropy. Therefore, this material is applicable as the medium A of the display element according to the present embodiment.

As described above, as long as their optical anisotropy (refraction index, magnitude of orientational order) is changed (changeable) when the electric field is applied, the medium A of the display element according to the present embodiment may be any material such as: the materials showing the Pockels effect or the materials showing the Kerr effect; the materials made from molecules that show any one of the cubic phase, smectic D phase, cholesteric blue phase, and smectic blue phase; or the lyotropic liquid crystal or liquid crystal particulates dispersed system that shows any one of the micelle phase, reverse phase, and cubic phase. Moreover, the medium A may include particulates, a hydrogen-bond compound, or a polymerized compound. Further, the medium A may be the liquid crystal micro emulsion, dendrimer (dendrimer molecules), amphiphilic molecules, copolymer, other polar molecules, or the like material.

Moreover, the medium A is not limited to the liquid crystalline material. It is preferable that the medium A has an orderly structure (orientational order) smaller than the wavelength of the visible light. If it has such orderly structure smaller than the light wavelength, the medium A is optically isotropic. Therefore, by using the medium which has the orderly structure smaller than the wavelength of the visible light when the electric field is applied, it is possible to reliably change the display state between when the electric field is applied on the medium and when no electric field is applied on the medium.

Moreover, a large orientation defect that would affect the display was not observed in the vicinity of the electrode in the configuration in which the above-described medium was used in the display panel according to the present embodiment. It was deduced that, even if the orientation disturbance was caused due to local electric field in the vicinity of the electrode, the correlation distance, which was shorter than that of the conventional liquid crystal, of the medium did not allow the orientation disturbance to spread, unlike the conventional liquid crystal.

The present invention is not limited to the present embodiment in which a transmissive type display panel is mainly discussed as an example. The present invention is also applicable to a reflective display panel.

Moreover, the present invention is not limited to the materials and thickness of the members, size of the unit pixels, width of the electrodes, electrode-electrode distance, etc., which are merely examples in the present embodiment. The present invention may be modified as appropriate.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The display panel of the present invention is a display panel that is highly transmissive, can respond at a high speed, and has a wide viewing angle. The display panel of the present invention is applicable to, for example, image display apparatuses (display apparatuses) such as a television and a monitor, and image display apparatuses (display apparatuses) included in OA (Office Automation) apparatuses such as a personal computer, information terminals such as a video camera, a digital camera, and a mobile phone, or the like. Moreover, the display panel of the present invention has a high transmissivity property, a high-speed response property, and a wide viewing angle property and can realize lower production cost than that of conventional liquid crystal panels. Therefore, the display panel of the present invention is suitable for display apparatuses having a large screen or displaying moving pictures.

The invention claimed is:

1. A display panel comprising:
a pair of substrates facing each other; a medium layer being sandwiched between the pair of substrates and wherein no alignment film is provided on the substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates, wherein:
the medium layer includes a medium that varies in terms of magnitude of optical anisotropy in response to application of the electric field, wherein the medium of the medium layer shows an optical isotropy when no electric field is applied;
the data signal lines are provided so as to be parallel to each other; and
the polarizers have absorption axial directions parallel or perpendicular to a direction in which the data signal lines are extended.

2. The display panel as set forth in claim 1, wherein:
a direction in which the data signal lines are extended is perpendicular to a direction in which the scanning signal lines are extended.

3. The display panel as set forth in claim 1, wherein:
a black matrix having a width equal to or less than widths of the signal lines is formed in a region where the black matrix overlaps the signal lines that are parallel or perpendicular to absorption axial directions of the polarizers when viewed from a normal direction of the substrate plane, the region being on at least one of the pair of substrates.

4. The display panel as set forth in claim 1, wherein:
the electric field application means includes a plurality of electrodes on one substrate; and
an electric field is applied to the medium layer by applying an electric field between the plurality of the electrodes.

5. The display panel as set forth in claim 4, wherein:
the electric field application means includes first and second electrodes;
the first and second electrodes are transparent electrodes and insulated from each other by an insulating film; and
a distance between the first and second electrodes is shorter than a distance between the pair of substrates.

6. The display panel as set forth in claim 5, wherein:
the electric field application means includes first and second electrodes;
the first electrode is provided on one surface of the insulating film so as to be covered with the insulating film, and the second electrode is provided on the other surface of the insulating film; and
a distance from one of the pair of substrates on which the first and second electrodes are provided to a surface of the first electrode which surface faces the other of the pair of substrates is shorter than a distance from the one of the pair of substrates to a surface of the second electrode which surface faces the one of the pair of substrates.

7. The display panel as set forth in claim 4, wherein:
the electric field application means includes comb-shaped electrodes.

8. The display panel as set forth in claim 1, wherein:
the electric field application means is arranged so as to apply the electric field in two or more electric field application directions when viewed in the normal direction of the substrate plane.

9. The display panel as set forth in claim 8, wherein:
two of the electric field application directions make an angle of 90 degrees±less than 20 degrees therebetween.

10. The display panel as set forth in claim 8, wherein:
each of the electric field application directions makes an angle of 45 degrees±less than 10 degrees with each of the absorption axial directions of polarizers.

11. The display panel as set forth in claim 1, wherein:
the medium has an orientational order smaller than a visible light wavelength when no electric field is applied thereon.

12. The display panel as set forth in claim 1, wherein:
a selective reflection wavelength band or a helical pitch of the medium is not more than 400 nm.

13. The display panel as set forth in claim 1, wherein:
the medium includes a liquid crystalline material.

14. The display panel as set forth in claim 1, wherein:
the medium layer contains a polymerized compound.

15. The display panel as set forth in claim 1 wherein:
the medium is made of molecules showing a cholesteric blue phase.

16. A display apparatus including a display panel as set forth in claim 1.

17. A display panel including:
a pair of substrates facing each other; a medium layer being sandwiched between the pair of substrates and wherein no alignment film is provided on the substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates, wherein:

the medium layer includes a medium that varies in terms of magnitude of optical anisotropy in response to application of the electric field, wherein the medium of the medium layer shows an optical isotropy when no electric field is applied;

the scanning signal lines are provided so as to be parallel to each other; and the polarizers have absorption axial directions parallel or perpendicular to a direction in which the scanning signal lines are extended.

18. The display panel as set forth in claim 17, wherein:

the electric field application means includes first and second electrodes;

the first and second electrodes are transparent electrodes and insulated from each other by an insulating film; and a distance between the first and second electrodes is shorter than a distance between the pair of substrates.

19. The display panel as set forth in claim 18, wherein:

the electric field application means includes first and second electrodes;

the first electrode is provided on one surface of the insulating film so as to be covered with the insulating film, and the second electrode is provided on the other surface of the insulating film; and a distance from one of the pair of substrates on which the first and second electrodes are provided to a surface of the first electrode which surface faces the other of the pair of substrates is shorter than a distance from the one of the pair of substrates to a surface of the second electrode which surface faces the one of the pair of substrates.

20. A display panel including:

a pair of substrates facing each other; a medium layer being sandwiched between the pair of substrates and wherein no alignment film is provided on the substrates; a plurality of data signal lines and a plurality of scanning signal lines crossing each other; electric field application means for applying an electric field to the medium layer, the electric field application means provided in each pixel arranged at every intersection of the data signal lines and the scanning signal lines; and polarizers respectively provided to the pair of substrates, wherein:

the medium layer includes a medium that varies in terms of magnitude of optical anisotropy in response to application of the electric field, wherein the medium of the medium layer shows an optical isotropy when no electric field is applied;

the electric field application means includes a pair of electrodes one of which being connected to corresponding one of the data signal lines via an switching element that is turned ON and OFF in accordance with a signal supplied to corresponding one of the scanning signal lines;

the other one of the pair of electrodes is connected to corresponding one of common signal lines; and the polarizers have absorption axial directions parallel or perpendicular to a direction in which the common signal lines are extended.

21. The display panel as set forth in claim 20, wherein:

a direction in which the common signal lines are extended is parallel or perpendicular to a direction in which at least either the scanning signal lines or the data signal lines are extended.

22. The display panel as set forth in claim 21, wherein:

a direction in which the data signal lines are extended is perpendicular to a direction in which the scanning signal lines are extended.

23. The display panel as set forth in claim 20, wherein:

the electric field application means includes first and second electrodes;

the first and second electrodes are transparent electrodes and insulated from each other by an insulating film; and a distance between the first and second electrodes is shorter than a distance between the pair of substrates.

24. The display panel as set forth in claim 23, wherein:

the electric field application means includes first and second electrodes;

the first electrode is provided on one surface of the insulating film so as to be covered with the insulating film, and the second electrode is provided on the other surface of the insulating film; and a distance from one of the pair of substrates on which the first and second electrodes are provided to a surface of the first electrode which surface faces the other of the pair of substrates is shorter than a distance from the one of the pair of substrates to a surface of the second electrode which surface faces the one of the pair of substrates.

* * * * *